US012256885B2

(12) United States Patent
Zhou et al.

(10) Patent No.: US 12,256,885 B2
(45) Date of Patent: Mar. 25, 2025

(54) CLEANING APPARATUS

(71) Applicant: TINECO INTELLIGENT TECHNOLOGY CO., LTD., Suzhou (CN)

(72) Inventors: Chunfeng Zhou, Suzhou (CN); Jincheng Xue, Suzhou (CN); Zhen Chen, Suzhou (CN); Yonghai Liu, Suzhou (CN); Rongyang Cheng, Suzhou (CN); Yinglong Wei, Suzhou (CN)

(73) Assignee: TINECO INTELLIGENT TECHNOLOGY CO., LTD., Suzhou (CN)

( * ) Notice: Subject to any disclaimer, the term of this patent is extended or adjusted under 35 U.S.C. 154(b) by 270 days.

(21) Appl. No.: 17/611,530

(22) PCT Filed: Apr. 26, 2020

(86) PCT No.: PCT/CN2020/086961
§ 371 (c)(1),
(2) Date: Nov. 15, 2021

(87) PCT Pub. No.: WO2020/228516
PCT Pub. Date: Nov. 19, 2020

(65) Prior Publication Data

US 2023/0058126 A1 Feb. 23, 2023

(30) Foreign Application Priority Data

May 14, 2019 (CN) ......................... 201910399630.3
Sep. 30, 2019 (CN) ......................... 201910943270.9
(Continued)

(51) Int. Cl.
*A47L 9/04* (2006.01)
*A46B 13/00* (2006.01)
(Continued)

(52) U.S. Cl.
CPC .......... *A47L 9/0477* (2013.01); *A46B 13/001* (2013.01); *A46B 13/04* (2013.01);
(Continued)

(58) Field of Classification Search
CPC .... A47L 9/0477; A47L 7/0009; A47L 11/145; A47L 11/185; A47L 11/19;
(Continued)

(56) References Cited

U.S. PATENT DOCUMENTS 5,339,487 A 8/1994 Kasper
5,715,565 A 2/1998 Kern
(Continued)

FOREIGN PATENT DOCUMENTS

CH 648 741 A5 4/1985
CN 1190569 A 8/1998
(Continued)

OTHER PUBLICATIONS

European Search Report dated May 11, 2023 as received in application No. 20805480.9.
(Continued)

*Primary Examiner* — David Redding
(74) *Attorney, Agent, or Firm* — Maschoff Brennan

(57) ABSTRACT

Provided are a vacuum head, a collection bin, a cleaning tray, a filter assembly, and a cleaning apparatus. The cleaning apparatus includes: a housing, a rolling brush, and a cleaning assembly, where the cleaning assembly includes a cleaning medium inlet and a plurality of cleaning medium spray orifices; the plurality of cleaning medium spray orifices face the rolling brush, and lengths of flow channels from various cleaning medium spray orifices to the cleaning medium inlet are equal. According to the present disclosure, a cleaning medium may be sprayed to a rolling brush surface uniformly, so that the rolling brush may be cleaned com-
(Continued)

pletely, thereby improving the cleaning efficiency and the cleanliness of the rolling brush.

27 Claims, 22 Drawing Sheets

(30) Foreign Application Priority Data

| | | |
|---|---|---|
| Nov. 21, 2019 | (CN) | ......................... 201911147958.2 |
| Nov. 29, 2019 | (CN) | ......................... 201911202726.2 |
| Nov. 29, 2019 | (CN) | ......................... 201911202732.8 |
| Dec. 25, 2019 | (CN) | ......................... 201911360265.1 |

(51) Int. Cl.
*A46B 13/04* (2006.01)
*A47L 7/00* (2006.01)
*B05B 1/14* (2006.01)

(52) U.S. Cl.
CPC .............. *A47L 7/0009* (2013.01); *B05B 1/14* (2013.01); *A46B 2200/3033* (2013.01)

(58) Field of Classification Search
CPC ............. A47L 11/4016; A47L 2201/00; A47L 11/201; A47L 11/34; A47L 11/4025; A47L 11/4041; A47L 11/4088; A46B 13/001; A46B 13/04; A46B 2200/3033; B05B 1/14; B08B 1/32; B08B 1/12; B08B 3/024
See application file for complete search history.

(56) References Cited

U.S. PATENT DOCUMENTS

| | | | | |
|---|---|---|---|---|
| 2008/0148512 | A1* | 6/2008 | Beskow | ................ A47L 11/302 15/350 |
| 2009/0265876 | A1 | 10/2009 | Gardner et al. | |
| 2018/0035856 | A1 | 2/2018 | Smith | |

FOREIGN PATENT DOCUMENTS

| | | | |
|---|---|---|---|
| CN | 101141911 | A | 3/2008 |
| CN | 201064421 | Y | 5/2008 |
| CN | 201115655 | Y | 9/2008 |
| CN | 201160827 | Y | 12/2008 |
| CN | 201337425 | Y | 11/2009 |
| CN | 201759496 | U | 3/2011 |
| CN | 202341952 | U | 7/2012 |
| CN | 202751334 | U | 2/2013 |
| CN | 203029148 | U | 7/2013 |
| CN | 203059587 | U | 7/2013 |
| CN | 203207962 | U | 9/2013 |
| CN | 103369996 | A | 10/2013 |
| CN | 203303852 | U | 11/2013 |
| CN | 104083127 | A | 10/2014 |
| CN | 204931569 | U | 1/2016 |
| CN | 204944263 | U | 1/2016 |
| CN | 205514394 | U | 8/2016 |
| CN | 106466149 | A | 3/2017 |
| CN | 205988910 | U | 3/2017 |
| CN | 206102580 | U | 4/2017 |
| CN | 206151382 | U | 5/2017 |
| CN | 206507899 | U | 9/2017 |
| CN | 107377441 | A | 11/2017 |
| CN | 107495904 | A | 12/2017 |
| CN | 207384228 | U | 5/2018 |
| CN | 207412117 | U | 5/2018 |
| CN | 108402989 | A | 8/2018 |
| CN | 108420370 | A | 8/2018 |
| CN | 207928286 | U | 10/2018 |
| CN | 108720753 | A | 11/2018 |
| CN | 108742359 | A | 11/2018 |
| CN | 109171549 | A | 1/2019 |
| CN | 109199220 | A | 1/2019 |
| CN | 109199225 | A | 1/2019 |
| CN | 208435476 | U | 1/2019 |
| CN | 109316138 | A | 2/2019 |
| CN | 208709743 | U | 4/2019 |
| CN | 208709748 | U | 4/2019 |
| CN | 208740872 | U | 4/2019 |
| CN | 208784623 | U | 4/2019 |
| CN | 109893034 | A | 6/2019 |
| CN | 209032135 | U | 6/2019 |
| CN | 209153492 | U | 7/2019 |
| CN | 110236451 | A | 9/2019 |
| CN | 110279354 | A | 9/2019 |
| CN | 111067421 | A | 4/2020 |
| CN | 111329422 | A | 6/2020 |
| DE | 20 2009 006 370 | U1 | 7/2009 |
| EP | 2 959 818 | A1 | 12/2015 |
| GB | 1139105 | A | 1/1969 |
| JP | H09-94198 | A | 4/1997 |
| JP | H10194652 | A | 7/1998 |
| JP | 2000-060785 | A | 2/2000 |
| WO | 2006/098898 | A2 | 9/2006 |
| WO | 2007/107681 | A2 | 9/2007 |
| WO | 2014137168 | A1 | 9/2014 |

OTHER PUBLICATIONS

CN Office Action dated Jun. 12, 2023 as received in Application No. 201910399630.3.
CN Office Action dated Apr. 15, 2024 as received in Application No. 201911202726.2.
Extended European Search Report dated Feb. 5, 2025 as received in Application No. 24209169.2.

* cited by examiner

CLEANING APPARATUS

FIELD

The present disclosure relates to the field of cleaning device, and more particularly relates to a vacuum head, a collection bin, a cleaning tray, a filter assembly, and a cleaning apparatus.

BACKGROUND

In recent years, cleaning device with sweeping and dust-collecting functions has been gradually widely used in people's lives. For this device, a cleaning cylinder is driven by the running of a motor to come in close contact with the ground, so that wastes, dust, and other kinds of dirt on ground are cleaned, and then, are sucked into a dust collection bin under negative pressure from the motor, an air pump or other apparatuses to achieve cleaning to the ground.

SUMMARY

A cleaning cylinder in cleaning device may get dirty due to contact with the ground for sucking dirt in long-term use. In order to clean the cleaning cylinder, the prior art generally provides two methods, i.e. a method for detachably cleaning a cleaning cylinder and a method for automatically cleaning a cleaning cylinder in cleaning device. The method for detachably cleaning a cleaning cylinder is to detach and then clean the cleaning cylinder, but the detachment operation process of this method is relatively complicated, and the service life of the cleaning device will be reduced by repeated detachment. For the method for automatically cleaning the cleaning cylinder in cleaning device, clear water is sprayed to the cleaning cylinder via a water spraying apparatus in the cleaning device so as to clean the cleaning cylinder. However, the water spraying apparatus fails to spray clear water to the cleaning cylinder evenly in such method, resulting in excessive or insufficient local cleaning in the cleaning cylinder arising from the unevenness of the overall cleaning of the cleaning cylinder. Therefore, a surface to be cleaned is difficult to clean during the operation (ground cleaning) of the cleaning cylinder that has not been cleaned up yet, and the cleaning cylinder that has not been cleaned up yet may easily cause secondary pollution to the surface to be cleaned.

Accordingly, how to uniformly and thoroughly clean a cleaning cylinder and improve the cleaning efficiency of the cleaning cylinder are problems to be solved urgently by those skilled in the art. In face of the technical problems of how to uniformly and thoroughly clean a cleaning cylinder and improve the cleaning efficiency of the cleaning cylinder, embodiments of the present disclosure provide a cleaning apparatus and a ground cleaner to uniformly and thoroughly clean a cleaning cylinder and improve the cleaning efficiency of the cleaning cylinder.

The embodiments of the present disclosure provide a cleaning apparatus, including: a housing, a rolling brush, and a cleaning assembly; where, the cleaning assembly includes a cleaning medium inlet and a plurality of cleaning medium spray orifices; and the plurality of cleaning medium spray orifices faces the rolling brush, and lengths of flow channels from the cleaning medium spray orifices to the cleaning medium inlet are equal.

The embodiments of the present disclosure further provide a ground cleaner, including: a handle main body and a cleaning apparatus connected with the handle main body; where the cleaning apparatus includes: a housing, a rolling brush, and a cleaning assembly, and where the cleaning assembly includes a cleaning medium inlet and a plurality of cleaning medium spray orifices; and the plurality of cleaning medium spray orifices face the rolling brush, and lengths of flow channels from the cleaning medium spray orifices to the cleaning medium inlet are equal.

Optionally, in the embodiments of the above cleaning apparatus and ground cleaner, the cleaning medium spray orifices include at least first-layer cleaning medium spray orifices and second-layer cleaning medium spray orifices in sequence along extending directions of the flow channels, where the first-layer cleaning medium spray orifices are connected with the cleaning medium inlet, the second-layer cleaning medium spray orifices are overlaid with the first-layer cleaning medium spray orifices through flow channel branches correspondingly connected with the second-layer cleaning medium spray orifices, lengths of the flow channel branches therebetween are equal, and a number of the cleaning medium spray orifices of a corresponding layer increases as the layer increases.

Optionally, in the embodiments of the above cleaning apparatus and ground cleaner, the flow channel branches respectively correspondingly connected between the first-layer cleaning medium spray orifices and the second-layer cleaning medium spray orifices are located in one plane, and the first-layer cleaning medium spray orifices are overlaid with the second-layer cleaning medium spray orifices in the plane.

Optionally, in the embodiments of the above cleaning apparatus and ground cleaner, the flow channel branches respectively correspondingly connected between the first-layer cleaning medium spray orifices and the second-layer cleaning medium spray orifices are located in different planes, and the first-layer cleaning medium spray orifices are overlaid with the second-layer cleaning medium spray orifices in different planar spaces.

Optionally, in the embodiments of the above cleaning apparatus and ground cleaner, the number of the cleaning medium spray orifices of the corresponding layer is two to the N, and the N is the layer where the cleaning medium spray orifices are located.

Optionally, in the embodiments of the above cleaning apparatus and ground cleaner, at least part of the cleaning medium spray orifices are arranged along an axial direction of the rolling brush at equal intervals.

Optionally, in the embodiments of the above cleaning apparatus and ground cleaner, a liquid extruder is further included. The liquid extruder is arranged on the housing and above the cleaning medium spray orifices, and contacts a rolling brush surface along the axial direction of the rolling brush.

Optionally, in the embodiments of the above cleaning apparatus and ground cleaner, a groove is further included. The groove is arranged between the liquid extruder and the cleaning medium spray orifices and extends along the axial direction of the rolling brush, and a contact surface of the groove contacts the rolling brush surface.

Optionally, in the embodiments of the above cleaning apparatus and ground cleaner, a dirt remover is further included. The dirt remover is arranged on the housing and below the cleaning medium spray orifices, and contacts the rolling brush surface along the axial direction of the rolling brush.

Optionally, in the embodiments of the above cleaning apparatus and ground cleaner, an air suction pipeline is further included. An air suction port of the air suction pipeline faces the rolling brush and is located below the dirt remover.

Compared with the prior art, the cleaning apparatus and the ground cleaner provided in the embodiments of the present disclosure have the following advantages: the embodiments of the present disclosure providing a cleaning apparatus or a ground cleaner, which includes: a housing, a rolling brush, and a cleaning assembly; the cleaning assembly including a cleaning medium inlet and a plurality of cleaning medium spray orifices; and the plurality of cleaning medium spray orifices face the rolling brush, and lengths of flow channels from various cleaning medium spray orifices to the cleaning medium inlet being equal. According to the embodiments of the present disclosure, a cleaning medium may be uniformly sprayed to the rolling brush surface to thoroughly clean the rolling brush, thereby improving the cleaning efficiency and the cleanliness of the rolling brush.

An existing cleaner at work may suck water and solid matter into a collection bin at the same time, which is convenient and quick, reduces the labor intensity, and is accepted by the market. However, sucking water and solid matter into the collection bin at the same time causes the mixing of solid and liquid waste in the collection bin. When treating such mixed solid-liquid waste, people often pour sewage containing solid matter directly into a sewer or a toilet, but the solid matter in the collection bin easily causes the blockage of the sewer or the toilet, which brings inconvenience to people.

In view of the above problems, the embodiments of the present disclosure provide a collection bin and a cleaning apparatus to solve the above problems. On the one hand, a filtering plate on a separation apparatus is used to filter matter in the collection bin to realize separation of different matter in the collection bin, thereby achieving separate treatment of different matter.

Embodiments of the present disclosure provide a collection bin, which includes: a bin main body provided with a mounting structure therein, and a separation apparatus including a filtering plate. The separation apparatus is detachably connected with the mounting structure, and the filtering plate is located on a pouring path of the bin main body.

Accordingly, the embodiments of the present disclosure further provide a cleaning apparatus, which includes: a body having an accommodation cavity, and a collection bin located in the accommodation cavity. The collection bin includes: a bin main body having a mounting structure therein, and a separation apparatus including a filtering plate, where the separation apparatus is detachably connected with the mounting structure; and the filtering plate is located on a pouring path of the bin main body.

Optionally, in the embodiments of the above collection bin and cleaning apparatus, the separation apparatus further includes a connecting bracket, where the filtering plate is arranged on the connecting bracket, and the connecting bracket extends into the bin main body and is connected with the mounting structure.

Optionally, in the embodiments of the above collection bin and cleaning apparatus, the filtering plate is located at a pouring port of the bin main body and covers at least a part of the pouring port; and part of an edge of the filtering plate abuts against an upper end surface of the pouring port.

Optionally, in the embodiments of the above collection bin and cleaning apparatus, the filtering plate is located in the bin main body and covers at least a part of a pouring port of the bin main body; and part of an edge of the filtering plate abuts against an inner wall of the bin main body.

Optionally, in the embodiments of the above collection bin and cleaning apparatus, a notch is formed at an edge, abutting against the inner wall of the bin main body, of the filtering plate, and the notch and the inner wall of the bin main body form a through hole.

Optionally, in the embodiments of the above collection bin and cleaning apparatus, an air guiding pipe is arranged in the bin main body, and the air guiding pipe is the mounting structure.

Optionally, in the embodiments of the above collection bin and cleaning apparatus, the connecting bracket includes at least two supporting arms and a sleeving part, where one end of the at least two supporting arms is connected with the filtering plate, and the other end of the at least two supporting arms is connected with the sleeving part; the sleeving part is sleeved on the air guiding pipe, and the air guiding pipe is located between the at least two supporting arms.

Optionally, in the embodiments of the above collection bin and cleaning apparatus, the at least two supporting arms are elastic and clamp the air guiding pipe; and/or, the sleeving part is elastic and clamps the air guiding pipe.

Optionally, in the embodiments of the above collection bin and cleaning apparatus, an anti-skid structure is arranged on an inner wall surface of the connecting bracket, the connecting bracket is sleeved on the air guiding pipe, and the anti-skid structure abuts against the air guiding pipe tightly.

Optionally, in the embodiments of the above collection bin and cleaning apparatus, the sleeving part is of a first arc-shaped structure which has an arc matching an arc of an outer wall of the air guiding pipe.

Optionally, in the embodiments of the above collection bin and cleaning apparatus, a limiting structure is arranged on the connecting bracket, and the limiting structure abuts against the air guiding pipe to limit a mounting position of the connecting bracket relative to the air guiding pipe.

Optionally, in the embodiments of the above collection bin and cleaning apparatus, the limiting structure is connected with the at least two supporting arms and located between the sleeving part and the filtering plate; and when the connecting bracket is connected with the air guiding pipe, the limiting structure abuts against a port of the air guiding pipe.

Optionally, in the embodiments of the above collection bin and cleaning apparatus, the limiting structure is of a second arc-shaped structure which has an arc matching an arc of a port of the air guiding pipe.

Optionally, in the embodiments of the above collection bin and cleaning apparatus, the separation apparatus includes an operating part, the operating part is located at an opposite side of the connecting bracket, and the operating part extends away from the connecting bracket.

According to the technical solutions provided in the embodiments of the present disclosure, on the one hand, the separation apparatus is arranged on the bin main body, and when matter in the bin is poured out via the pouring path of the bin main body, the matter in the bin may be filtered by the filtering plate on the separation apparatus, part of the matter in the bin is poured out after passing through the filtering plate, and part of the matter is isolated in the bin, so that separate treatment of different matter is achieved, a guarantee for subsequent treatment is provided, and the cleaning efficiency is improved. Meanwhile, the separation apparatus is connected with the mounting structure, which may enhance the connection stability of the separation apparatus and prevent the separation apparatus from being separated from the bin main body when matter in the bin main body is poured out.

With the development of science and technology, in order to facilitate people's lives, a variety of movable cleaning device, such as cleaners and dust collectors, has been widely used in people's lives. In most cleaners or dust collectors currently used, a collection bin is usually separated from a main machine body, so as to facilitate cleaning of waste in the collection bin. In order to guarantee the tightness between the collection bin and the main machine body, a sealing ring is usually mounted on the collection bin to seal a connecting part of the collection bin and the main machine body, so that a suction force of the main machine body may be transferred into the collection bin entirely to allow the collection bin to collect waste in a pipeline.

However, in the existing cleaners or dust collectors, after the collection bin is connected with the main machine body, sometimes air leakage will occur to affect the tightness between the collection bin and the main machine body. Thus, the suction force of the main machine body cannot be transferred into the collection bin entirety, thereby affecting waste collection of the collection bin from the pipeline.

In view of the above problems, the embodiments of the present disclosure further provide a collection bin, a filter assembly, and a cleaning apparatus to solve the above problems. A first curled edge and a second curled edge of a sealing ring extend in a direction opposite to an assembly direction, and are not curled reversely during assembly, thereby avoiding air leakage caused by reverse curling of the curled edges of the sealing ring, and preventing a sealing effect of the collection bin from being affected.

An embodiment of the present disclosure provides a collection bin, which includes: a bin body having an air outlet, and a sealing ring surrounding a periphery of the air outlet. A second curled edge and a first curled edge are respectively formed at the front and the rear of the sealing ring along an assembly direction of the bin body, and extending directions of the first curled edge and the second curled edge are opposite to the assembly direction.

Optionally, the first curled edge extends away from a central axis of the sealing ring; and the second curled edge extends towards the central axis of the sealing ring.

Optionally, the sealing ring further has a third curled edge formed between the first curled edge and the second curled edge; and the third curled edge extends away from the central axis of the sealing ring.

Optionally, the third curled edge is connected with the first curled edge and the second curled edge, respectively; and the first curled edge, the second curled edge, and the third curled edge surround the periphery of the air outlet.

Optionally, the sealing ring is connected with the bin body.

Optionally, the bin body includes a receiving cavity communicated with the air outlet and a filter assembly arranged in the receiving cavity, and the sealing ring is connected with the filter assembly.

Optionally, the filter assembly is detachably connected to an interior of the receiving cavity and partially extends out of the air outlet; and the sealing ring is connected with the part, extending out of the air outlet, of the filter assembly.

Optionally, the filter assembly includes a bracket and a filter, where the filter is connected with the bracket and located in the receiving cavity; part of the bracket is located in the receiving cavity and connected with the bin body, and part of the bracket extends out of the receiving cavity and is connected with the sealing ring.

Optionally, a first clamping part is arranged on the part, extending out of the air outlet, of the filter assembly; a second clamping part matched with the first clamping part in use is arranged on the sealing ring, and the first clamping part is detachably connected with the second clamping part.

Optionally, the air outlet is of an inclined structure; along the assembly direction, the height of the air outlet gradually decreases from back to front relative to the bin body, the height of the first curled edge is greater than that of the second curled edge; and a surface, facing the air outlet, of the filter is of an inclined structure matching the air outlet.

Accordingly, the embodiments of the present disclosure further provide a filter assembly, which includes: a filter including an air inlet surface and an air outlet surface, a bracket provided with the filter thereon, and a sealing ring connected with the bracket and surrounding a periphery of the air outlet surface. A second curled edge and a first curled edge are respectively formed at the front and the rear of the sealing ring along an assembly direction of the filter, and extending directions of the first curled edge and the second curled edge are opposite to the assembly direction.

Accordingly, the embodiments of the present disclosure further provide a cleaning apparatus, which includes: a main machine provided with a mounting cavity with an air inlet, and a collection bin including: a bin body and a sealing ring. The bin body has an air outlet; the sealing ring surrounds a periphery of the air outlet; a second curled edge and a first curled edge are respectively formed at the front and the rear of the sealing ring along an assembly direction of the bin body, and extending directions of the first curled edge and the second curled edge are opposite to the assembly direction; and the bin body enters the mounting cavity along the assembly direction and is connected with the main machine, the air outlet is communicated with the air inlet, and the sealing ring seals a gap between the air outlet and the air inlet.

According to the technical solutions provided in the embodiments of the present disclosure, the first curled edge and the second curled edge of the sealing ring extend in a direction opposite to the assembly direction, and therefore, when the collection bin is assembled along the assembly direction, even if the first curled edge and the second curled edge rub against a foreign object, they will not be curled reversely, thereby avoiding air leakage caused by reverse curling of the curled edges of the sealing ring, and preventing a sealing effect of the collection bin from being affected. With the development of science and technology, in order to facilitate people's lives, a variety of movable cleaning device, such as cleaners and dust collectors, has been widely used in people's life. During cleaning of the ground, a cleaner often faces a situation that there is water on the ground. For example, water in a water cup is accidentally poured onto the ground, water is splashed onto the ground during washing clothes, and water stains with oil are more likely to encounter on the ground of a kitchen. In case of the above situations, in order to clean the water on the ground better, a soft rubber scraper is usually arranged at the bottom of the cleaner, by which the water on the ground is cleaned more quickly to achieve higher cleanliness of the floor. However, after the existing cleaner cleans the ground with water, and the whole cleaner is shut down, a pool of water usually remains on the ground near the soft rubber scraper, which causes secondary contamination to the ground and reduces the cleaning efficiency of the cleaner.

In view of the above problems, the embodiments of the present disclosure provide a vacuum head, a cleaning apparatus, and a self-moving cleaning robot to solve the above problems. Dirt that moves from a scraper assembly to a surface to be cleaned may be stored in a first storage groove on the scraper assembly, thereby preventing dirt from remaining on a surface to be cleaned near the scraper assembly, and improving the cleaning efficiency.

An embodiment of the present disclosure provides a vacuum head, which includes: a body having a suction port at the bottom, and a scraper assembly arranged at the suction port. One end of the scraper assembly is connected with the body, and the other end of the scraper assembly faces a surface to be cleaned; and a first storage groove is formed in the scraper assembly.

Accordingly, the embodiments of the present disclosure further provide a cleaning apparatus, which includes a machine body and a vacuum head. The vacuum head includes: a body having a suction port at the bottom, and a scraper assembly arranged at the suction port, where one end of the scraper assembly is connected with the body, and the other end of the scraper assembly faces a surface to be cleaned; and a first storage groove is formed in the scraper assembly.

Accordingly, the embodiments of the present disclosure further provide a self-moving cleaning robot, which includes: a machine body having a suction port at the bottom, and a scraper assembly arranged at the suction port. One end of the scraper assembly is connected with the body, and the other end of the scraper assembly faces a surface to be cleaned; and a first storage groove is formed in the scraper assembly.

Optionally, in the embodiments of the above vacuum head, cleaning apparatus, and self-moving cleaning robot, the scraper assembly has a matter guiding surface for gathering dirt together, the first storage groove is formed in the matter guiding surface, and the suction port is located in front of the matter guiding surface.

Optionally, in the embodiments of the above vacuum head, cleaning apparatus, and self-moving cleaning robot, the first storage groove extends along a length direction of the scraper assembly.

Optionally, in the embodiments of the above vacuum head, cleaning apparatus, and self-moving cleaning robot, anti-overflow plugs are arranged at two ends, along the length direction, of the scraper assembly.

Optionally, in the embodiments of the above vacuum head, cleaning apparatus, and self-moving cleaning robot, a guide surface is arranged at an opening of the first storage groove, and dirt is guided into the first storage groove by the guide surface.

Optionally, in the embodiments of the above vacuum head, cleaning apparatus, and self-moving cleaning robot, a wall thickness of the first storage groove of the scraper assembly is less than a wall thicknesses of other parts of the scraper assembly.

Optionally, in the embodiments of the above vacuum head, cleaning apparatus, and self-moving cleaning robot, a rolling brush assembly is further included. The scraper assembly and the suction port are both located behind the rolling brush assembly, and the suction port is located between the rolling brush assembly and the scraper assembly; or, the scraper assembly and the suction port are both located in front of the rolling brush assembly, and the scraper assembly is located between the rolling brush assembly and the suction port.

Optionally, in the embodiments of the above vacuum head, cleaning apparatus, and self-moving cleaning robot, the scraper assembly includes a connecting assembly and a scraper, where the connecting assembly is connected with the body; one end of the scraper is connected with the connecting assembly, and the other end of the scraper faces a surface to be cleaned.

According to the technical solutions provided in the embodiments of the present disclosure, the scraper assembly can quickly gather dirt, such as dirty water, dust, and scraps of paper, on a surface to be cleaned together, so that the vacuum head at work can clean the surface to be cleaned more quickly to achieve higher cleanliness of the surface to be cleaned. Meanwhile, the first storage groove is formed in the scraper assembly, and dirt that moves from the scraper assembly to the surface to be cleaned can be stored in the first storage groove, thereby preventing the dirt from remaining on the surface to be cleaned near the scraper assembly, and improving the cleaning efficiency.

As people's demands for environmental sanitation increase, at present, cleaning apparatus, such as cleaners, is widely used, which is mainly divided into hand-push type surface cleaners and driving type surface cleaners.

Generally, a cleaner includes a main machine and a vacuum head, and the vacuum head includes a rolling brush and a rolling brush cover arranged above the rolling brush. A rolling brush is a main component which uses friction against a surface by rolling to achieve cleaning, and a rolling brush cover can protect the rolling brush and prevent users from touching the rolling brush by mistake. In addition, a dirt suction channel is formed in the vacuum head to suck sewage and impurities on the surface into a collection bin.

After cleaning is finished, a vacuum head of a ground cleaner with a rolling brush of the prior art is placed on a tray or the ground. However, the rolling brush is wet, and a rolling brush cover is located above the rolling brush and covers the whole rolling brush assembly together with a vacuum head surface cover and a vacuum head housing, so that the wet rolling brush assembly cannot be dried quickly, and over a long time, the rolling brush fluff will produce peculiar smell and will easily go moldy.

In view of the above problems, the embodiments of the present disclosure provide a vacuum head and a cleaner solve the above problems or solve part of the above problems.

In one aspect, the embodiments of the present disclosure provide a vacuum head, which includes:

a rolling brush. A rolling brush cover is arranged above the rolling brush, and a ventilation hole is formed in the rolling brush cover and allows outside air to contact the rolling brush.

In the other aspect, the embodiments of the present disclosure further provide a cleaner, which includes a main machine and a vacuum head. The vacuum head includes: a rolling brush, where a rolling brush cover is arranged above the rolling brush, a ventilation hole is formed in the rolling brush cover and allows outside air to contact the rolling brush.

Further, in the embodiments of the above vacuum head and cleaner, the vacuum head further includes a separator and a dirt suction channel, where the separator separates the ventilation hole from the dirt suction channel.

Further, in the embodiments of the above vacuum head and cleaner, an opening is formed at the bottom of a front side of the rolling brush cover, and the ventilation hole and the opening are communicated to form a ventilation channel.

Further, in the embodiments of the above vacuum head and cleaner, the separator extends to two ends of the rolling brush along a direction parallel to an axial direction of the rolling brush.

Further, in the embodiments of the above vacuum head and cleaner, the ventilation channel is located in front of the rolling brush, the dirt suction channel is located behind the rolling brush, and the ventilation channel is separated from the dirt suction channel by the separator.

Further, in the embodiments of the above vacuum head and cleaner, a liquid spraying apparatus is arranged behind the rolling brush and can spray a liquid to the rolling brush.

Further, in the embodiments of the above vacuum head and cleaner, the liquid spraying apparatus is located above the dirt suction channel, and a first scraper is arranged between the liquid spraying apparatus and the dirt suction channel and abuts against a rolling brush surface.

Further, in the embodiments of the above vacuum head and cleaner, a second scraper is arranged above the liquid spraying apparatus and abuts against the rolling brush surface.

Further, in the embodiments of the above vacuum head and cleaner, a force applied on the rolling brush surface by the second scraper is smaller than a force applied on the rolling brush surface by the first scraper.

Further, in the embodiments of the above vacuum head and cleaner, the first scraper and/or the second scraper extend along a radial direction of the rolling brush to abut against the rolling brush surface.

Further, in the embodiments of the above vacuum head and cleaner, the first scraper and/or the second scraper extend from one end of the rolling brush to the other end of the rolling brush along a direction parallel to the axial direction of the rolling brush.

Further, in the embodiments of the above vacuum head and cleaner, in a height direction of the vacuum head, the first scraper and the second scraper are both located between the ventilation hole and the dirt suction channel.

Further, in the embodiments of the above vacuum head and cleaner, the first scraper is in a plate shape; a side edge, away from the liquid spraying apparatus, of an end, contacting the rolling brush surface, of the first scraper is in a rounded transition; or, two side edges of the end, contacting the rolling brush surface, of the first scraper are both in a rounded transition.

Further, in the embodiments of the above vacuum head and cleaner, the second scraper is in a plate shape; a side edge, close to the liquid spraying apparatus, of an end, contacting the rolling brush surface, of the second scraper is in a rounded transition; or, two side edges of the end, contacting the rolling brush surface, of the second scraper are both in a rounded transition.

Further, in the embodiments of the above vacuum head and cleaner, the first scraper and/or the second scraper form the separator.

Further, in the embodiments of the above vacuum head and cleaner, arrangement positions of the ventilation hole include at least a top of the rolling brush cover.

Further, in the embodiments of the above vacuum head and cleaner, a plurality of ventilation holes are formed at the top of the rolling brush cover and arranged in a straight line along a direction parallel to the axial direction of the rolling brush.

Further, in the embodiments of the above vacuum head and cleaner, a front buffer is further included. The front buffer is arranged on an outer surface of a front side of the rolling brush cover.

Further, in the embodiments of the above vacuum head and cleaner, side buffers are further included. The side buffers are arranged on outer surfaces of sides of the vacuum head.

Further, in the embodiments of the above vacuum head and cleaner, the rolling brush cover includes a front cover and side covers connected to two ends of the front cover, the side buffers are arranged on outer surfaces of the side covers; or, the side buffers are arranged on outer side surfaces of the housing.

Further, in the embodiment of the above vacuum head and cleaner, if the side buffers are arranged on the outer surfaces of the side covers, the front buffer and the side buffers are integrally formed.

According to the vacuum head and the cleaner provided in the embodiments of the present disclosure, the ventilation hole is formed in the rolling brush cover and allows outside air to contact the rolling brush, and therefore, the rolling brush can be dried quickly, peculiar smell of the rolling brush is dispelled conveniently, and the rolling brush is prevented from going moldy.

With the development of science and technology, in order to facilitate people's lives, a variety of movable cleaning device, such as cleaners and dust collectors, are widely used in people's lives. An existing cleaner usually works in two modes. For example, if there is no water on a surface to be cleaned, the cleaner works in a wet mode, that is, the cleaner sprays water to the ground or a rolling brush, cleans the ground through the rolling brush, and sucks sewage into the cleaner. For another example, if there is liquid, such as water, on the surface to be cleaned, the cleaner can work in a dry mode, that is, the cleaner cleans the ground through the rolling brush and then sucks sewage into the cleaner. During cleaning, the cleaner mainly cleans a surface to be cleaned, such as the ground, through the rolling brush on the cleaner. After the cleaning is finished, the rolling brush usually becomes dirty, so it is necessary to clean the rolling brush for the next cleaning.

In the above cleaning scenarios, or after the rolling brush is cleaned, liquid will remain on the rolling brush, and in order to prevent the liquid from flowing onto a surface to be cleaned such as the ground, the cleaner is usually equipped with a tray. The rolling brush is placed in the tray, so the liquid on the rolling brush may flow into the tray. However, when an existing tray and a cleaner are matched in use, sewage on the rolling brush flows into the tray and scatters on a surface of the tray irregularly, so users need to clean the tray later, which increases the workload of the users.

In view of the above problems, the embodiments of the present disclosure further provide a cleaning tray and a cleaner assembly to solve the above problems. The cleaning tray allows sewage to flow only in a water collection groove through a water blocking rib, which prevents the sewage from contaminating other areas of the cleaning tray.

An embodiment of the present disclosure provides a cleaning tray, which includes: a tray body having an accommodating groove with a bearing platform and a water collection groove, and a water blocking rib arranged at the bottom of the accommodating groove and separating the bearing platform from the water collection groove.

Optionally, the position of the water collection groove is adapted to the position of a rolling brush of a cleaner. When the cleaner is placed on the bearing platform, the rolling brush of the cleaner is suspended in the water collection groove, and the water collection groove and a housing of the cleaner form a rinsing channel through which water flows along an outer side surface of the rolling brush.

Optionally, the water blocking rib is arranged below or behind a suction port of the cleaner.

Optionally, the height of the water collection groove is less than that of the bearing platform; and the height of the bearing platform gradually decreases along a direction from the bearing platform to the water collection groove.

Optionally, a gap is formed between at least one of two ends of the water blocking rib and a wall of the accommodating groove, and the gap penetrates through the bearing platform and the water collection groove.

Optionally, a side, facing the bearing platform, of the water blocking rib has a flow guiding surface for guiding liquid from the water blocking rib to the gap.

Optionally, the bearing platform is provided with limiting grooves for accommodating rollers of the cleaner.

Optionally, the water collection groove includes at least a first water collection plate and a second water collection plate;

The first water collection plate is of a straight plate structure with one end connected with the water blocking rib and the other end connected with one end of the second water collection plate; and the height of the first water collection plate gradually decreases along a direction from the water blocking rib to the second water collection plate.

Optionally, the second water collection plate is of a straight plate structure, a third water collection plate is further arranged between the first water collection plate and the second water collection plate. The third water collection plate is of an arc-shaped structure, is sunken away from an opening of the water collection groove, and is in smooth transition connection with the first water collection plate and the second water collection plate, respectively.

Accordingly, the embodiments of the present disclosure further provide a cleaner assembly, which includes a cleaner and a cleaning tray. The cleaner includes a housing and a rolling brush mounted on the housing; the cleaning tray includes: a tray body having an accommodating groove with a bearing platform and a water collection tank, and a water blocking rib arranged at the bottom of the accommodating groove and separating the bearing platform from the water collection groove.

Optionally, the position of the water collection tank is adapted to the position of the rolling brush. When the cleaner is placed on the bearing platform, the rolling brush is suspended in the water collection groove, and the water collection groove and the housing form a rinsing channel through which water flows along an outer side surface of the rolling brush.

Optionally, a water spraying assembly and a suction assembly are further arranged in the housing. A suction port of the suction assembly is arranged at the bottom of the housing, and when the rolling brush is suspended in the water collection groove, the suction port is located in the water collection groove.

In addition, optionally, a scraper is further arranged at the bottom of the housing; the suction port is located between the scraper and the rolling brush, and when the rolling brush is suspended in the water collection groove, the scraper is suspended in the water collection groove.

According to the technical solutions provided in the embodiments of the present disclosure, the cleaning tray and the cleaner can be matched in use, the bearing platform is configured to bear the cleaner, and the water collection groove is configured to collect sewage on the cleaner. Meanwhile, the water blocking rib can effectively prevent water in the water collection groove from flowing into the bearing platform, and allow the sewage to flow only in the water collection groove, thereby preventing the sewage from contaminating other areas of the cleaning tray. In addition, with the cleaning tray and a suction function of the cleaner, an aim of no water residue in the cleaning tray can be achieved.

BRIEF DESCRIPTION OF THE DRAWINGS

The drawings described herein are used to provide a further understanding of the present disclosure and form a part of the present disclosure. Exemplary embodiments of the present disclosure and descriptions thereof are used to explain the present disclosure and not intended to form an improper limitation to the present disclosure. In the drawings.

DETAILED DESCRIPTION OF EXAMPLE EMBODIMENTS

In order to make the objectives, technical solutions and advantages of the present disclosure clearer, the technical solutions of the present disclosure will be clearly and completely described below in conjunction with specific embodiments and the corresponding drawings of the present disclosure. Apparently, the described embodiments are part of but not all of the embodiments of the present disclosure. All other embodiments obtained by those of ordinary skill in the art on the basis of the embodiments in the present disclosure without involving creative effort shall fall within the scope of protection of the present disclosure.

Embodiment 1

Figure 1:
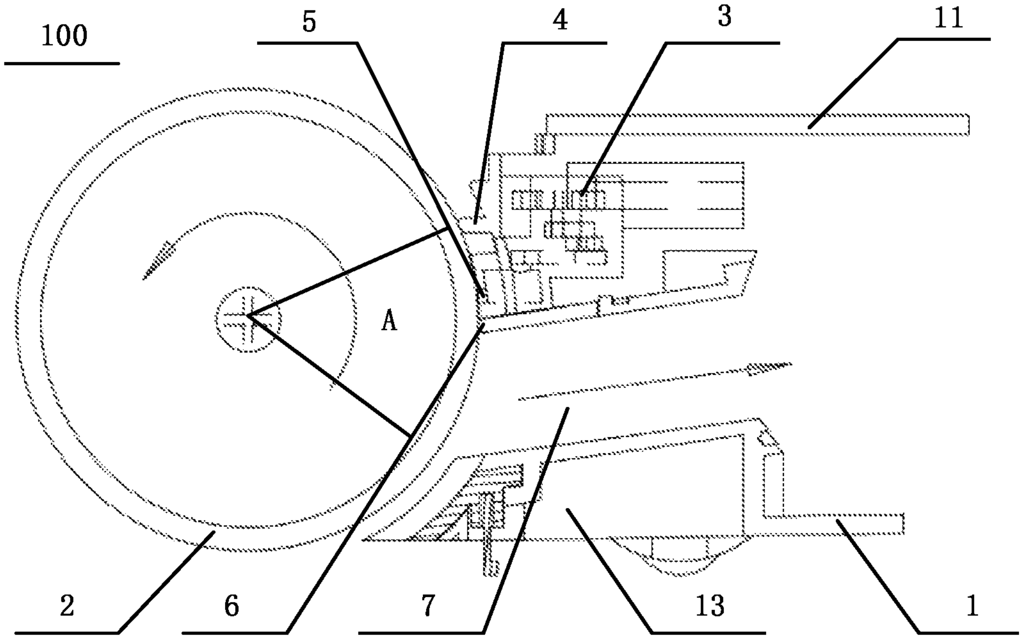
FIG. 1 is a schematic structural diagram of a cleaning apparatus according to an embodiment of the present disclosure.

Embodiment 1 of the present disclosure provides a cleaning apparatus 100. FIG. 1 is a schematic structural diagram of the cleaning apparatus 100 provided in Embodiment 1 of the present disclosure, and FIG. 2 is a stereogram of the cleaning apparatus provided in Embodiment 1 of the present disclosure.

Figure 2:
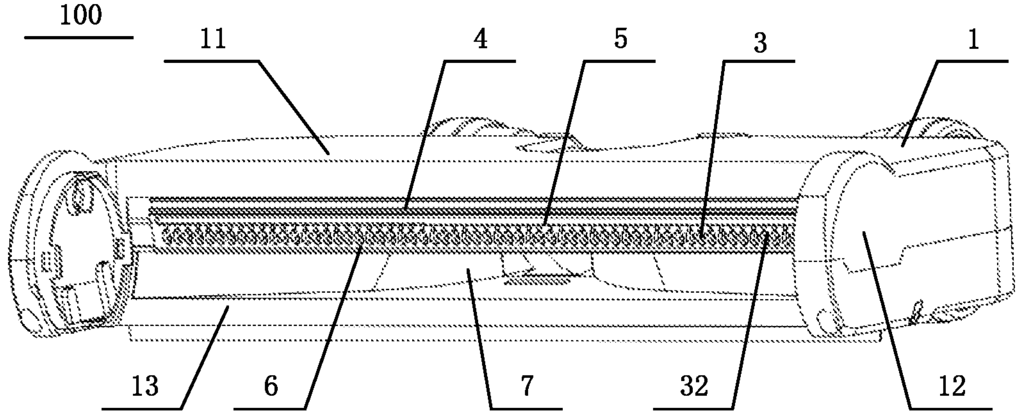
FIG. 2 is a stereogram of the cleaning apparatus according to an embodiment of the present disclosure.

As shown in FIG. 1 and FIG. 2, the embodiment of the present disclosure provides a cleaning apparatus 100, which includes: a housing 1, a rolling brush 2, and a cleaning assembly 3. The housing 1 includes a front end housing (not shown), a supporting housing 11, a side plate cover 12, and a base housing 13, where the front end housing is arranged at the front of the housing 1 and is of an arc-shaped structure capable of accommodating and mounting the rolling brush 2, and the rolling brush 2 is arranged in the front end housing through the side plate cover 12 and capable of rotating relative to the front end housing; the supporting housing 11 is connected with the front end housing and arranged away from the rolling brush 2 along a horizontal direction; the base housing 13 is connected with the supporting housing 11 and located a lower part of the housing 1; an air suction pipeline 7 is arranged in an area between the supporting housing 11 and the base housing 13, an air suction port of the air suction pipeline 7 is close to and faces a rolling brush surface, and is lower than a central axis of the rolling brush 2, so that dirt (solid or liquid) can be sucked into the air suction pipeline 7 when falling from the rolling brush surface and can be collected by the air suction pipeline 7 into a solid collection bin and a liquid collection bin that are connected with the air suction pipeline 7, which can prevent the dirt falling from the rolling brush surface from falling onto the ground again and avoid secondary pollution to a surface to be cleaned. With continuous reference to FIG. 1, the cleaning apparatus 100 of the present embodiment is designed to achieve uniform cleaning of the rolling brush 2. The cleaning apparatus 100 cleans dirt on a surface to be cleaned (e.g. the ground) through the rolling brush 2, the rolling brush surface will become dirty after cleaning the dirt, and thus the rolling brush 2 needs to be cleaned thoroughly by the cleaning assembly 3. Specifically, the rolling brush 2 can be cleaned only under the cooperation of the rolling brush 2 and the cleaning assembly 3, and the cleaning assembly 3 has a specific position area corresponding to the rolling brush surface. An area where the rolling brush 2 cooperates with the cleaning assembly 3 is set as a cleaning area (a fan-shaped area with a center of the rolling brush 2 facing the horizontal direction, i.e. an area A in FIG. 1); and when the rolling brush surface passes through the cleaning area of the rolling brush 2 with the rotation (in an arrow direction) of the rolling brush 2, the cleaning assembly 3 cleans the rolling brush surface to make the rolling brush surface clean.

Specifically, as shown in FIG. 1 and FIG. 2, the cleaning assembly 3 is arranged on the supporting housing 11, faces the rolling brush 2, is higher than the central axis of the rolling brush 2, and is located above the air suction pipeline 7, so that the cleaning assembly 3 cleans an end surface of the rolling brush 2 conveniently, and dirt falling from the rolling brush surface after cleaning falls into the air suction pipeline 7, and is collected by the air suction pipeline 7 into the solid collection bin and the liquid collection bin that are connected with the air suction pipeline 7, which may prevent the dirt falling from the rolling brush surface from falling onto the ground again and avoid secondary contamination to the ground.

In the present embodiment, the cleaning assembly 3 includes a cleaning medium inlet 31 and a plurality of cleaning medium spray orifices 32, where the cleaning medium inlet 31 is configured to fill a cleaning medium for cleaning the rolling brush 2, the plurality of cleaning medium spray orifices 32 are configured to release the cleaning medium for cleaning the rolling brush 2, the cleaning medium inlet 31 is communicated with the plurality of cleaning medium spray orifices 32, so that the cleaning medium entering the cleaning medium inlet 31 is sprayed out of the cleaning medium spray orifices 32. In the present embodiment, one cleaning medium inlet 31 is provided, so that the medium for cleaning the rolling brush 2 can be filled more intensively to facilitate filling operation, and the time for the cleaning medium to flow from the cleaning medium inlet 31 to the plurality of cleaning medium spray orifices 32 is equal to allow the cleaning medium to be uniformly sprayed onto the rolling brush surface by the plurality of cleaning medium spray orifices 32. Lengths of flow channels between the cleaning medium inlet 31 and the plurality of cleaning medium spray orifices 32 are equal. Of course, a plurality of cleaning medium inlets 31 may be provided as long as the amounts of the cleaning medium reaching the plurality of cleaning medium spray orifices 32 are equal, which shall fall within the scope of protection of the embodiment of the present disclosure. The plurality of cleaning medium spray orifices 32 are provided to increase a coverage area of the cleaning medium spray orifices 32 on the rolling brush surface, so that a contact area of the sprayed cleaning medium and the rolling brush surface is increased and uniform to further improve a cleaning effect on the rolling brush 2.

It should be noted that the cleaning medium of the present embodiment may be a liquid, a gas, or a gas-liquid mixture. In the present embodiment, the rolling brush surface can be cleaned by a liquid sprayed out of the cleaning medium spray orifices 32, or in the present embodiment, the rolling brush surface can be cleaned by a gas sprayed out of the cleaning medium spray orifices 32, or in the present embodiment, the rolling brush surface may be cleaned by a gas-liquid mixture sprayed out of the cleaning medium spray orifices 32.

In a preferable solution of the present embodiment, the plurality of cleaning medium spray orifices 32 face the rolling brush surface, and at least part of the cleaning medium spray orifices 32 are arranged along an axial direction of the rolling brush 2 at equal intervals. It can be understood that in the present embodiment, the plurality of the cleaning medium spray orifices 32 are provided and rotate about the axial direction relative to the rolling brush 2, and at least part of the cleaning medium spray orifices 32 are arranged along the axial direction of the rolling brush 2, so that this part of the cleaning medium spray orifices 32 cover a straight line along the axial direction of the rolling brush surface, and this part of the cleaning medium spray orifices 32 arranged along the axial direction can cover the entire rolling brush surface with the rotation of the rolling brush 2. The intervals between the cleaning medium spray orifices 32 are set to be equal to make various cleaning medium spray orifices 32 in the straight line along the axial direction uniformly and continuously cover the rolling brush surface, so as to uniformly spray the cleaning medium onto the entire rolling brush surface.

Figure 3:
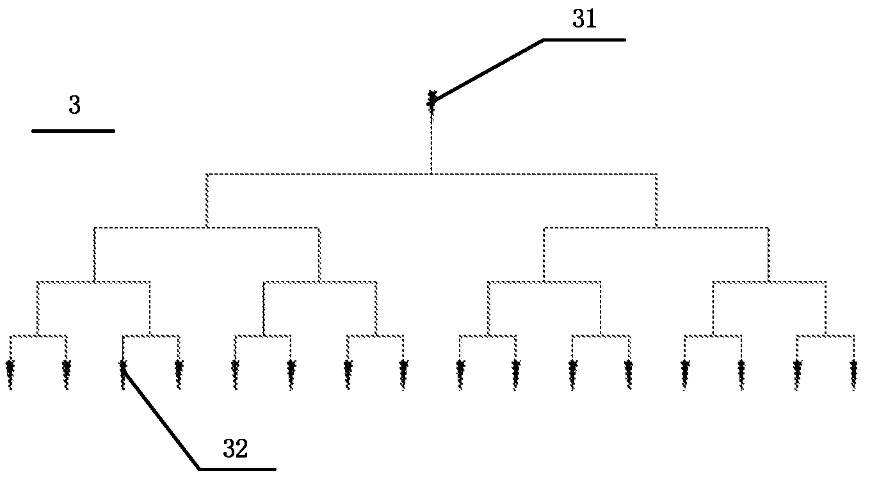
FIG. 3 and FIG. 4 are schematic diagrams of a cleaning assembly of the cleaning apparatus according to an embodiment of the present disclosure.

It should be noted that in the present embodiment, the cleaning medium can be sprayed onto the entire rolling brush surface mainly by right of the principle of flow channel balance. FIG. 3 is a schematic diagram of uniform flow channels of the cleaning assembly 3, and as shown in FIG. 3, lengths of flow channels from various cleaning medium spray orifices 32 arranged along the axial direction of the rolling brush 2 to the cleaning medium inlet 31 are equal, so that the amounts of the cleaning medium sprayed out of various cleaning medium spray orifices 32 are substantially equal, the cleaning medium is uniformly sprayed onto the entire rolling brush surface to achieve complete cleaning of rolling brush 2 and improve the cleaning effect.

In the present embodiment, as shown in FIG. 3, in order to make the cleaning medium sprayed out of the plurality of cleaning medium spray orifices 32 uniform, the cleaning medium spray orifices 32 are designed to be of a multi-layer structure, and the number of the cleaning medium spray orifices 32 of the corresponding layer is increased with increase of the layer, that is, the number of the layer of the cleaning medium spray orifices 32 is gradually increased along an extending direction of the flow channel. In the present embodiment, the cleaning medium spray orifices 32 include at least first-layer cleaning medium spray orifices 321 and second-layer cleaning medium spray orifices 322 in sequence along the extending direction of the flow channel, where the first-layer cleaning medium spray orifices 321 are connected with the cleaning medium inlet 31, and the second-layer cleaning medium spray orifices 321 are overlaid with the first-layer cleaning medium spray orifices 321 through flow channel branches correspondingly connected with the second-layer cleaning medium spray orifices 322, and lengths of the flow channel branches therebetween are equal; the number of the cleaning medium spray orifices 32 of the corresponding layer is increased with increase of the layer; the number of the cleaning medium spray orifices 32 of the corresponding layer is 2 to the N, and N is the layer where the cleaning medium spray orifices 32 are located. For example, for the first-layer cleaning medium spray orifices 321 directly connected with the cleaning medium inlet 31, N is 1, so the number of the first-layer cleaning medium spray orifices 321 is 2; for another example, for the second-layer cleaning medium spray orifices 322 connected with the first-layer cleaning medium spray orifices 321, N is 2, so the number of the second-layer cleaning medium spray orifices 322 is 4.

That is, the longer the flow channel extends, the more the layers. Meanwhile, the flow channels of various layers are divided into a plurality of branches, and lengths of the flow channel branches of the same layer are equal, so that the lengths of the flow channels between the cleaning medium spray orifices 32 of various layers and the cleaning medium inlet 31 are equal. Furthermore, specifications of the flow channels are the same, so that the cleaning medium sprayed out of the plurality of cleaning medium spray orifices 32 is more uniform. It should be noted that based on the multi-layer structure of the cleaning medium spray orifices 32, the cleaning medium spray orifices 32 of various layers are overlaid, that is, all the cleaning medium spray orifices 32 of one layer as a whole are overlaid with all the cleaning medium spray orifices 32 of another layer as a whole.

Figure 5:
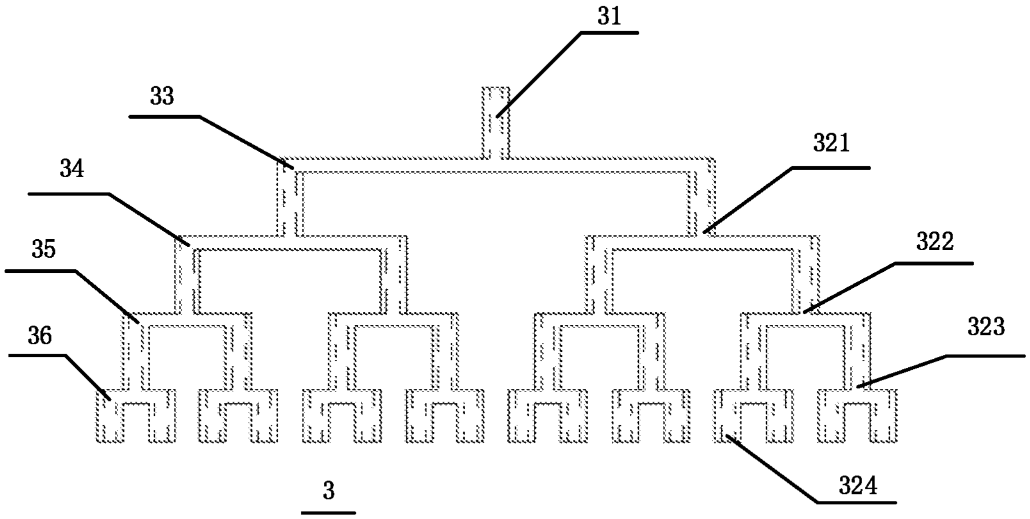
FIG. 5 is a schematic structural diagram of a cleaning assembly of the cleaning apparatus according to an embodiment of the present disclosure.

In the present embodiment, the cleaning medium spray orifices 32 overlaid by taking the layer as a whole are of the following two structures, that is, the cleaning assembly 3 is of two structures; as shown in FIG. 1 and FIG. 5, a first structure of the cleaning assembly 3 is that the flow channel branches correspondingly connected with the cleaning medium spray orifices 32 of various layers are located in the same plane, and the cleaning medium spray orifices 32 of various layers are overlaid in the same plane and face the rolling brush 2. Specifically, as shown in FIG. 5, the cleaning medium spray orifices 32 of the cleaning assembly 3 are arranged at four layers, i.e. first-layer cleaning medium spray orifices 321, second-layer cleaning medium spray orifices 322, third-layer cleaning medium spray orifices 323, and fourth-layer cleaning medium spray orifices 324, where the first-layer cleaning medium spray orifices 321 are communicated with the cleaning medium inlet 31 through first-layer flow channel branches 33, the second-layer cleaning medium spray orifices 322 are arranged below and connected with the first-layer cleaning medium spray orifices 321 through second-layer flow channel branches 34, the third-layer cleaning medium spray orifices 323 are arranged below and connected with the second-layer cleaning medium spray orifices 322 through third-layer flow channel branches 35, the fourth-layer cleaning medium spray orifices 324 are arranged below and connected with the third-layer cleaning medium spray orifices 323 through fourth-layer flow channel branches 36, the cleaning medium spray orifices 32 of various layers face the rolling brush surface, and the cleaning medium is sprayed onto the rolling brush surface by the fourth-layer cleaning medium spray orifices 324. The first-layer cleaning medium spray orifices 321 have 2 cleaning medium spray orifices 32, the second-layer cleaning medium spray orifices 322 have 4 cleaning medium spray orifices 32, the third-layer cleaning medium spray orifices 323 have 8 cleaning medium spray orifices 32, and the fourth-layer cleaning medium spray orifices 324 have 16 cleaning medium spray orifices 32. It can be understood that it may have more layers for the cleaning medium spray orifices 32, and also have more corresponding cleaning medium spray orifices 32, which shall fall within the scope of protection of the present embodiment.

It should be noted that the flow channel branches of the four layers are located in the same plane, and the cleaning medium spray orifices 32 of the four layers are overlaid in the same plane. For example, in a radial direction of the rolling brush 2, only the fourth-layer cleaning medium spray orifices 324 may be observed by taking the fourth-layer cleaning medium spray orifices 324 as a starting point of observation (from bottom to top in FIG. 5); or in the radial direction of the rolling brush 2, only the cleaning medium spray orifices 32 distributed in a straight line can be observed by taking the cleaning medium inlet 31 as a starting point of observation (from top to bottom in FIG. 5).

It should also be noted that lengths of the flow channel branches of the four layers may be set to be equal, that is, the lengths of the flow channel branches of the four layers from the first-layer flow channel branches 33 to the fourth-layer flow channel branches 36 are equal; or the lengths of the flow channel branches of various layers are set to be unequal, that is, the lengths of the first-layer flow channel branches 33, the second-layer flow channel branches 34, the third-layer flow channel branches 35, and the fourth-layer flow channel branches 36 are unequal, as long as the lengths of the flow channel branches of the same layer are equal. For example, 8 third-layer flow channel branches 35 are provided, ant lengths of the 8 third-layer flow channel branches 35 are equal.

Figure 6:
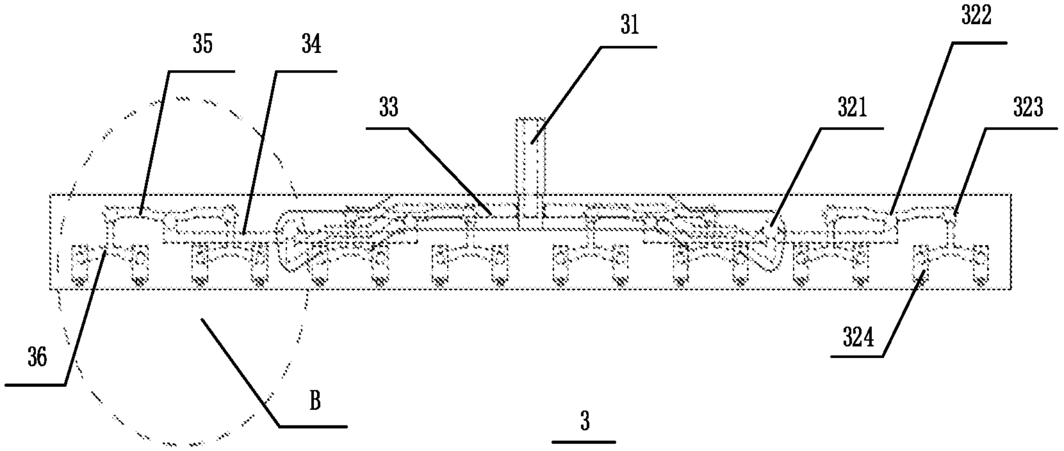
FIG. 6 is a schematic structural diagram of another cleaning assembly of the cleaning apparatus according to an embodiment of the present disclosure.
Figure 7:
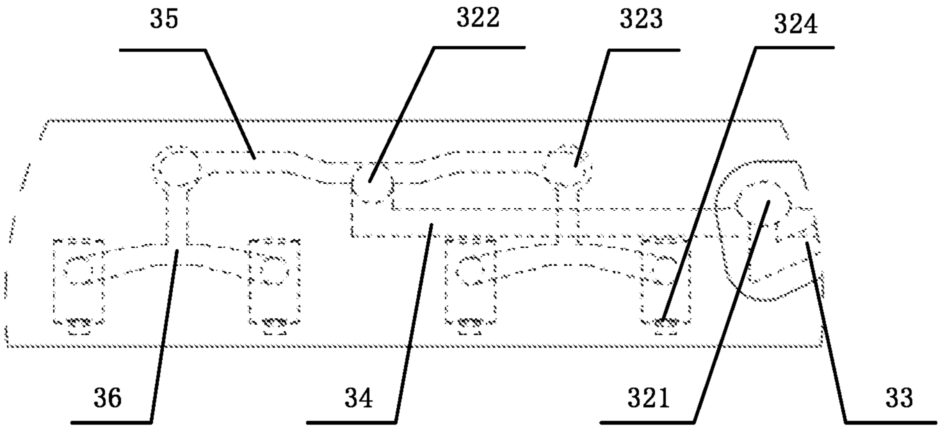
FIG. 7 is a partially enlarged view of B in FIG. 6.

With continuous reference to FIG. 1, FIG. 6, and FIG. 7, a second structure of the cleaning assembly 3 is that the flow channel branches correspondingly connected with the cleaning medium spray orifices 32 of various layers are located in different planes, so that the cleaning medium spray orifices 32 of various layers are overlaid in different planar spaces. Specifically, as shown in FIG. 6, the cleaning medium spray orifices 32 of the cleaning assembly 3 are arranged at four layers, i.e. first-layer cleaning medium spray orifices 321, second-layer cleaning medium spray orifices 322, third-layer cleaning medium spray orifices 323, and fourth-layer cleaning medium spray orifices 324; where the first-layer cleaning medium spray orifices 321 are communicated with the cleaning medium inlet 31 through first-layer flow channel branches 33, the second-layer cleaning medium spray orifices 322 are connected with the first-layer cleaning medium spray orifices 321 through second-layer flow channel branches 34, the third-layer cleaning medium spray orifices 323 are connected with the second-layer cleaning medium spray orifices 322 through third-layer flow channel branches 35, the fourth-layer cleaning medium spray orifices 324 are connected with the third-layer cleaning medium spray orifices 323 through fourth-layer flow channel branches 36, the cleaning medium spray orifices 32 of various layers face the rolling brush surface, and the cleaning medium is sprayed onto the rolling brush surface by the fourth-layer cleaning medium spray orifices 324. The first-layer cleaning medium spray orifices 321 have 2 cleaning medium spray orifices 32, the second-layer cleaning medium spray orifices 322 have 4 cleaning medium spray orifices 32, the third-layer cleaning medium spray orifices 323 have 8 cleaning medium spray orifices 32, and the fourth-layer cleaning medium spray orifices 324 have 16 cleaning medium spray orifices 32. Of course, it may have more layers for the cleaning medium spray orifices 32, and also have more corresponding cleaning medium spray orifices 32, which shall fall within the scope of protection of the present embodiment.

It should be noted that the flow channel branches of the four layers are located in different planes, and the cleaning medium spray orifices 32 of the four layers are overlaid in different planar spaces. Specifically, the first-layer cleaning medium spray orifices 321 are located in a first plane (not shown in FIG. 6) along the radial direction (from top to bottom in FIG. 6) of the rolling brush 2;

the second-layer cleaning medium spray orifices 322 are located in a second plane (not shown in FIG. 6) along the radial direction of the rolling brush 2; the third-layer cleaning medium spray orifices 323 are located in a third plane (not shown in FIG. 6) along the radial direction of the rolling brush 2; the fourth-layer cleaning medium spray orifices 324 are located in a fourth plane (not shown in FIG. 6) along the radial direction of the rolling brush 2; and the first plane, the second plane, the third plane, and the fourth plane are parallel to each other along the radial direction of the rolling brush 2, so that the cleaning medium spray orifices 32 of the four layers are overlaid along a direction perpendicular to the radial direction of the rolling brush 2 to achieve overlaying in different planar spaces.

Further, as shown in FIG. 6 and FIG. 7, a first distance is reserved between the first-layer cleaning medium spray orifices 321 and the rolling brush surface, a second distance is reserved between the second-layer cleaning medium spray orifices 322 and the rolling brush surface, a third distance is reserved between the third-layer cleaning medium spray orifices 323 and the rolling brush surface, and a fourth distance is reserved between the fourth-layer cleaning medium spray orifices 324 and the rolling brush surface. The first distance, the second distance, the third distance, and the fourth distance may be equal or unequal. For example, if the distance between the first-layer cleaning medium spray orifices 321 and the rolling brush surface is substantially equal to the distance between the second-layer cleaning medium spray orifices 322 and the rolling brush surface, the first-layer cleaning medium spray orifices 321 and the second-layer cleaning medium spray orifices 322 are at the same height relative to the rolling brush surface, if the distance between the third-layer cleaning medium spray orifices 323 and the rolling brush surface is substantially equal to the distance between the fourth-layer cleaning medium spray orifices 324 and the rolling brush surface, and the third distance (or the fourth distance) is less than the first distance (or the second distance), the third-layer cleaning medium spray orifices 323 and the fourth-layer cleaning medium spray orifices 324 are lower than the first-layer cleaning medium spray orifices 321 and the second-layer cleaning medium spray orifices 322, and are closer to the rolling brush surface. For another example, if the first distance, the second distance, the third distance, and the fourth distance are reduced sequentially, the first-layer cleaning medium spray orifices 321 to the fourth-layer cleaning medium spray orifices 324 are arranged gradually away from the cleaning medium inlet 31. Of course, there are other distance relationships for the cleaning medium spray orifices 32 of various layers as long as the cleaning medium spray orifices 32 of the four layers are overlaid along a direction perpendicular to the radial direction of the rolling brush 2, which shall fall within the scope of protection of the present embodiment.

It can be seen from the above that the cleaning medium spray orifices 32 of the four layers are overlaid along the radial direction of the rolling brush 2 or along a direction perpendicular to the radial direction of the rolling brush 2, so that the cleaning medium spray orifices 32 are overlaid in the spatial dimension. Different from the first structure of the cleaning assembly 3, the second structure of the cleaning assembly 3 allows flow channel branches of multiple layers to be separated and overlaid in a space, so that a space occupied by the cleaning medium spray orifices 32 is reduced, and the volume of the cleaning assembly 3 is reduced.

It should also be noted that the lengths of the flow channel branches of the four layers may be set to be equal, that is, the lengths of the first-layer flow channel branches 33 to the fourth-layer flow channel branches 36 are equal; or the lengths of the flow channel branches of various layers may be set to be unequal, that is, the lengths of the first-layer flow channel branches 33, the second-layer flow channel branches 34, the third-layer flow channel branches 35, and the fourth-layer flow channel branches 36 are unequal, as long as the lengths of multiple flow channel branches of the same layer are equal.

Figure 4:
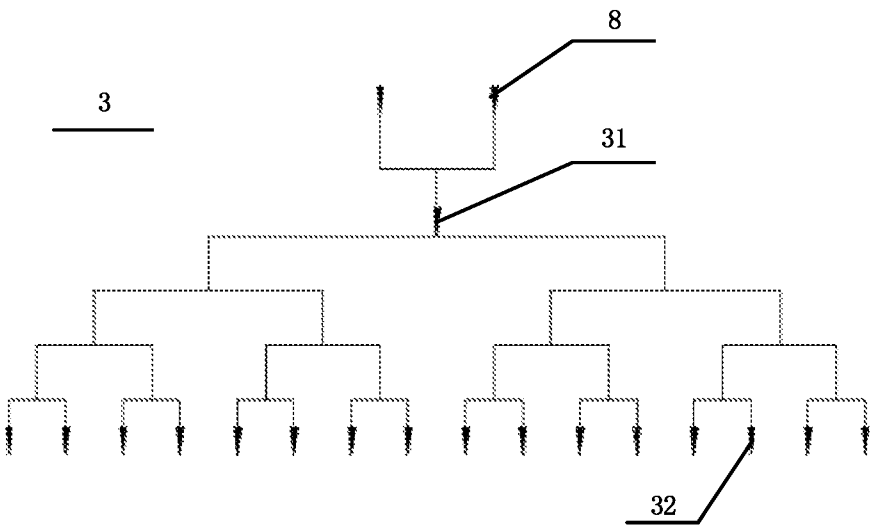

It can be understood that as the length of the flow channel is increased, the water pressure at the cleaning medium spray orifices 32 close to the rolling brush surface will decrease. In order to increase the water pressure, with reference to FIG. 4, an air pump 8 or a liquid pump (not shown) may be connected with the cleaning medium inlet 31. The air pump 8 or the liquid pump is a relatively mature product apparatus, and will not be described again herein.

Further, in order to improve the cleaning effect, the cleaning apparatus 100 is further provided with a liquid extruder 4, where the liquid extruder 4 is arranged on the housing 1 and located above the cleaning medium spray orifices 32, and contacts the rolling brush surface along the axial direction of the rolling brush 2. In the present embodiment, after the cleaning medium spray orifices 32 spray a liquid onto the rolling brush surface, the liquid extruder 4 can extrude the liquid on the rolling brush surface, so that the liquid is uniformly dispersed onto the rolling brush surface again, that is, the liquid sprayed onto the rolling brush surface by the cleaning medium spray orifices 32 is changed from point uniformness to linear uniformness by the liquid extruder 4. Furthermore, the liquid extruder 4 is in interference with the rolling brush surface, so that dirt in a deep layer of the rolling brush 2 can be cleaned. The liquid extruder 4 is a liquid scraping rib made of a flexible material or a hard material.

Figure 8:
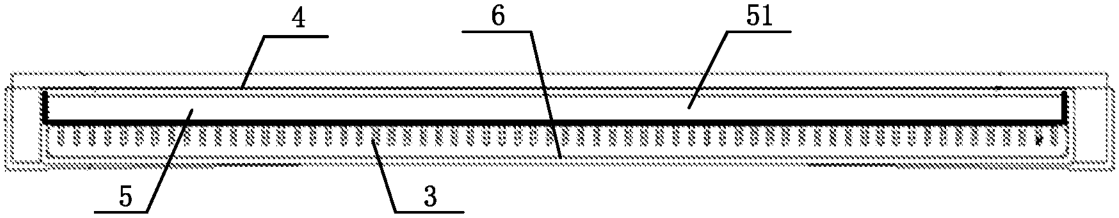
FIG. 8 is a schematic structural diagram of a groove of the cleaning apparatus according to an embodiment of the present disclosure.
Figure 9:
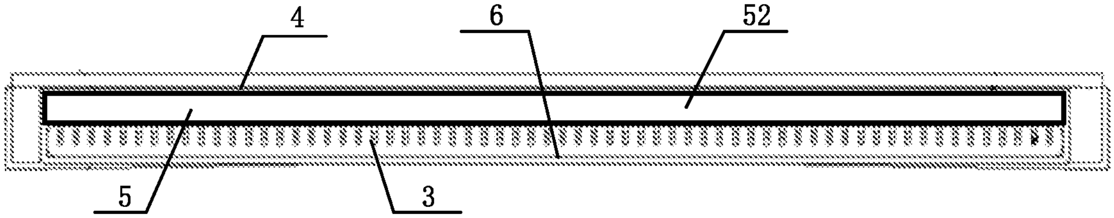
FIG. 9 is a schematic structural diagram of another groove of the cleaning apparatus according to an embodiment of the present disclosure.

In the present embodiment, in order to make the liquid extruded from the rolling brush surface by the liquid extruder 4 uniformly clean the rolling brush surface again, a groove 5 is further provided. The groove 5 is arranged between the liquid extruder 4 and the cleaning medium spray orifices 32, and extends along the axial direction of the rolling brush 2, an opening of the groove 51 faces the rolling brush surface, and a contact surface of the groove 51 contacts the rolling brush surface. Specifically, the groove 51 has two structures, as shown in FIG. 8, one structure is a U-shaped groove 51, and a liquid storage groove (not shown) of the U-shaped groove 51 can receive the liquid extruded from the rolling brush surface by the liquid extruder 4, and after the liquid storage groove is full, the liquid is uniformly guided to the rolling brush surface again through the contact surface, contacting the rolling brush surface, in the liquid storage groove. As shown in FIG. 9, the other structure of the groove 51 is a mouth-shaped groove 52, a liquid storage groove (not shown) of the mouth-shaped groove 52 can receive the liquid extruded from the rolling brush surface by the liquid extruder 4, and after the liquid storage groove is full, the liquid is uniformly guided to the rolling brush surface again through the contact surface, contacting the rolling brush surface, in the liquid storage groove. That is, by surface contact of the liquid and the rolling brush in the liquid storage groove, the linear uniformness of the cleaning medium extruded by the liquid extruder 4 is changed to surface uniformness, so that the rolling brush 2 is cleaned uniformly and completely, and the cleaning efficiency and the cleanliness of the rolling brush 2 are improved.

Further, in conjunction with the foregoing description, it can be seen that as the rolling brush 2 rotates, part of dirt on the rolling brush surface is sucked into the air suction pipeline 7, and collected into the solid collection bin and the liquid collection bin connected with the air suction pipeline 7 by the air suction pipeline 7, and the dirt that is not sucked will rotate to a position where the cleaning medium spray orifices 32 are located. In order to reduce the difficulty in cleaning the rolling brush surface by the cleaning medium spray orifices 32, in the present embodiment, the cleaning apparatus 100 is further provided with a dirt remover 6, where the dirt remover 6 is arranged on the housing 1 and located below the cleaning medium spray orifices 32, and contacts the rolling brush surface along the axial direction of the rolling brush 2. The air suction port of the air suction pipeline 7 is located below the dirt remover 6. The dirt remover 6 is in interference with the rolling brush surface and capable of scraping the dirt that is not sucked into the air suction pipe from the rolling brush surface, so that a relatively clean rolling brush surface enters a cleaning position of the cleaning medium spray orifices 32. The dirt remover 6 is a dirt removing rib made of a flexible material or a hard material.

Embodiment 1 of the present disclosure provides a cleaning apparatus 100, which includes: a housing 1, a rolling brush 2, and a cleaning assembly 3, where the cleaning assembly 3 includes a cleaning medium inlet 31 and a plurality of cleaning medium spray orifices 32; the plurality of cleaning medium spray orifices 32 face the rolling brush 2, and at least part of the cleaning medium spray orifices 32 are arranged along an axial direction of the rolling brush 2 at equal intervals; and lengths of flow channels from various cleaning medium spray orifices 32 that are arranged along the axial direction of the rolling brush 2 to the cleaning medium inlet 31 are equal. According the embodiment of the present disclosure, a cleaning medium can be uniformly sprayed to a rolling brush surface, so that the rolling brush can be cleaned completely, and the cleaning efficiency and the cleanliness of the rolling brush are improved.

Embodiment 2

Embodiment 2 of the present disclosure further provides a ground cleaner 200. The ground cleaner 200 adopts the cleaning apparatus 100 of Embodiment 1 described above, so components of the ground cleaner 200 of Embodiment 2 can refer to reference signs of the components of Embodiment 1 described above.

Figure 10:
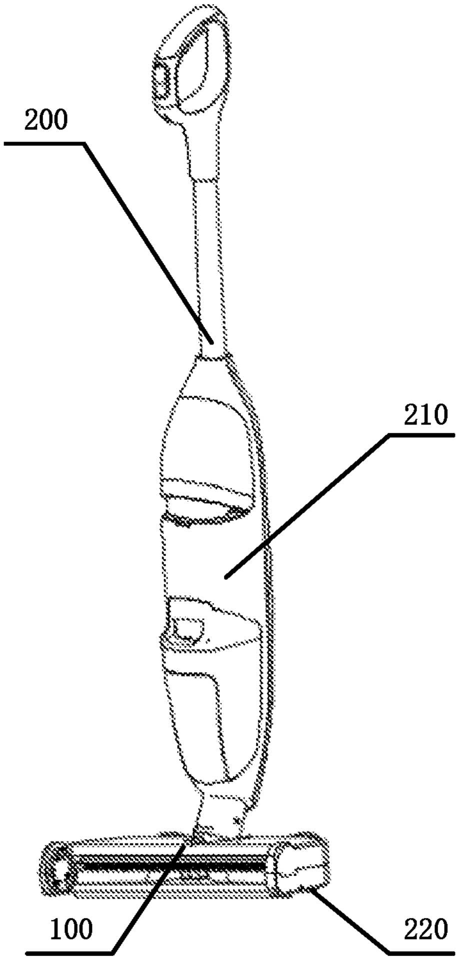
FIG. 10 is a schematic structural diagram of a ground cleaner according to an embodiment of the present disclosure.

As shown in FIG. 10, the ground cleaner 200 provided in the present embodiment includes a handle main body 210 and a cleaning apparatus 100 connected with the handle main body 210. Preferably, a cleaning medium storage apparatus (not shown) is arranged on the handle main body 210 and configured to provide a cleaning medium for the cleaning apparatus 100, and the cleaning medium storage apparatus can store a gas, a liquid or a gas-liquid mixture. In order to facilitate the operation of the ground cleaner 200, rollers 220 are arranged near a junction of the handle main body 210 and the cleaning apparatus 100, central axes of the rollers 200 and an axis of a rolling brush 2 of the cleaning apparatus 100 are at the same height, so that when the cleaning apparatus 100 is pushed by a handling part of the handle, the cleaning apparatus 100 is parallel to the ground to enhance the stability of the operation of the cleaning apparatus 100.

In the present embodiment, the cleaning apparatus 100 includes a cleaning assembly 3, where the cleaning assembly 3 includes a cleaning medium inlet 31 and a plurality of cleaning medium spray orifices 32, lengths of flow channels between the cleaning medium inlet 31 and various cleaning medium spray orifices 32 are equal; the cleaning medium spray orifices 32 include at least first-layer cleaning medium spray orifices 321 and second-layer cleaning medium spray orifices 322 in sequence along an extending direction of the flow channel; the first-layer cleaning medium spray orifices 321 are connected with the cleaning medium inlet 31, the second-layer cleaning medium spray orifices 322 are overlaid with the first-layer cleaning medium spray orifices 321 through flow channel branches, and lengths of the flow channel branches therebetween are equal, and the number of the cleaning medium spray orifices 32 of the corresponding layer increases with increase of the layer. For example, for the first-layer cleaning medium spray orifices 321 connected with the cleaning medium inlet 31, N is 1, so the number of the first-layer cleaning medium spray orifices 321 is 2. For another example, for the second-layer cleaning medium spray orifices 322 connected with the first-layer cleaning medium spray orifices 321, N is 2, so the number of the second-layer cleaning medium spray orifices 322 is 4. Of course, it may have more layers for the cleaning medium spray orifices 32, and also have more corresponding cleaning medium spray orifices 32, which shall fall within the scope of protection of the present embodiment. The cleaning medium spray orifices 32 overlaid by taking the layer as a whole are of the following two structures, that is, the cleaning assembly 3 is of two structures, and specific implementations can refer to Embodiment 1 of the present disclosure and will not be described again herein.

Embodiment 2 provides a ground cleaner 200, which includes: a handle main body 210 and a cleaning apparatus 100 connected with the handle main body 210. The cleaning assembly 10 includes: a housing 1 and a rolling brush 2, and further includes: a cleaning assembly 3, where the cleaning assembly 3 includes a cleaning medium inlet 31 and a plurality of cleaning medium spray orifices 32; the plurality of cleaning medium spray orifices 32 face the rolling brush 2, and lengths of flow channels from various cleaning medium spray orifices 32 to the cleaning medium inlet 31 are equal. According the embodiment of the present disclosure, a cleaning medium can be uniformly sprayed to a rolling brush surface, so that the rolling brush can be cleaned completely, and the cleaning efficiency and the cleanliness of the rolling brush are improved.

The ground cleaner 200 described above can obtain a better use effect in different scenarios compared with existing cleaners; and some specific use scenarios will be described below.

The ground cleaner 200 provided in Embodiment 2 described above is used, when the ground cleaner 200 cleans dirt on the ground, or after the ground cleaner 200 cleans the dirt on the ground, the ground cleaner 200 needs to clean the rolling brush 2. A motor can drive the rolling brush 2 to rotate; as the rolling brush 2 rotates, the rolling brush surface firstly pass through the air suction pipeline 7, part of dirt on the rolling brush surface is sucked into the air suction pipeline 7, and the rest of dirt on the rolling brush surface further rotates to a position where the dirt remover 6 is located with the rotation of the rolling brush 2, and the dirt remover 6 is in interference with the rolling brush surface along the axial direction of the rolling brush 2, so that the rest of dirt (mainly liquid) on the rolling brush surface can be extruded out, falls into the air suction port of the air suction pipeline 7, and is sucked, and the rolling brush surface with dirt is further cleaned. Then, the rolling brush 2 further rotates, and the relatively clean rolling brush surface cleaned by the dirt remover 6 rotates to a position corresponding to the cleaning medium spray orifices 32, and at this time, the cleaning medium spray orifices 32 spray a cleaning medium (liquid) to the rolling brush surface, the cleaning medium spray orifices 32 cover a straight line along the axial direction of the rolling brush surface, the amounts of the cleaning medium sprayed out of various cleaning medium spray orifices 32 are substantially equal, and there are a lot of cleaning medium spray orifices 32, so that as the rolling brush 2 rotates, the cleaning medium spray orifices 32 that are arranged along the axial direction can cover the entire rolling brush surface, and the cleaning medium is uniformly sprayed to the entire rolling brush 2.

Further, as the rolling brush 2 continuously rotates, the rolling brush surface absorbing the cleaning medium rotates to a position where the liquid extruder 4 is located, and the liquid extruder 4 is in interference with the rolling brush surface along the axial direction of the rolling brush 2, so that the liquid extruder 4 makes the cleaning medium uniform on the rolling brush surface while extruding out the cleaning medium on the rolling brush surface, that is, the cleaning medium sprayed by the cleaning medium spray orifices 32 onto the rolling brush surface is changed from point uniformness to linear uniformness. Further, the liquid extruded out by the liquid extruder 4 is collected into a groove 51 below the liquid extruder 4, and after a liquid storage groove of the groove 51 is full, the liquid is uniformly guided to the rolling brush surface by a contact surface, contacting the rolling brush surface, in the liquid storage groove, that is, the liquid extruded by the liquid extruder 4 is changed from linear uniformness to surface uniformness, so that the rolling brush 2 is cleaned completely, and the cleaning efficiency and the cleanliness of the rolling brush 2 are improved.

In practical applications, at work, cleaning apparatus such as a cleaner can suck water and solid matter into a collection bin at the same time. However, water and solid matter are sucked into the collection bin at the same time, which causes the mixing of solid and liquid waste. When treating such mixed solid-liquid waste, because no filtering apparatus is arranged on the collection bin, people cannot separate the liquid and the solid when pouring the mixed solid-liquid waste, and often pour water containing solid matter directly into a sewer or a toilet, and the solid matter in the collection bin easily causes the blockage of the sewer or the toilet, which brings inconvenience to people. In view of the above problems, the embodiment of the present disclosure further provides a collection bin and a cleaning apparatus. On the one hand, matter in the collection bin is filtered by a filtering plate on a separation apparatus, so that different matter in the bin is separated, and separate treatment of different matter is achieved.

Embodiment 3

Figure 11A:
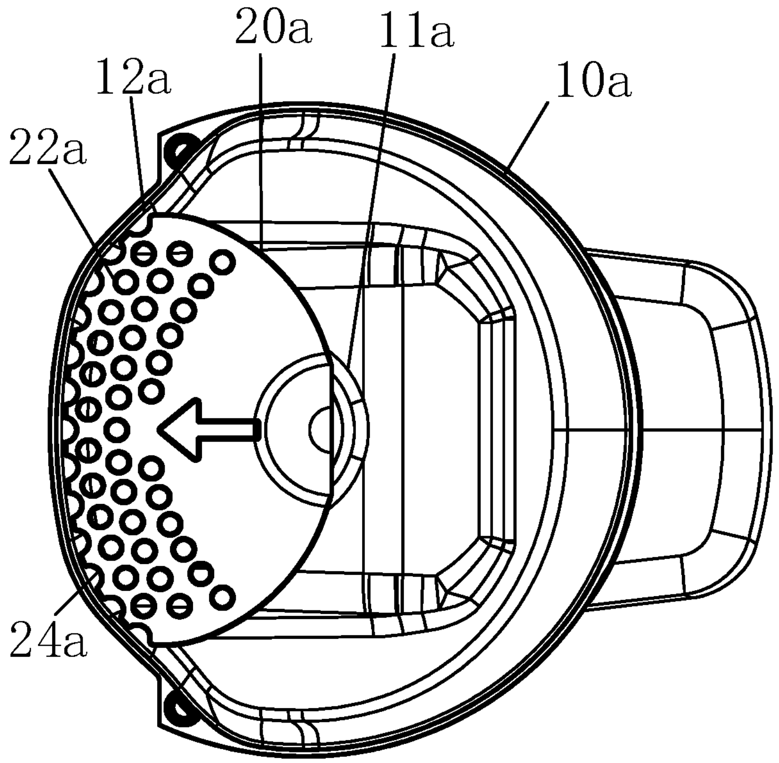
FIG. 11*a* is a schematic diagram of a planar structure of a collection bin according to an embodiment of the present disclosure.
Figure 11B:
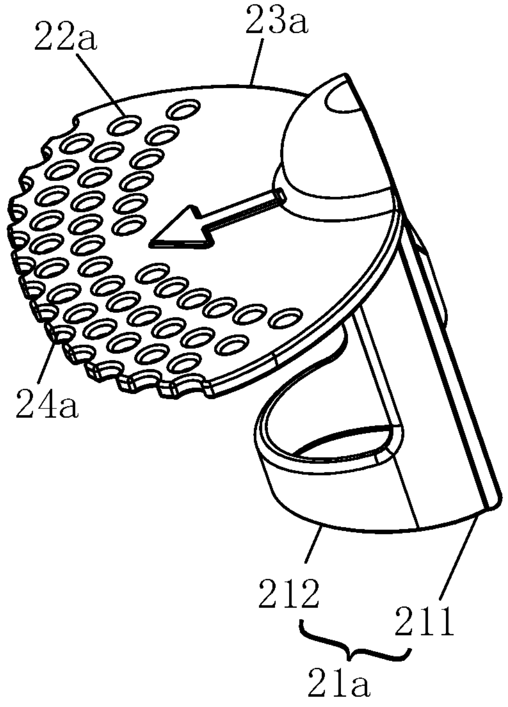
FIG. 11*b* is a schematic diagram of a stereostructure of a separation apparatus according to an embodiment of the present disclosure.
Figure 11C:
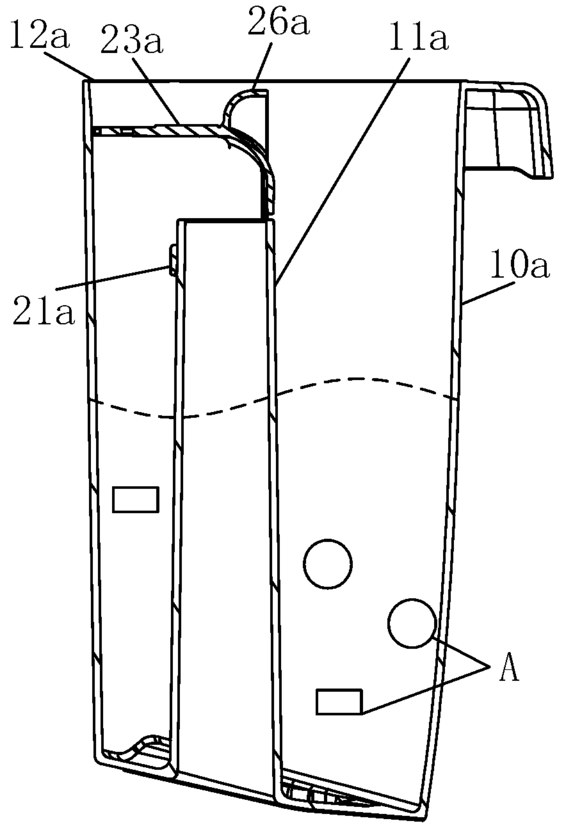
FIG. 11*c* is a schematic diagram of a cross-sectional structure of the collection bin according to an embodiment of the present disclosure.

FIG. 11*a* is a schematic diagram of a planar structure of a collection bin according to an embodiment of the present disclosure, FIG. 11*b* is a schematic diagram of a stereostructure of a separation apparatus according to an embodiment of the present disclosure, and FIG. 11*c* is a schematic diagram of a cross-sectional structure of the collection bin according to an embodiment of the present disclosure, as shown in FIG. 11*a* to FIG. 11*c*.

An embodiment of the present disclosure provides a collection bin, which includes: a bin main body 10*a* and a separation apparatus 20*a*.

A mounting structure 11*a* is arranged in the bin main body 10*a*. The separation apparatus 20*a* includes a filtering plate 23*a*. The filtering plate 23*a* has filtering holes 22*a*. The separation apparatus 20*a* is detachably connected with the mounting structure 11*a*. The filtering plate 23*a* is located on a pouring path of the bin main body 10*a*. Preferably, the filtering plate 23*a* is located at the top of the bin main body 10*a*, or the filtering plate 23*a* is located in the bin main body 10*a* and close to the top of the bin main body 10*a*.

According to the technical solutions provided in the embodiment of the present disclosure, on the one hand, the separation apparatus 20*a* is arranged on the bin main body 10*a*, and when matter in the bin is poured via the pouring path of the bin main body 10*a*, the matter in the bin can be filtered by the filtering plate 23*a* on the separation apparatus 20*a*, part of the matter in the bin is poured out after passing through the filtering plate 23*a*, and part of the matter is isolated in the bin, so that separate treatment of different matter is achieved, a guarantee for subsequent treatment is provided, and the cleaning efficiency is improved. Meanwhile, the separation apparatus 20*a* is connected with the mounting structure 11*a*, which can enhance the connection stability of the separation apparatus 20*a* and prevent the separation apparatus 20*a* from being separated from the bin main body 10*a* when matter in the bin main body 10*a* is poured out.

Figure 11D:
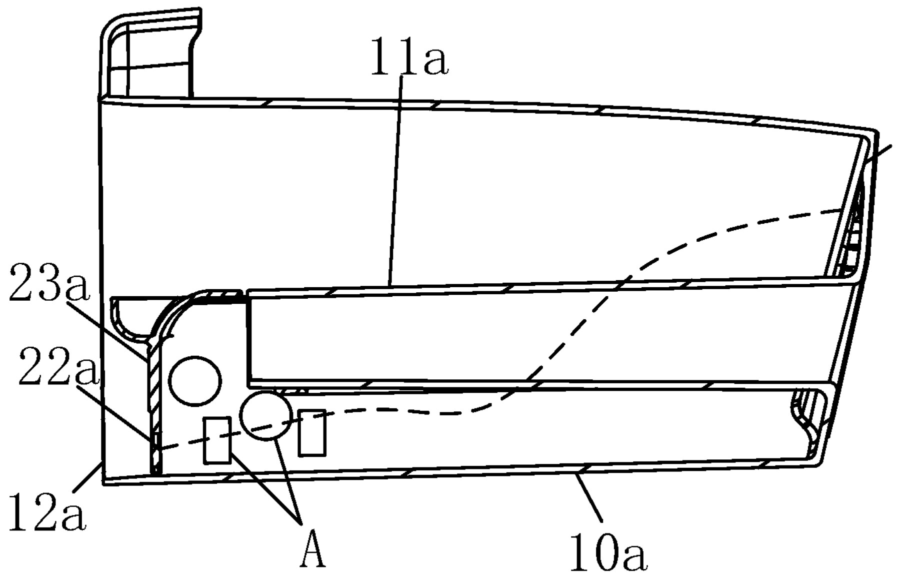
FIG. 11*d* is a schematic diagram of a cross-sectional structure of the collection bin in a pouring state according to an embodiment of the present disclosure.

For example, when in use, with reference to FIG. 11*c* and FIG. 11*d*, the bin main body 10*a* has a pouring port 12*a*, and matter in the bin can be poured out via the pouring port 12*a* of the bin main body 10*a*. A dotted line indicates a position of a water line, and A indicates solid matter, such as hairs, flakes, bars, or large particles of dust, in water.

In FIG. 11*c*, water and solid matter are sucked into the collection bin at the same time, which leads to the mixing of solid and liquid waste. In a case where the filtering plate 23 is unavailable, if the mixed solid-liquid waste is poured into a sewer or a toilet, the solid matter in the collection bin easily causes the blockage of the sewer or the toilet, which brings inconvenience to people.

In FIG. 11*d*, in a case where the filtering plate 23*a* is provided, when in use, first the bin main body 10*a* is tilted so that the matter in the bin main body 10*a* flows to the pouring port 12*a* via the pouring path, and the matter in the bin is filtered by the filtering plate 23*a* when passing through the pouring path. The water flows out of the filtering holes 22*a* and is poured into the sewer or the toilet. The solid matter is isolated in the bin by the filtering plate 23*a*, so that the liquid waste is separated from the solid waste. After the water is poured out, the solid waste remaining in the bin can be poured into a trash can. The separation apparatus 20 is connected with the mounting structure 11*a* in the bin, so that the connection stability of the separation apparatus 20*a* is enhanced. When the bin main body 10*a* is tilted, the mounting structure 11*a* provides a supporting force for the entire separation apparatus 20*a*, which prevents the separation apparatus 20*a* from being separated from the bin main body 10*a* when matter in the bin main body 10*a* is poured out. Further, in order to clean or replace the separation apparatus 20*a* conveniently, the separation apparatus 20*a* is detachably connected with the mounting structure 11*a*.

With continuous reference to FIG. 11*b* and FIG. 11*c*, in order to further enhance the connection stability of the separation apparatus 20*a*, in the embodiment of the present disclosure, the separation apparatus 20*a* further includes a connecting bracket 21*a*. The filtering plate 22*a* is arranged on the connecting bracket 21*a*, and the connecting bracket 21*a* extends into the bin main body 10*a* and is connected with the mounting structure 11*a*. The connection stability of the separation apparatus 20*a* can be further enhanced by connecting the connecting bracket 21*a* to the mounting structure 11*a*, and when the bin main body 10*a* is tilted, the connecting bracket 21*a* and the mounting structure 11*a* together provide a supporting force for the separation apparatus 20*a*, so as to prevent the separation apparatus 20*a* from being separated from the bin main body 10*a*. Meanwhile, the connecting bracket 21*a* extends into the bin main body 10*a* to avoid occupying a space outside the bin main body 10*a*. Further, in order to clean or replace of the separation apparatus 20*a* conveniently, the connecting bracket 21*a* is detachably connected with the mounting structure 11*a*.

In the embodiment of the present disclosure, a mounting position of the filtering plate 23*a* can be designed according to different filtering requirements. In a possible implementation, with reference to FIG. 11*a*, the filtering plate 23*a* is located at the pouring port 12*a* of the bin main body 10*a* and covers at least a part of the pouring port 12*a*. Part of an edge of the filtering plate 23*a* abuts against an upper end surface of the pouring port 12*a*. In this implementation, the filtering plate 23*a* may be arranged outside the bin main body 10*a*, and the upper end surface of the pouring port 12*a* can provide a supporting force for the filtering plate 23*a*. In the case where the separation apparatus 20*a* further includes the connecting bracket 21*a*, the upper end surface of the pouring port 12*a* and the connecting bracket 21*a* together provide a supporting force for the filtering plate 23*a*. When in use, matter in the bin can be first poured out of an uncovered part of the pouring port 12*a*. During pouring, liquid waste is poured out via the filtering holes 22*a* in the filtering plate 23*a*, and solid waste is isolated in the bin by the filtering plate 23*a*. After the liquid waste is poured out, the solid waste can be poured out in the following two ways: one is that after the liquid waste is poured out, the collection bin is still kept in a pouring state, the solid waste is gathered together on the filtering plate 23*a* of the separation apparatus 20*a*, the separation apparatus 20*a* is dismounted, and the solid waste on the filtering plate 23*a* is poured into a trash can; and the other one is that after the liquid waste is poured out, the collection bin is returned from the pouring state to an upright state, the solid waste falls back to the bottom of the collection bin, the collection bin is rotated, and the solid waste is poured out of the uncovered part of the pouring port 12*a*.

In another possible implementation, with reference to FIG. 11*c*, the filtering plate 23*a* is located in the bin main body 10 and covers at least a part of the pouring port 12*a* of the bin main body 10*a*. Part of an edge of the filtering plate 23*a* abuts against an inner wall of the bin main body 10*a*. In this implementation, the filtering plate 23*a* is arranged in the bin main body 10*a*, and the inner wall of the bin main body 10*a* can provide a supporting force for the filtering plate 23*a*. In the case where the separation apparatus 20*a* further includes the connecting bracket 21*a*, the inner wall of the bin main body 10*a* and the connecting bracket 21*a* together provide a supporting force for the filtering plate 23*a*. The filtering plate 23*a* is located in the bin main body 10*a* and does not occupy a space outside the bin main body 10*a*, which prevents the volume of the collection bin from being increased. When in use, matter in the bin can be first poured out of the uncovered part of the pouring port 12*a*. During pouring, liquid waste is poured out via the filtering holes 22*a* in the filtering plate 23*a*, and solid waste is isolated in the bin by the filtering plate 23*a*. After the liquid waste is poured out, the solid waste can be poured out in the following two ways: one is that after the liquid waste is poured out, the collection bin is still kept in a pouring state, the solid waste is gathered together on the filtering plate 23*a* of the separation apparatus 20*a*, the separation apparatus 20*a* is dismounted, and the solid waste on the filtering plate 23*a* is poured into a trash can; and the other one is that after the liquid waste is poured out, the collection bin is returned from the pouring state to an upright state, the solid waste falls back to the bottom of the collection bin, collection bin is rotated, and the solid waste is poured out of the uncovered part of the pouring port 12*a*.

Further, with reference to FIG. 11*b*, in a possible embodiment of the present disclosure, a notch 24*a* is formed at an edge, abutting against the inner wall of the bin main body 10*a*, of the filtering plate 23*a*, and the notch 24*a* and the inner wall of the bin main body 10*a* form a through hole. Remaining of liquid waste at the junction of the edge of the filtering plate 23*a* and the inner wall of the bin main body 10*a* can be avoided through the notch 24*a*. For example, in a case where the notch 24*a* is not provided, when the bin main body 10*a* is tilted, the liquid waste flows to the junction of the edge of the filtering plate 23*a* and the inner wall of the bin main body 10*a* and is blocked by the filtering plate 23*a*, so that part of the liquid waste cannot flow out. When the bin main body 10*a* is returned to an upright state, the liquid waste remaining at the junction returns to the bin. The liquid waste in the bin main body 10*a* cannot be completely poured out without the notch 24*a*. In a case where the notch 24*a* is formed, when the bin main body 10*a* is tilted, the liquid waste flows to the junction of the edge of the filtering plate 23*a* and the inner wall of the bin main body 10*a* and flows out via the through hole formed by the notch 24*a* and the inner wall of the bin main body 10*a*. When the bin main body 10*a* is returned to an upright state, no liquid waste returns to the bin. The liquid waste in the bin main body 10*a* can be completely poured out through the notch 24*a*.

Of course, with reference to FIG. 11*a*, when the filtering plate 23*a* is located at the pouring port 12*a* of the bin main body 10*a*, a notch 24*a* may be formed at an edge, abutting against the upper end surface of the pouring port 12*a*, of the filtering plate 23*a*. Remaining of liquid waste at the junction of the edge of the filtering plate 23*a* and the end surface of the pouring port 12*a* can be avoided through the notch 24*a*.

Further, in the embodiment of the present disclosure, the collection bin includes but is not limited to a collection bin of a cleaner, and the collection bin of the cleaner has an air guiding pipe. In the embodiment of the present disclosure, the separation apparatus 20*a* can be connected to the bin main body through the air guiding pipe. Specifically, with reference to FIG. 11*a* and FIG. 11*e*, an air guiding pipe is arranged in the bin main body 10*a* and is a part of a suction channel of a cleaner, solid-liquid waste on a surface to be cleaned is sucked into the collection bin along the air guiding pipe, and the air guiding pipe is the mounting structure 11*a*. The separation apparatus 20*a* is directly connected to the bin main body through the air guiding pipe, so that addition of a connecting component on the bin main body 10*a* is avoided, the separation apparatus 20*a* can be connected to the bin main body without changing an structure of the existing collection bin and only by directly connecting the separation apparatus 20*a* to the air guiding pipe.

Figure 11E:
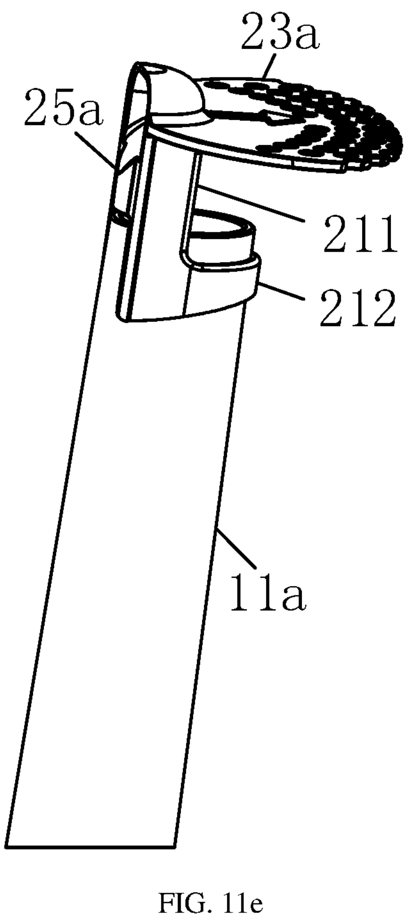
FIG. 11*e* is a schematic diagram of a mounting state of the separation apparatus mounted on a mounting structure according to an embodiment of the present disclosure.

Further, with reference to FIG. 11*b* and FIG. 11*e*, in a possible implementation of the connecting bracket 21*a*, the connecting bracket 21*a* includes at least two supporting arms 211 and a sleeving part 212. One end of the at least two supporting arms 211 is connected with the filtering plate 23*a*, and the other end of the at least two supporting arms 211 is connected with the sleeving part 212. The sleeving part 212 is sleeved on the air guiding pipe, and the air guiding pipe is located between the at least two supporting arms 211. The connecting bracket 21*a* can be sleeved on the air guiding pipe through the sleeving part 212, and the connecting bracket 21*a* is prevented from swaying relative to the air guiding pipe through the at least two supporting arms 211, thereby preventing the filtering plate 23*a* from swaying relative to the bin main body 10*a*. The filtering plate 23*a* and the connecting bracket 21*a* may be of an integrated structure.

In order to enhance the connection strength between the connecting bracket 21*a* and the air guiding pipe, in a possible implementation of the embodiment of the present disclosure, the at least two supporting arms 211 are elastic and clamp the air guiding pipe. When extending between the at least two supporting arms 211, the air guiding pipe pushes the at least two supporting arms 211 to make the at least two supporting arms 211 elastically deform, and the at least two supporting arms 211 clamp the air guiding pipe through an elastic restoring force, thereby improving the connection strength between the connecting bracket 21*a* and the air guiding pipe.

In another possible implementation, the sleeving part 212 is elastic and clamps the air guiding pipe. When sleeved with the sleeving part 212, the air guiding pipe pushes the sleeving part 212 to make the sleeving part 212 elastically deform, and the sleeving part 212 clamps the air guiding pipe through an elastic restoring force, thereby improving the connection strength between the connecting bracket 21*a* and the air guiding pipe.

Of course, the supporting arms 211 and the sleeving part 212 may both elastic, so that the connection strength between the connecting bracket 21*a* and the air guiding pipe is improved under the action of the double elastic restoring force.

In order to enhance the connection strength between the connecting bracket 21*a* and the air guiding pipe, in the embodiment of the present disclosure, in another possible implementation, an anti-skid structure is arranged on an inner wall surface (a surface facing the air guiding pipe) of the connecting bracket 21*a*, and the anti-skid structure can be realized by at least one convex rib (not shown in the figure), bump, pattern, etc. For example, preferably, the convex rib is in an upright strip shape and parallel to length directions of the supporting arms 211. Of course, the convex rib is not limited thereto and may be in a block shape, etc. The connecting bracket 21*a* is sleeved on the air guiding pipe, the anti-skid structure abuts against the air guiding pipe tightly, and when the connecting bracket 21*a* is sleeved on the air guiding pipe, an external force is required to overcome the friction between the anti-skid structure and the air guiding pipe. The external force may be provided by a user. Accordingly, after the connecting bracket 21*a* is sleeved on the air guiding pipe, the friction stabilizes the relative position of the connecting bracket 21*a* and the air guiding pipe, thereby improving the connection strength between the connecting bracket 21*a* and the air guiding pipe.

With continuous reference to FIG. 11*e*, in the embodiment of the present disclosure, the sleeving part 212 is of a first arc-shaped structure having an arc matching an arc of an outer wall of the air guiding pipe, so that the first arc-shaped structure can be attached to the outer wall of the air guiding pipe tightly, swaying of the sleeving part 212 and the air guiding pipe can be further avoided by the first arc-shaped structure, and meanwhile the connection strength between the connecting bracket 21*a* and the air guiding pipe is enhanced.

In order to better achieve the filtering effect of the filtering plate 23*a*, a mounting position of the connecting bracket 21*a* relative to the air guiding pipe needs to be limited. In the embodiment of the present disclosure, with reference to FIG. 11*e* and FIG. 11*f*, a limiting structure 25*a* is arranged on the connecting bracket 21*a* and abuts against the air guiding pipe so as to limit the mounting position of the connecting bracket 21*a* relative to the air guiding pipe. When the connecting bracket 21*a* is connected to the air guiding pipe, the mounting position of the connecting bracket 21*a* can be limited by the limiting structure 25*a*, thereby limiting a mounting position of the filtering plate 23*a*. Specifically, a sleeving depth of the separation apparatus 20*a* into the mounting structure 11*a* is limited, that is, a mounting depth of the filtering plate 23*a* is limited, so that the filtering plate 23*a* can cover at least a part of the pouring port 12*a* at the limited position, and the filtering plate 23*a* is prevented from being unable to cover the pouring path to affect the separation effect.

In the embodiment of the present disclosure, the limiting structure 25*a* may be implemented in various ways, for example, the limiting structure 25*a* includes but is not limited to a bump or a limiting plate. The limiting structure 25*a* may be connected to the supporting arms 211 or the filtering plate 23*a*.

In a possible implementation, with reference to FIG. 11*e*, the limiting structure 25*a* is connected with the at least two supporting arms 211 and located between the sleeving part 212 and the filtering plate 23*a*. When the connecting bracket 21*a* is connected with the air guiding pipe, the limiting structure 25*a* abuts against a port of the air guiding pipe. After the air guiding pipe extends into the supporting arms 211 to a certain depth, the limiting structure 25*a* abuts against an end surface of the air guiding pipe, so that the air guiding pipe cannot extend further, the relative position of the connecting bracket 21*a* and the air guiding pipe is limited, the mounting position of the filtering plate 23*a* is limited, and the filtering plate 23*a* is prevented from being unable to cover the pouring path. The limiting structure 25*a* and the supporting arms 211 may be of an integrated structure.

When the limiting structure 25*a* abuts against the port of the air guiding pipe, in order to prevent the limiting structure 25*a* from affecting the smoothness of the port of the air guiding pipe, further, the limiting structure 25*a* is of a second arc-shaped structure having an arc matching an arc of the port of the air guiding pipe, so that the second arc-shaped structure can avoid the port of the air guiding pipe to ensure the smoothness of the port of the air guiding pipe.

Figure 11F:
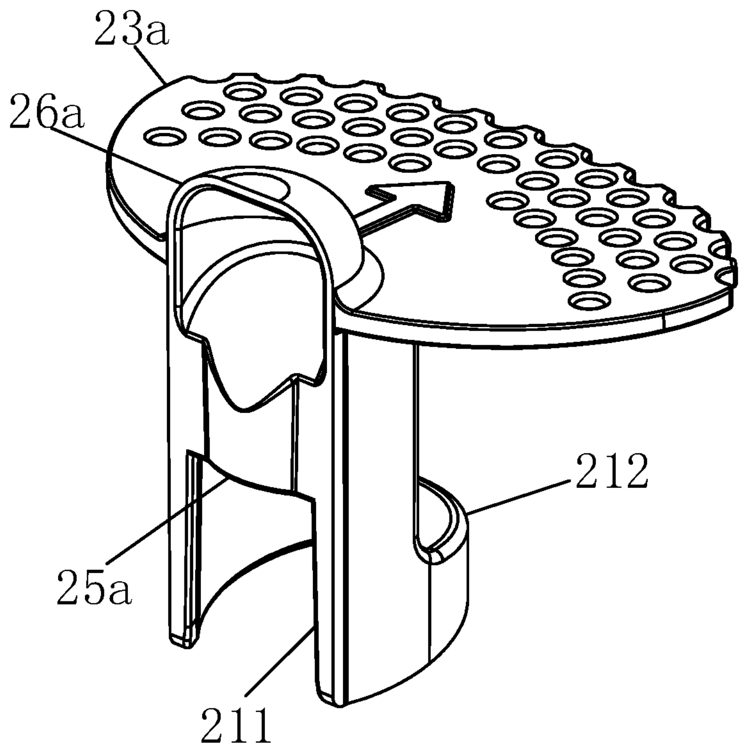
FIG. 11*f* is a schematic diagram of a stereostructure of the separation apparatus in another angle of view according to an embodiment of the present disclosure.

With continuous reference to FIG. 11*c* and FIG. 11*f*, in order to dismount and mount the separation apparatus 20*a* conveniently, in the embodiment of the present disclosure, the separation apparatus 20*a* further includes an operating part 26*a* located at an opposite side of the connecting bracket 21*a*, that is, the operating portion 26*a* and the connecting bracket 21*a* are respectively located at the opposite sides of the filtering plate 23*a*, and the operating part 26*a* extends away from the connecting bracket 21*a*. The operation part 26*a* can be easily held by a user, so that the separation apparatus 20*a* can be more easily mounted and dismounted without the aid of an external tool. The operating part 26*a* and the supporting arms 211 may be of an integrated structure.

Embodiment 4

Accordingly, the embodiment of the present disclosure further provides a cleaning apparatus, which includes: a body and a collection bin. The collection bin may be the collection bin of Embodiment 3 described above, and the relevant features of Embodiment 3 and Embodiment 4 can be referred to each other. The cleaning apparatus includes but is not limited to a cleaner, a dust collector, a cleaning trolley, a cleaning robot, etc. The body in the embodiment of the present disclosure includes but is not limited to a main body of a cleaner, a dust collector, a cleaning trolley, and a cleaning robot. Of course, the collection bin may be used as a separate component and is not specifically limited herein.

The cleaning apparatus will be described in the following embodiments by taking a cleaner as an example. It should be noted that the description of a cleaner is by way of example only and should not be construed as unduly limiting the embodiments of the present disclosure.

The embodiment of the present disclosure further provides a cleaning apparatus, which includes: a body and a collection bin.

The body has an accommodation cavity. The collection bin is located in the accommodation cavity, and the collection bin includes: a bin main body 10*a* and a separation apparatus 20*a*. A mounting structure 11*a* is arranged in the bin main body 10*a*. The separation apparatus 20*a* includes a filtering plate 23*a*. The separation apparatus 20*a* is detachably connected with the mounting structure 11*a*. The filtering plate 23*a* is located on a pouring path of the bin main body 10*a*. Further, the separation apparatus 20*a* further includes a connecting bracket 21*a*. The filtering plate 23*a* is arranged on the connecting bracket 21*a*, and the connecting bracket 21*a* extends into the bin main body 10*a* and is connected with the mounting structure 11*a*.

According to the technical solutions provided in the embodiment of the present disclosure, in the one hand, the collection bin can be taken out of the accommodation cavity of the cleaning apparatus to pour out matter in the collection bin. When the matter in the bin is poured out via the pouring path of the bin main body 10*a*, the matter in the bin can be filtered by the filtering plate 23*a* on the separation apparatus 20*a*, part of the matter in the bin is poured out after passing through the filtering plate 23*a*, and part of the matter is isolated in the bin, so that separate treatment of different matter is achieved, a guarantee for subsequent treatment is provided, and the cleaning efficiency is improved. Meanwhile, the separation apparatus 20*a* is connected with the mounting structure 11*a*, so that the connection stability of the separation apparatus 20*a* is enhanced, which prevents the separation apparatus 20*a* from being separated from the bin main body 10*a* when the matter in the bin main body 10*a* is poured out.

The technical solutions adopted by the embodiment of the present disclosure are described below in conjunction with specific application scenarios to facilitate understanding. The following application scenarios are described by taking a cleaner as an example.

Application Scenario I

At normal work, the cleaner can suck sewage and solid waste into a collection bin at the same time, which is convenient and reduce the labour intensity. After the cleaner works for a period of time, matter in the collection bin needs to be cleaned up, and there are sewage and all kinds of solid waste, such as hairs, flakes, bars, or large particles of dust, in the collection bin.

If there is no separation apparatus on the collection bin, after the matter in the bin is poured into a sewer or a toilet, the matter, such as hairs, flakes, bars, or large particles of dust, in the collection bin easily causes the blockage of the sewer or the toilet, which brings inconvenience to people.

If a collection bin is the collection bin provided in the embodiment of the present disclosure, the bin main body is connected with a separation apparatus. When in use, the bin main body is first tilted, the matter in the bin main body flows to the pouring port via the pouring path, and when passing through the pouring path, the matter in the bin is filtered by the filtering plate. Water flows out via filtering holes and is poured into the sewer or the toilet. The solid matter is isolated in the bin by the filtering plate, so that the liquid waste and the solid waste are separated. After the water is poured out, the solid waste remaining in the bin can be poured into a trash can.

Application Scenario II

In Application Scenario I, a collection bin is the collection bin provided in the embodiment of the present disclosure, and when matter in the bin is poured out of the collection bin, the connecting bracket provides a supporting force for the entire separation apparatus, which prevents the separation apparatus from being separated from the bin main body when the matter is poured out of the bin main body. Meanwhile, the connecting bracket extends into the bin main body to avoid occupying a space outside the bin main body.

Application Scenario III

In Application Scenario I, a collection bin is the collection bin provided in the embodiment of the present disclosure, and when matter in the bin is poured out of the collection bin, solid waste remains on the filtering plate. At this time, the separation apparatus can be detached from the bin main body, so that the solid waste can be cleaned conveniently. After the solid waste is thoroughly cleaned, the separation apparatus is mounted to the bin main body again.

In practice applications, after a cleaner or a dust collector completes the cleaning, a collection bin can be detached from a main machine body, so that matter in the collection bin can be poured out conveniently, and after the matter in the bin is poured out, the collection bin can be connected to the main machine body again. After the collection bin is connected to the main machine body, air leakage may occur, thereby affecting the tightness between the collection bin and the main machine body, causing a failure in complete transferring of a suction force of the main machine body into the collection bin, and affecting collection of waste from a pipeline by the collection bin. In order to better guarantee the tightness between the collection bin and the main machine body, a sealing ring usually has a round of outward curled edge, that is, the curled edge extends away from a central axis of the sealing ring. Although a good sealing effect can be achieved by the outward curled edge, due to assembly factors, inward curling of the curled edge easily occurs to cause air leakage. For example, during assembly, a front curled edge, close to an assembly direction, of the sealing ring tends to rub against a lower edge of the main machine body, resulting in inward curling, that is, the outward curled edge is reversely curled under the resistance of the lower edge of the main body, thereby causing untight sealing, and resulting in air leakage due to a gap between the collection bin and the main machine body.

In view of the above problems, the embodiment of the present disclosure further provides a collection bin, a filter assembly, and a cleaning apparatus to solve the above technical problems. Extending directions of a first curled edge and a second curled edge of a sealing ring are opposite to an assembly direction, and during assembly, reverse curling does not occur, thereby avoiding air leakage caused by reverse curling of the curled edges of the sealing ring, and preventing the sealing effect of the collection bin from being affected.

Embodiment 5

Figure 12A:
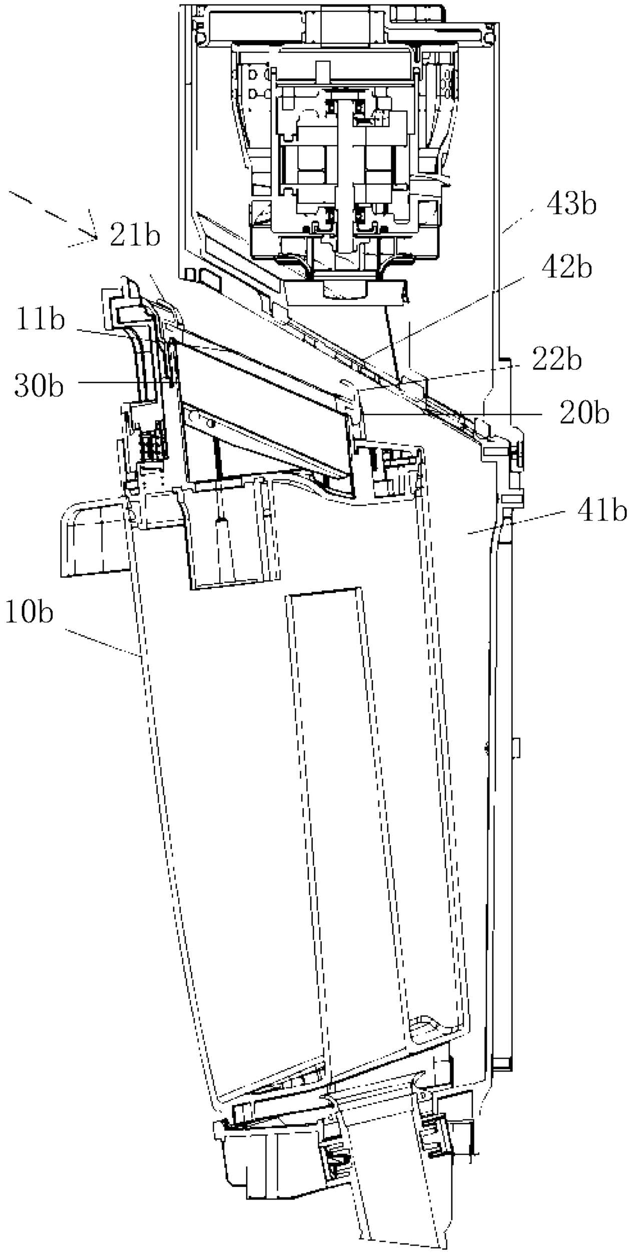
FIG. 12*a* is a schematic diagram of a cross-sectional structure of a cleaning apparatus including a collection bin according to an embodiment of the present disclosure, where the collection bin is in an unassembled state.
Figure 12B:
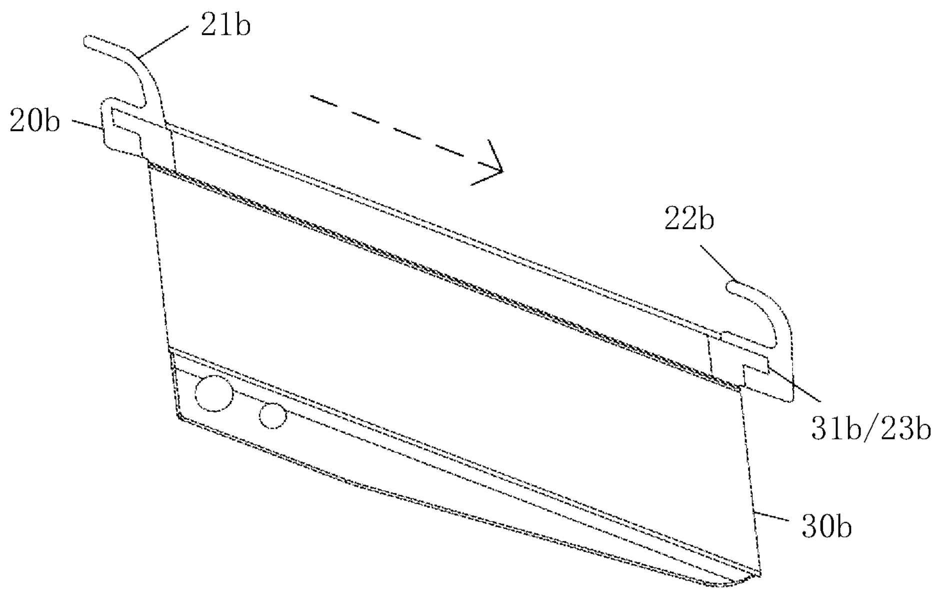
FIG. 12*b* is a schematic diagram of a cross-sectional structure of a sealing ring connected with a bracket according to an embodiment of the present disclosure.

FIG. 12*a* is a schematic diagram of a cross-sectional structure of a cleaning apparatus including a collection bin according to an embodiment of the present disclosure, where the collection bin is in an unassembled state. FIG. 12*b* is a schematic diagram of a cross-sectional structure of a sealing ring connected with a supporting bracket according to an embodiment of the present disclosure, as shown in FIGS. 12*a* and 12*b*.

An embodiment of the present disclosure provides a collection bin, which includes: a bin body 10*b* and a sealing ring 20*b*. The bin body 10*b* has an air outlet 11*b*. The sealing ring 20*b* surrounds a periphery of the air outlet 11*b*. A second curled edge 22*b* and a first curled edge 21*b* are respectively formed at the front and the rear of the sealing ring 20*b* along an assembly direction of the bin body 10*b*, and extending directions of the first curled edge 21*b* and the second curled edge 22*b* are opposite to the assembly direction. It should be noted that the extending direction here refers to a curling trend direction of the curled edge, or it can be understood that the extending direction refers to a curling direction of the curled edge and does not refer to a length direction of the curled edge.

According to the technical solutions provided in the embodiment of the present disclosure, the sealing ring 20*b* surrounds the periphery of the air outlet 11*b* of the bin body 10*b*, and the first curled edge 21*b* and the second curled edge 22*b* of the sealing ring extend away from the assembly direction, and therefore, when the collection bin is assembled along the assembly direction, even if the first curled edge 21*b* and the second curled edge 22*b* rub against a foreign object, they will not be curled reversely, thereby avoiding air leakage caused by reverse curling of the curled edges of the sealing ring, and preventing the sealing effect of the collection bin from being affected.

It should be noted that in the embodiment of the present disclosure, a dotted arrow direction shown in FIG. 12*a* and FIG. 12*b* is an assembly direction of the collection bin. The collection bin can be matched with a main machine 43*b* of a cleaning apparatus in use, and the main machine 43*b* and the collection bin are combined to form the cleaning apparatus. It should be noted that the main machine 43*b* is not completely shown in FIG. 12*a*, only a main motor apparatus and part of a housing of the main machine 43*b* are shown in FIG. 12*a*, and other components that are not shown include but are not limited to a handle, a clear water bin, and a vacuum head.

Figure 12C:
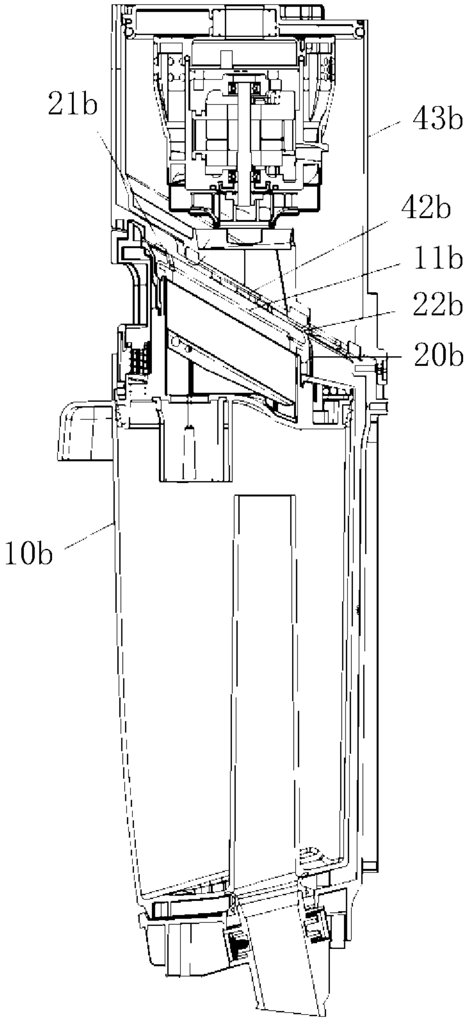
FIG. 12*c* is a schematic diagram of a cross-sectional structure of the cleaning apparatus including the collection bin according to an embodiment of the present disclosure, where the collection bin is in an assembled state.

In a possible implementation of the main machine 43*b*, a mounting cavity 41*b* is formed on the main machine 43*b*, and an air inlet 42*b* is formed in the mounting cavity 41*b*. The bin body 10*b* of the collection bin enters the mounting cavity 41*b* along the assembly direction and is connected with the main machine 43*b*, the air outlet 11*b* and the air inlet 42*b* are communicated, and the sealing ring 20*b* seals a gap between the air outlet 11*b* and the air inlet 42*b*. The first curled edge 21*b* and the second curled edge 22*b* correspondingly seal the gap between the air outlet 11*b* and the air inlet 42*b*. When the collection bin is assembled along the assembly direction, because the extending directions of the first curled edge 21*b* and the second curled edge 22*b* are opposite to the assembly direction, which can be also understood as that the first curled edge 21*b* and the second curled edge 22*b* extend along a moving direction of the main machine 43*b*, even if the first curled edge 21*b* and the second curled edge 22*b* rub against the main machine 43*b*, for example, rub against a lower edge of the air inlet 42*b*, they will not be curled reversely, thereby avoiding air leakage caused by reverse curling, and preventing the sealing between the collection bin and the main machine 43*b* from being affected. A state of the collection bin mounted on the main machine 43*b* is shown in FIG. 12*c*.

In the embodiment of the present disclosure, a shape of the air outlet 11*b* includes but is not limited to a rectangle shape, a round shape, and other shapes. Taking a rectangular air outlet 11*b* as an example, the air outlet 11*b* includes four side lines among which two opposite side lines are arranged in tandem along the assembly direction, and it can be also understood that length directions of the two side lines are substantially perpendicular to the assembly direction. The first curled edge 21*b* and the second curled edge 22*b* are arranged on the two side lines, and the extending directions of the first curled edge 21*b* and the second curled edge 22*b* are opposite to the assembly direction. In order to guarantee the sealing performance of the sealing ring 20*b*, the sealing ring 20*b* may be made of an elastic material.

Further, in a possible embodiment of the present disclosure, the length directions of the first curled edge 21*b* and the second curled edge 22*b* are both perpendicular to the assembly direction. The first curled edge 21*b* extends away from a central axis of the sealing ring 20*b*. The second curled edge 22*b* extends towards the central axis of the sealing ring 20*b*. It should be noted that the central axis of the sealing ring 20*b* here refers to an axial line perpendicular to a plane where the sealing ring 20*b* is located and passing through a center of the sealing ring 20*b*. The central axis of the sealing ring 20*b* is located inside the sealing ring 20*b*. Further, it can be also understood as that the first curled edge 21*b* extends away from an interior of the sealing ring 20*b*. The second curled edge 22*b* extends towards the interior of the sealing ring 20*b*.

With continuous reference to FIG. 12*a* and FIG. 12*b*, when the collection bin is assembled along the assembly direction, the main machine 43*b* moves from the second curled edge 22*b* relative to the collection bin, passes through the central axis of the sealing ring 20*b*, and gradually approaches the first cured edge 21*b*, and the second curled edge 22*b* enters the mounting cavity 41*b* of the main machine 43*b* earlier than the first curled edge 21*b*, and therefore, according to the sequence, the second curled edge 22*b* is located in front of the first curled edge 21*b*. In order to avoid reverse curling of the second curled edge 22*b*, the second curled edge 22*b* extends along the moving direction of the main machine 43*b*, that is, the second curled edge 22*b* extends towards the center axis of the sealing ring 20*b*. In order to avoid reverse curling of the first curled edge 21*b*, the first curled edge 21*b* also extends along the moving direction of the main machine 43*b*, that is, the first curled edge 21*b* extends away from the center axis of the sealing ring 20*b*.

In order to further improve the sealing effect of the sealing ring 20*b*, in the embodiment of the present disclosure, the sealing ring 20*b* further has a third curled edge formed between the first curled edge 21*b* and the second curled edge 22*b*. The third curled edge extends away from the central axis of the sealing ring 20*b*. It can be also understood as that the third curled edge extends away from the interior of the sealing ring 20*b*. Taking a rectangular air outlet 11*b* as an example, the air outlet 11*b* includes four side lines among which two opposite side lines are arranged in tandem along the assembly direction, and the first curled edge 21*b* and the second curled edge 22*b* are arranged on the two side lines. The third curled edges are formed on the other two opposite side lines, and the tightness of a position between the first curled edge 21*b* and the second curled edge 22*b* is improved by the third curled edges. Preferably, a length direction of the third curled edge is parallel to the assembly direction. In the embodiment of the present disclosure, the first curled edge 21*b*, the second curled edge 22*b*, the third cured edge, and the sealing ring 20*b* are of an integrated structure.

In a possible embodiment of the present disclosure, the third curled edge is connected with the first curled edge 21*b* and the second curled edge 22*b*, respectively. The first curled edge 21*b*, the second curled edge 22*b*, and the third curled edge surround the periphery of the air outlet 11*b*. After the first curled edge 21*b*, the second curled edge 22*b*, and the third curled edge are connected, a round of curled edge is formed in the sealing ring 20*b*, so that a gap between the first curled edge 21*b*, the second curled edge 22*b*, and the third curled edge is avoided, the sealing performance of the sealing ring 20*b* is improved, and air leakage between the collection bin and the main machine 43*b* is avoided.

In the embodiment of the present disclosure, the sealing ring 20*b* is configured to seal the gap between the air outlet 11*b* of the collection bin and the air inlet 42*b* of the main machine 43*b*, and therefore, one method for connecting the sealing ring 20*b* is that the sealing ring 20*b* is connected with the bin body 10*b*. The connection between the sealing ring 20*b* and the bin body 10*b* includes but is not limited to a detachable connection, for example, a sealing groove is formed on an end surface of the air outlet 11*b*, the sealing ring 20*b* is embedded in the sealing groove by interference, and the first curled edge 21*b* and the second curled edge 22*b* of the sealing ring 20*b* are located outside the sealing groove. When the bin body 10*b* of the collection bin enters the mounting cavity 41*b* along the assembly direction and is connected to the main machine 43*b*, the air outlet 11*b* and the air inlet 42*b* are communicated, and the sealing ring 20*b* seals the gap between the air outlet 11*b* and the air inlet 42*b*. The first curled edge 21*b* and the second curled edge 22*b* correspondingly seal the gap between the air outlet 11*b* and the air inlet 42*b*.

Another method for connecting the sealing ring 20*b* is that in a possible embodiment of the present disclosure, the bin body 10*b* includes a receiving cavity communicated with the air outlet 11*b* and a filter assembly arranged in the receiving cavity, and the sealing ring 20*b* is connected with the filter assembly. The filter assembly includes but is not limited to a HEPA (High efficiency particulate air Filter) assembly, a cotton filter assembly, a filter screen assembly, a filter pipe assembly, etc. The air in the collection bin can be filtered by the filter assembly and then flows out of the air outlet 11*b*, impurities, such as dust, contained in the air are intercepted by the filter assembly, and then the clean air flows to the main motor apparatus of the main machine 43*b*. The filter assembly may be used as a part of the collection bin or as a separate component. In order to replace the filter assembly conveniently, the filter assembly is detachably connected to the inside of the receiving cavity.

A possible method for connecting the sealing ring 20*b* to the filter assembly is that the filter assembly is detachably connected to the inside of the receiving cavity and partially extends out of the air outlet 11*b*. The sealing ring 20*b* is connected with the part, extending out of the air outlet 11*b*, of the filter assembly. After being connected with the filter assembly, the sealing ring 20*b* surrounds the periphery of the air outlet 11*b* so as to seal the gap between the air outlet 11*b* and the air inlet 42*b*.

Further, with reference to FIG. 12*a* and FIG. 12*b*, in a possible embodiment of the present disclosure, the filter assembly includes a bracket 30*b* and a filter (not shown in the figures). The filter includes but is not limited to a HEPA filter, a cotton filter, a filter screen, a filter pipe, etc. The filter is connected with the bracket 30*b* and located in the receiving cavity. The bracket 30*b* is configured to support the filter and connect the filter assembly to the bin body 10*b*. If the sealing ring 20*b* is connected to the filter assembly, the sealing ring 20*b* is connected with the bracket 30*b*. In a possible implementation, part of the bracket 30*b* is located in the receiving cavity and connected with the bin body 10*b*, and part of the bracket 30*b* extends out of the receiving cavity and is connected with the sealing ring 20*b*. The part, located in the receiving cavity, of the bracket 30*b* is connected with the bin body 10*b* and supports the filter. The part, extending out of the receiving cavity, of the bracket 30*b* is connected with the sealing ring 20*b*.

A method for connecting the filter assembly to the sealing ring 20*b* is that a first clamping part 31*b* is arranged on the part, extending out of the air outlet 11*b*, of the filter assembly. A second clamping part 23*b* matched with the first clamping part 31*b* in use is arranged on the sealing ring 20*b*, and the first clamping part 31*b* is detachably connected with the second clamping part 23*b*. Specifically, with reference to FIG. 12*b*, the part, extending out of the air outlet 11*b*, of the filter assembly is a part of the bracket 30*b*, the first clamping part 31*b* is arranged on the bracket 30*b*, and the first clamping part 31*b* includes but is not limited to a bump. The second clamping part 23*b* is arranged on the sealing ring 20*b*, the second clamping part 23*b* includes but is not limited to a clamping groove matched with the bump in use, the sealing ring 20*b* is elastic, and after the sealing ring 20*b* is sleeved on the bump through the clamping groove, according to the elastic characteristics, the clamping groove wraps the bump by interference to connect the sealing ring 20*b* to the bracket 30*b*. Implementation methods and connection methods of the bump and the clamping groove are relatively simple, the sealing ring 20*b* can be quickly connected to the bracket 30*b*, and meanwhile, after the bump is connected with the clamping groove, the connection is firm and reliable, and the detachment does not easily occur.

Of course, in the embodiment of the present disclosure, the first clamping part 31*b* may be a bump, and the second clamping part 23*b* may be a clamping groove. Or, the first clamping part 31*b* is of a structure with a hump and a clamping groove that are arranged at intervals, and the second clamping part 23*b* is of a corresponding structure with a clamping groove and a hump that are arranged at intervals. Arrangements of the first clamping part 31*b* and the second clamping part 23*b* are not specifically limited in the embodiment of the present disclosure.

With continuous reference to FIG. 12*a*, in a possible embodiment of the present disclosure, the air outlet 11*b* is of an inclined structure. Accordingly, the air inlet 42*b* of the main machine 43*b* is of an inclined structure matching the air outlet 11*b*. Through the air outlet 11*b* of the inclined structure, the collection bin is easily mounted on the main machine 43*b*, and the air outlet 11*b* is easily communicated with the air inlet 42*b*.

An inclination direction of the inclined structure can be set according to different assembly requirements. A possible arrangement of the inclined structure is that along the assembly direction, the height of the air outlet 11*b* gradually decreases from back to front relative to the bin body 10*b*, and the height of the first curled edge 21*b* is greater than that of the second curled edge 22*b*. The height of the air outlet 11*b* of the main machine 43*b* also correspondingly gradually decreases relative to the air outlet 11*b* of this structure, that is, the space is gradually reduced from an opening of the mounting cavity 41*b* to an interior of the mounting cavity 41*b*, and through the mounting cavity 41*b* of this structure, the collection bin is easily mounted in the mounting cavity 41*b*. The height of the first curled edge 21*b* is greater than that of the second curled edge 22*b*, and when the collection bin is assembled along the assembly direction, the second curled edge 22*b* enters the mounting cavity 41*b* of the main machine 43*b* earlier than the first curled edge 21*b*, so that the collection bin is mounted smoothly.

Of course, according to different assembly requirements, the inclination direction of the inclined structure may also be that along the assembly direction, the height of the air outlet 11*b* gradually increases from back to front relative to the bin body 10*b*, and the height of the first curled edge 21*b* is less than that of the second curled edge 22*b*.

In order to better achieve the filtering effect of the filter assembly on the air outlet 11*b*, with reference to FIG. 12*a* and FIG. 12*b*, a surface, facing the air outlet 11*b*, of the filter is of an inclined structure matching the air outlet 11*b*. Accordingly, the bracket 30*b* is of an inclined structure matching the filter. Through the filter and the air outlet 11*b* of matching inclined structures, the filter can be adaptively filled in the air outlet 11*b* to ensure that the air flowing out of the air outlet 11*b* is necessarily filtered by the filter, thereby preventing impurities such as dust from entering the main machine 43*b*.

It should be noted that the collection bin of Embodiment 5 described above may also have the separation apparatus in the embodiments shown in FIG. 11*a* to FIG. 11*f*, and the description of the separation apparatus can refer to the previous embodiments and will not be described again here.

Embodiment 6

On the basis of Embodiment 5, Embodiment 6 of the present disclosure further provides a filter assembly, which can be used as a separate component or can be matched with the collection bin of Embodiment 5 in use. Implementations of the filter assembly of Embodiment 6 can refer to the implementations of Embodiment 5. A specific solution is as follows:

with reference to FIG. 12*a* and FIG. 12*b*, the embodiment of the present disclosure further provides a filter assembly, which includes: a filter (not shown), a bracket 30*b*, and a sealing ring 20*b*. The filter includes an air inlet surface and an air outlet surface. The filter is arranged on the bracket 30*b*. The sealing ring 20*b* is connected with the bracket 30*b* and surrounds a periphery of the air outlet surface. A second curled edge 22*b* and a first curled edge 21 are respectively formed at the front and the rear of the sealing ring 20*b* along an assembly direction of the filter, and extending directions of the first curled edge 21*b* and the second curled edge 22*b* are opposite to the assembly direction. It should be noted that the extending direction here refers to a curling trend direction of the curled edge, or it can be understood that the extending direction refers to a curling direction of the curled edge and does not refer to a length direction of the curled edge.

According to the technical solutions provided in the embodiment of the present disclosure, the first curled edge 21*b* and the second curled edge 22*b* of the sealing ring 20*b* extend away from the assembly direction, and therefore, when the filter assembly is assembled along the assembly direction, even if the first curled edge 21*b* and the second curled edge 22 rub against a foreign object, they will not be curled reversely, thereby avoiding air leakage caused by reverse curling of the curled edges of the sealing ring 20*b*, and preventing the sealing effect of the filter assembly from being affected.

It should be noted that the filter assembly of Embodiment 6 of the present disclosure can be matched with the collection bin of Embodiment 5 described above or other types of collection bins in use. The assembly direction of Embodiment 6 of the present disclosure does not refer to an assembly direction in which the filter assembly is mounted on the collection bin, but refers to an assembly direction in which the filter assembly is mounted on a main machine 43*b* of a cleaning apparatus under the driving of the collection bin after the filter assembly is mounted on the collection bin, and the dotted arrow direction shown in FIG. 12*a* and FIG. 12*b* is the assembly direction of the filter assembly. After being mounted on the collection bin, the filter assembly is mounted on the main machine 43*b* together with the collection bin.

The collection bin can be matched with the main machine 43*b* of the cleaning apparatus in use, and the main machine 43*b* and the collection bin are combined to form the cleaning apparatus. It should be noted that the main machine 43*b* is not completely shown in FIG. 12*a*, only a main motor apparatus and part of a housing of the main machine 43*b* are shown in FIG. 12*a*, and others components that are not shown include but are not limited to a handle, a clear water bin, and a vacuum head. In a possible implementation of the main machine 43*b*, a mounting cavity 41*b* is arranged on the main machine 43*b*, and an air inlet 42*b* is formed in the mounting cavity 41*b*. The collection bin includes a bin body 10*b* having an air outlet 11*b*. After the filter assembly is mounted on the collection bin, the sealing ring 20*b* surrounds a periphery of the air outlet 11*b*. The bin body 10*b* of the collection bin enters the mounting cavity 41*b* along the assembly direction and is connected with the main machine 43*b*, the air outlet 11*b* is communicated with the air inlet 42*b*, and the sealing ring 20*b* seals a gap between the air outlet 11*b* and the air inlet 42*b*. The first curled edge 21*b* and the second curled edge 22*b* respectively seal the gap between the air outlet 11*b* and the air inlet 42*b*. When the collection bin is assembled along the assembly direction, because the extending directions of the first curled edge 21*b* and the second curled edge 22*b* are opposite to the assembly direction, which can be also understood as that the first curled edge 21*b* and the second curled edge 22*b* extend along a moving direction of the main machine 43*b*, even if the first curled edge 21*b* and the second curled edge 22*b* rub against the main machine 43*b*, for example, rub against a lower edge of the air inlet 42*b*, they will not be curled reversely, thereby avoiding air leakage caused by reverse curling, and preventing the tightness between the collection bin and the main machine 43*b* from being affected. A state of the collection bin mounted on the main machine 43*b* is shown in FIG. 12*c*.

In the embodiment of the present disclosure, a shape of the air outlet surface includes but is not limited to a rectangle shape, a round shape, and other shapes, and the bracket 30*b* is matched with the air outlet surface in shape. Taking a rectangle air outlet surface as an example, the air outlet surface includes four side lines among which two opposite side lines are arranged in tandem along the assembly direction, and it can be also understood as that length directions of the two side lines are substantially perpendicular to the assembly direction. The first curled edge 21*b* and the second curled edge 22*b* are arranged on the two side lines, and the extending directions of the first curled edge 21*b* and the second curled edge 22*b* are opposite to the assembly direction. In order to guarantee the sealing performance of the sealing ring 20*b*, the sealing ring 20*b* may be made of an elastic material.

Further, with reference to FIG. 12*b*, a method for connecting the bracket 30 to the sealing ring 20 *b* is that a first clamping part 31*b* is arranged on the bracket 30*b*. A second clamping part 23*b* matched with the first clamping part 31*b* in use is arranged on the sealing ring 20*b*, and the first clamping part 31*b* is detachably connected with the second clamping part 23*b*. The first clamping part 31*b* includes but is not limited to a bump. The second clamping part 23*b* includes but is not limited to a clamping groove matched with the bump in use, the sealing ring 20*b* is elastic, after the sealing ring 20*b* is sleeved on the bump through the clamping groove, according to the elastic characteristics, the clamping groove wraps the bump by interference to connect the sealing ring 20*b* to the bracket 30*b*. Implementation methods and connection methods of the bump and the clamping groove are relatively simple, the sealing ring 20*b* can be quickly connected to the bracket 30*b*, and meanwhile, after the bump is connected to the clamping groove, the connection is firm and reliable, and the detachment does not easily occur.

Of course, in the embodiment of the present disclosure, the first clamping part 31*b* may be a bump, and the second clamping part 23*b* may be a clamping groove. Or, the first clamping part 31*b* is of a structure with a hump and a clamping groove that are arranged at intervals, and the second clamping part 23*b* is of a corresponding structure with a clamping groove and a hump that are arranged at intervals. Arrangements of the first clamping part 31*b* and the second clamping part 23*b* are not specifically limited in the embodiment of the present disclosure.

In a possible embodiment of the present disclosure, the air outlet surface is of an inclined structure. The air outlet surface of the inclined structure can be matched with an air outlet 11*b* of an inclined structure in use. The air outlet 11*b* of the collection bin is of an inclined structure, and accordingly, the air inlet 42*b* of the main machine 43*b* is of an inclined structure matching the air outlet 11*b*. Through the air outlet 11*b* of the inclined structure, the collection bin is easily mounted on the main machine 43*b*, and the air outlet 11*b* is easily communicated with the air inlet 42*b*. Through the air outlet surface of the inclined structure, the filter can be adaptively filled in the air outlet 11*b* to ensure that the air flowing out of the air outlet 11*b* is necessarily filtered by the filter, thereby preventing impurities such as dust from entering the main machine 43*b* and achieving a better filtering effect of the filter assembly on the air outlet 11*b*.

An inclination direction of the inclined structure of the air outlet surface can be set according to different assembly requirements. A possible arrangement of the inclined structure is that along the assembly direction, the height of the air outlet surface gradually decreases from back to front, and the height of the first curled edge 21*b* is greater than that of the second curled edge 22*b*. The air outlet 11*b* of the collection bin is of an inclined structure matching the air outlet surface of this structure, and the height of the air outlet 11*b* of the main machine 43*b* also correspondingly gradually decreases, that is, the space is gradually reduced from an opening of the mounting cavity 41*b* to an interior of the mounting cavity 41*b*, and through the mounting cavity 41*b* of this structure, the collection bin is easily mounted in the mounting cavity 41*b*. The height of the first curled edge 21*b* is greater than that of the second curled edge 22*b*, and when the collection bin is assembled along the assembly direction, the second curled edge 22*b* enters the mounting cavity 41*b* of the main machine 43*b* earlier than the first curled edge 21*b*, so that the collection bin is mounted smoothly.

Of course, according to different assembly requirements, the inclination direction of the inclined structure of the air outlet surface may also be that along the assembly direction, the height of the air outlet surface gradually increases from back to front, and the height of the first curled edge 21*b* is less than that of the second curled edge 22*b*.

Further, in a possible embodiment of the present disclosure, the length directions of the first curled edge 21*b* and the second curled edge 22*b* are both perpendicular to the assembly direction. The first curled edge 21*b* extends away from a central axis of the sealing ring 20*b*. The second curled edge 22*b* extends towards the central axis of the sealing ring 20*b*. It should be noted that the central axis of the sealing ring 20*b* here refers to an axial line perpendicular to a plane where the sealing ring 20*b* is located and passing through a center of the sealing ring 20*b*. The central axis of the sealing ring 20*b* is located in the sealing ring 20*b*. Further, it can be also understood as that the first curled edge 21*b* extends away from an interior of the sealing ring 20*b*. The second curled edge 22*b* extends towards the interior of the sealing ring 20*b*.

With continuous reference to FIG. 12*a* and FIG. 12*b*, when the filter assembly is assembled together with the collection bin along the assembly direction, the main machine 43*b* moves from the second curled edge 22*b* relative to the filter assembly, passes through the central axis of the sealing ring 20*b*, and gradually approaches the first curled edge 21*b*. The second curled edge 22*b* enters the mounting cavity 41*b* of the main machine 43*b* earlier than the first curled edge 21*b*, and therefore, according to the sequence, the second curled edge 22*b* is located in front of the first curled edge 21*b*. In order to avoid reverse curling of the second curled edge 22*b*, the second curled edge 22*b* extends along the moving direction of the main machine 43*b*, that is, the second curled edge 22*b* extends towards the center axis of the sealing ring 20*b*. In order to avoid reverse curling of the first curled edge 21*b*, the first curled edge 21*b* also extends along the moving direction of the main machine 43*b*, that is, the first curled edge 21*b* extends away from the center axis of the sealing ring 20*b*.

In order to further improve the sealing effect of the sealing ring 20*b*, in the embodiment of the present disclosure, the sealing ring 20*b* further has a third curled edge formed between the first curled edge 21*b* and the second curled edge 22*b*. The third curled edge extends away from the central axis of the sealing ring 20*b*. It can be also understood as that the third curled edge extends away from the interior of the sealing ring 20*b*. Taking a rectangular air outlet surface as an example, the air outlet surface includes four side lines among which two opposite side lines are arranged in tandem along the assembly direction, and the first curled edge 21*b* and the second curled edge 22*b* are arranged on the two side lines. The third curled edges are formed on the other two opposite side lines, and the tightness of a position between the first curled edge 21*b* and the second curled edge 22*b* is improved by the third curled edges. Preferably, a length direction of the third curled edge is parallel to the assembly direction. In the embodiment of the present disclosure, the first curled edge 21*b*, the second curled edge 22*b*, the third cured edge, and the sealing ring 20*b* are of an integrated structure.

In a possible embodiment of the present disclosure, the third curled edge is connected with the first curled edge 21*b* and the second curled edge 22*b*, respectively. The first curled edge 21*b*, the second curled edge 22*b*, and the third curled edge surround the periphery of the air outlet surface. After the first curled edge 21*b*, the second curled edge 22*b*, and the third curled edge are connected, a round of curled edge is formed in the sealing ring 20*b*, so that a gap between the first curled edge 21*b*, the second curled edge 22*b* and the third curled edge is avoided, the sealing performance of the sealing ring 20*b* is improved, and air leakage between the collection bin and the main machine 43*b* is avoided.

It should be noted that the technical features of the sealing ring 20*b* of Embodiment 6 can refer to the implementations of the sealing ring 20*b* of Embodiment 5, and the relevant technical features of Embodiment 6 can refer to the technical features of Embodiment 5 and will not be described again here.

Embodiment 7

On the basis of Embodiment 5 and Embodiment 6, Embodiment 7 of the present disclosure further provides a cleaning apparatus, which includes a main machine 43*b* and a collection bin. The collection bin may be implemented by the collection bin of Embodiment 5, and a filter assembly may be implemented by the filter assembly of Embodiment 5 or Embodiment 6. A specific solution is as follows:

with reference to FIG. 12*a* to FIG. 12*c*, the embodiment of the present disclosure further provides a cleaning apparatus, which includes: a main machine 43*b* and a collection bin. A mounting cavity 41*b* is arranged on the main machine 43*b*, and an air inlet 42*b* is formed in the mounting cavity 41*b*. The collection bin includes: a bin body 10*b* and a sealing ring 20*b*. The bin body 10*b* has an air outlet 11*b*; the sealing ring 20*b* surrounds a periphery of the air outlet 11*b*; a second curled edge 22*b* and a first curled edge 21*b* are formed at the front and the rear of the sealing ring 20*b* along an assembly direction of the bin body 10*b*, and extending directions of the first curled edge 21*b* and the second curled edge 22*b* are opposite to the assembly direction. The bin body 10*b* enters the mounting cavity 41*b* along the assembly direction and is connected with the main machine 43*b*, the air outlet 11*b* is communicated with the air inlet 42*b*, and the sealing ring 20*b* seals a gap between the air outlet 11*b* and the air inlet 42*b*.

According to the technical solutions provided in the embodiment of the present disclosure, the sealing ring 20*b* surrounds the periphery of the air outlet 11*b* of the bin body 10*b*, the first curled edge 21*b* and the second curled edge 22*b* of the sealing ring 20*b* extend in a direction opposite to the assembly direction, and therefore, when the collection bin is assembled along the assembly direction, even if the first curled edge 21*b* and the second curled edge 22*b* rub against a foreign object such as the main machine 43*b*, they will not be curled, thereby avoiding air leakage caused by reverse curling of the curled edges of the sealing ring 20*b*, and preventing the tightness between the collection bin and the main machine 43*b* from being affected. It should be noted that in the embodiment of the present disclosure, the extending direction refers to a curling trend direction of the curled edge, or it can be also understood that the extending direction refers to a curling direction of the curled edge and does not refer to a length direction of the curled edge.

In the embodiment of the present disclosure, the cleaning apparatus includes but is not limited to the cleaning apparatus shown in FIG. 12*a*, a self-moving cleaning robot, a hand-held dust collector, an upright cleaner, etc. In the embodiment of the present disclosure, the main machine 43*b* of the cleaning apparatus includes but is not limited to a machine body of a self-moving cleaning robot, a machine body of a hand-held dust collector, and a machine body of an upright cleaner.

The cleaning apparatus described in the above and below embodiments is described by taking the cleaning apparatus shown in FIG. 12*a* as an example. It should be noted that the description of the cleaner shown in FIG. 12*a* is by way of example only and should not be construed as unduly limiting the embodiment of the present disclosure.

A mounting cavity 41*b* is arranged on a main machine 43*b*, a suction port is formed at the bottom of the mounting cavity 41*b*, a suction mechanism is further arranged in the main machine 43*b*, and the suction mechanism includes a main motor apparatus which is configured to provide a negative pressure suction force for suction. An air flow channel is formed among the suction port, the collection bin, and the suction mechanism. The suction mechanism is configured to produce negative pressure at work, so that waste, including but not limited to water, dust, paper, hair, etc., near the suction port is sucked into a waste receiving cavity of the main machine 43*b* by the collection bin and the suction port.

Technical features of the collection bin of Embodiment 7 can refer to the implementations of the collection bin of Embodiment 5, technical features of the filter assembly of Embodiment 7 can refer to the implementations of the filter assembly of Embodiment 5 or Embodiment 6, and relevant technical features of Embodiment 7 can refer to the technical features of Embodiment 5 or Embodiment 6, which will not be described again here.

The technical solutions adopted by the present disclosure will be described below in conjunction with specific application scenarios to facilitate understanding. The following application scenarios are described by taking a cleaner as an example.

Application Scenario IV

When the collection bin is assembled along the dotted arrow direction shown in FIG. 12*a* and FIG. 12*b*, the extending directions of the first curled edge and the second curled edge are opposite to the assembly direction, which can be also understood as that the first curled edge and the second curled edge extend along a moving direction of the main machine, and therefore, even if the first curled edge and the second curled edge rub against the main machine, for example, rub against a lower edge of the air inlet, they will not be curled reversely. After assembly is finished, the bin body of the collection bin enters the mounting cavity along the assembly direction and is connected with the main machine, the air outlet is communicated with the air inlet, and the sealing ring seals the gap between the air outlet and the air inlet. The first curled edge and the second curled edge correspondingly seal the gap between the air outlet and the air inlet. During assembly, the first curled edge and the second curled edge are not curled reversely, thereby avoiding air leakage caused by reverse curling, and preventing the tightness between the collection bin and the main machine from being affected.

Application Scenario V

The filter assembly is a separate component, and is mounted in the air outlet of the collection bin before the collection bin is assembled on the main machine. The filter assembly is detachably connected with the collection bin, so that users may clean or replace the filter assembly conveniently.

When the collection bin is assembled on the main machine along the assembly direction, the filter assembly on the collection bin is obliquely assembled on the main machine. The extending directions of the first curled edge and the second curled edge are opposite to the assembly direction, and therefore, even if the first curled edge and the second curled edge rub against the main machine, for example, rub against a lower edge of the air inlet, they will not be curled reversely. After assembly is finished, the bin body of the collection bin enters the mounting cavity along the assembly direction and is connected with the main machine, the air outlet is communicated with the air inlet, and the sealing ring seals the gap between the air outlet and the air inlet. The first curled edge and the second curled edge correspondingly seal the gap between the air outlet and the air inlet. During assembly, the first curled edge and the second curled edge are not curled reversely, thereby avoiding air leakage caused by reverse curling, and preventing the tightness between the collection bin and the main machine from being affected.

In practice applications, after the cleaner cleans the ground with water, and the whole cleaner is shut down, a pool of water usually remains on the ground near the soft rubber scraper, which causes secondary contamination to the ground and reduces the cleaning efficiency of the cleaner. For example, when seeing that sewage on the ground is cleaned up, a user will shut down the machine immediately, at this time, sewage in the suction pipeline of the cleaner is not completely sucked into the collection bin, and the sewage remaining in the suction pipeline will flow out along the suction pipeline and fall down along the scraper, leaving a pool of water on the ground.

The reason is that a surface, facing the suction pipeline, of the soft rubber scraper is relatively smooth without a structure for preventing matter such as water from falling down, and therefore, after shutdown, the sewage remaining in the suction pipeline flows out along the suction pipeline and flows down along the scraper with a smooth surface.

In view of the above problems, the embodiment of the present disclosure provides a vacuum head, a cleaning apparatus, and a self-moving cleaning robot to solve the above technical problems. Dirt that moves from a scraper assembly to a surface to be cleaned can be stored in a first storage groove on the scraper assembly, thereby preventing the dirt from remaining on a surface to be cleaned near the scraper assembly, and improving the cleaning efficiency.

The surface to be cleaned may be a surface such as the ground, the floor, and a carpet.

Embodiment 8

Figure 13A:
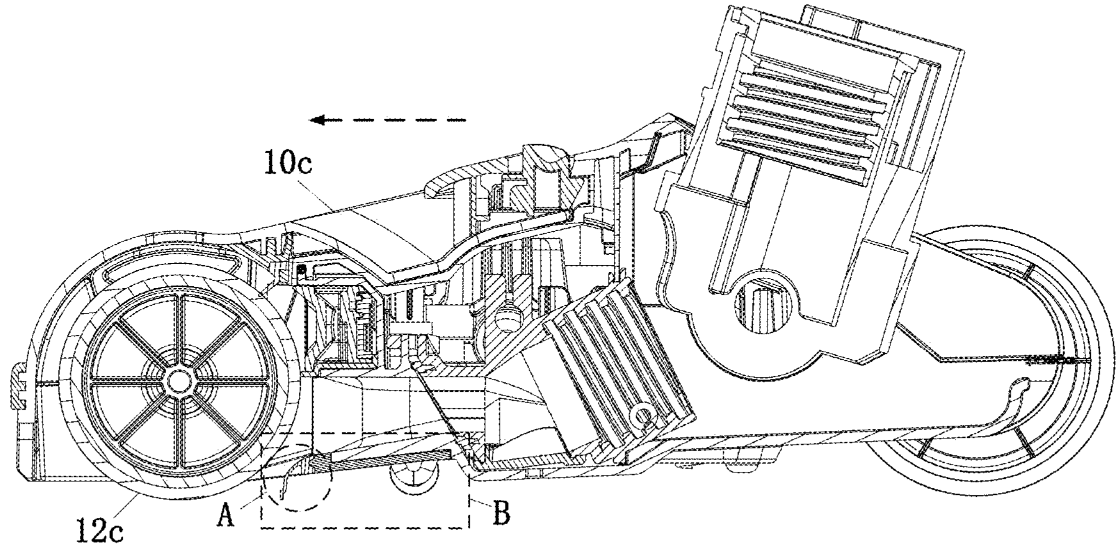
FIG. 13*a* is a schematic diagram of a cross-sectional structure of a vacuum head according to an embodiment of the present disclosure.
Figure 13B:
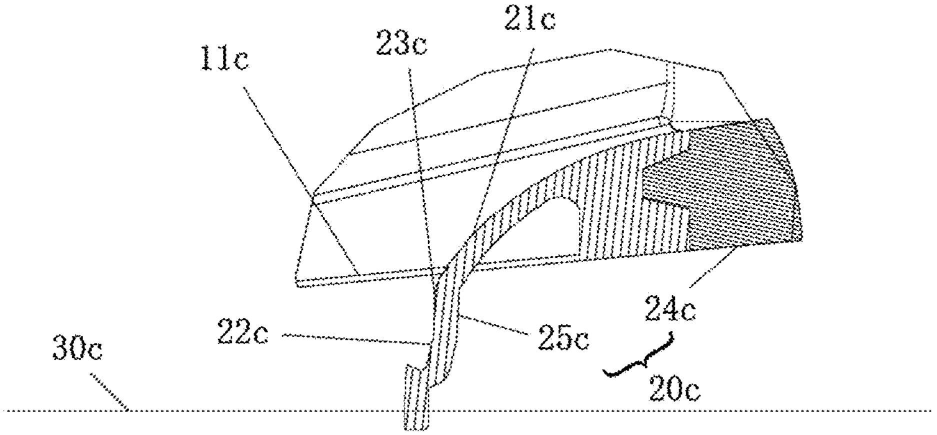
FIG. 13*b* is an enlarged view of A in FIG. 13*a;*

FIG. 13*a* is a schematic diagram of a cross-sectional structure of a vacuum head according to an embodiment of the present disclosure, and FIG. 13*b* is an enlarged view of A in FIG. 13*a*, as shown in FIG. 13*a* and FIG. 13*b*.

An embodiment of the present disclosure provides a vacuum head, which includes: a body 10*c* and a scraper assembly 20*c*. A suction port 11*c* is formed at the bottom of the body 10*c*. The scraper assembly 20*c* is arranged at the suction port 11*c*, one end of the scraper assembly 20*c* is connected with the body 10*c*, and the other end of the scraper assembly 20*c* faces a surface to be cleaned 30*c*. A first storage groove 22*c* is formed in the scraper assembly 20*c*. It should be noted that the above "faces a surface to be cleaned 30*c*" means that the other end of the scraper assembly extends towards the surface to be cleaned 30*c*. In the embodiment of the present disclosure, the other end of the scraper assembly 20*c* extends to abut against the surface to be cleaned 30*c*, but the other end of the scraper assembly 20*c* is not limited thereto, and in other embodiments, the other end of the scraper assembly 20*c* may be suspended above the surface to be cleaned.

According to the technical solutions provided in the embodiment of the present disclosure, the scraper assembly 20*c* can quickly gather dirt, such as sewage, dust, and scraps of paper, on the surface to be cleaned 30*c* together, so that the vacuum head at work can clean the surface to be cleaned 30*c* more quickly to achieve higher cleanliness of the surface to be cleaned 30*c*. Meanwhile, the first storage groove 22*c* is formed in the scraper assembly 20*c*, dirt that moves from the scraper assembly 20*c* to the surface to be cleaned 30*c* can be stored in the first storage groove 22*c*, thereby preventing the dirt from remaining on the surface to be cleaned 30*c* near the scraper assembly 20*c*, and improving the cleaning efficiency.

For example, in a possible embodiment of the present disclosure, the scraper assembly 20*c* has a matter guiding surface 21*c* for gathering dirt together, the first storage groove 22*c* is formed on the matter guiding surface 21*c*, and the suction port 11*c* is located in front of the matter guiding surface 21*c*. The first storage groove 22*c* may be formed on the matter guiding surface 21*c* or other parts of the scraper assembly 20*c*, for example, the first storage groove 22*c* is formed at a lower end of the scraper assembly 20*c*, or the first storage groove 22*c* is formed at an upper end of the scraper assembly 20*c*. One or more first storage grooves 22*c* may be formed, and if a plurality of first storage grooves 22*c* are formed, the plurality of first storage groove 22*c* are all formed on the matter guiding surface 21*c*, or respectively formed on the matter guiding surface 21*c*, the lower end of the scraper assembly 20*c*, and the upper end of the scraper assembly 20*c*. Of course, other arrangements are also included and will not be described here. It should be noted that in the embodiment of the present disclosure, the front and the rear are described relative to a traveling direction of the vacuum head, which is indicated by a dotted arrow direction shown in FIG. 13*a*, the arrow direction represents the front, and a direction opposite to the arrow direction represents the rear.

The scraper assembly 20*c* is elastic and can contact the ground by its own gravity and a supporting force of the body 10*c* of the vacuum head at normal work, so that the scraper assembly 20*c* can be attached to the ground well to gather dirt on the floor together. For example, sewage, dust, scraps of paper, etc., on the ground can be gathered together by the matter guiding surface 21*c*.

When moving, for example, along the dotted arrow direction shown in FIG. 13*a*, the vacuum head can gather dirt to the suction port 11*c* through the scraper assembly 20*c*, the suction port 11*c* sucks the dirt into the vacuum head through the suction channel, and the dirt is transported into the collection bin by the vacuum head, so that the surface to be cleaned 30*c* is cleaned.

After cleaning is finished, the dirt (including matter such as sewage) in the suction pipeline is not completely sucked into the collection bin in time, and the sewage remaining in the suction pipeline will flow out along the suction port 11*c* and flow down along the scraper assembly 20*c*. Because the first storage groove 22*c* is formed in the scraper assembly 20*c*, matter such as sewage directly enters the first storage groove 22*c* when flowing through the first storage groove 22*c*, thereby preventing the sewage from flowing onto the surface to be cleaned 30*c*.

In the embodiment of the present disclosure, the vacuum head includes but is not limited to the vacuum head shown in FIG. 13*a*, and floor bushes of a hand-held dust collector, an upright cleaner, etc. The vacuum head described in the above and below embodiments is described by taking the vacuum head shown in FIG. 13*a* as an example. It should be noted that the description of the vacuum head shown in FIG. 13*a* is by way of example only and should not be construed as unduly limiting the embodiment of the present disclosure.

In a possible embodiment of the present disclosure, the body 10*c* includes a base plate and an upper cover, where the upper cover is detachably arranged on the base plate to protect various functional components in the vacuum head from being damaged by violent impact and unintentional dripping liquid when in use. The base plate is configured to bear and support various functional components such as a scraper assembly 20*c* and a rolling brush assembly 12*c*.

A suction port 11*c* is formed at the bottom of the base plate, and a suction mechanism (not shown) is configured to produce negative pressure at work to suck dirt, including but not limited to sewage, dust, scraps of paper, hairs, etc., near the suction port 11*c* into a collection apparatus such as a dust collection box or a collection bin. The suction mechanism includes a fan configured to provide a suction force for sucking waste via the suction port 11*c*. After the fan sucks up waste, the waste enters a suction air channel in the body 10*c* via the suction port 11*c*, the suction air channel is connected with the collection apparatus, a filtering sheet is arranged in the collection apparatus and configured to separate the suction port 11*c* from an air inlet of the fan so as to prevent fine debris from entering the fan.

A rolling brush assembly 12*c* is further arranged on the base plate and detachably mounted on the base plate in a transverse direction, and the transverse direction refers to a direction substantially perpendicular to a traveling direction of the vacuum head. When moving forward for cleaning, the vacuum head collects dirt on the ground, and the collected waste is transferred into the collection apparatus by the suction mechanism. In order to clean waste on the surface to be cleaned 30*c* more thoroughly, the suction port 11*c* is usually arranged behind or in front of the rolling brush assembly 12*c*, and accordingly, the scraper assembly 20*c* may also be arranged behind or in front of the rolling brush assembly 12*c*.

Further, in order to prevent dirt flowing out of the suction port 11*c* from bypassing the scraper assembly 20*c* and directly flowing onto the surface to be cleaned 30*c*, in a possible implementation of the embodiment of the present disclosure, at least part of the scraper assembly 20*c* abuts against an opening of the suction port 11*c*. After cleaning is finished, a small amount of dirt that is not completely sucked into the vacuum head in time usually flows down along an edge of the opening of the suction port 11*c* when flowing out of the suction port 11*c*, and therefore, the scraper assembly 20 can guide the matter such as sewage that flows out of the suction port 11*c* to the scraper assembly 20*c* through the part abutting against the opening of the suction port 11*c*, and the matter such as sewage enters the first storage groove 22*c* along the scraper assembly 20*c*.

In another possible implementation, at least part of the scraper assembly 20*c* is located below the suction port 11*c*. When cleaning is finished, if matter that is not completely sucked into the vacuum head in time does not flow out along the edge of the opening of the suction port 11*c*, the scraper assembly 20*c* can catch the matter such as sewage flowing out of the suction port 11*c* through the part located below the suction port 11*c*, and guides the matter into the first storage groove 22*c* along the surface of the scraper assembly 20*c*.

It should be noted that the above two methods for preventing dirt from bypassing the scraper assembly 20*c* can be realized independently or in combination, which is not specifically limited in the embodiment of the present disclosure.

In the embodiment of the present disclosure, in order to improve the cleaning efficiency of the vacuum head, the length of the scraper assembly 20*c* is substantially equal to that of the rolling brush assembly 12*c*, and a length direction of the scraper assembly 20*c* is substantially parallel to a rotary axis direction of the rolling brush assembly 12*c*. In the embodiment of the present disclosure, the first storage groove 22*c* extends along the length direction of the scraper assembly 20*c*. An extending direction of the first storage groove 22*c* stretches across a flow path of dirt on the scraper assembly 20*c*, and matter such as sewage can directly enter the first storage tank 22*c* when flowing from the scraper assembly 20*c* to the surface to be cleaned 30*c* and passing through the first storage groove 22*c*.

In order to ensure that all of the dirt that flows on the scraper assembly 20*c* enters the first storage groove 22*c*, in the embodiment of the present disclosure, the first storage groove 22*c* penetrates through the scraper assembly 20*c* along the length direction of the scraper assembly 20*c*. That is, the length of the first storage groove 22*c* is equal to that of the scraper assembly 20*c*, and therefore, all of the dirt flowing on the scraper assembly 20*c* can enter the first storage groove 22*c* when moving towards the surface to be cleaned 30*c*, thereby reducing the chance of falling onto the surface to be cleaned 30*c*.

Further, in order to prevent matter in the first storage groove 22*c* from overflowing out of two ends of the first storage groove 22*c*, in the embodiment of the present disclosure, two ends, along the length direction, of the scraper assembly 20*c* are both provided with an anti-overflow plug. The two ends of the first storage groove 22*c* are blocked by the anti-overflow plugs to prevent matter such as sewage from overflowing out of the two ends of the first storage groove 22*c*. The anti-overflow plugs and the scraper assembly 20*c* may be of an integrated structure, or the anti-overflow plugs and the scraper assembly 20*c* are of a split structure, and the anti-overflow plugs are connected to the scraper assembly 20*c* by clamping or through fastening members.

With continuous reference to FIG. 13*b*, in order to enable matter such as sewage to enter the storage groove more smoothly, in a possible embodiment of the present disclosure, a guide surface 23*c* is formed at an opening of the first storage groove 22*c*, and dirt is guided into the first storage groove 22*c* by the guide surface 23*c*. The guide surface 23*c* includes but is not limited to an arc surface, through which a smooth transition from a surface of the scraper assembly 20*c* to the first storage groove 22*c* can be ensured, and matter such as sewage can enter the first storage groove 22*c* along the guide surface 23*c* when moving on the surface of the scraper assembly 20*c*, thereby preventing the matter such as sewage from sliding out of the opening of the first storage groove 22*c*.

Figure 13C:
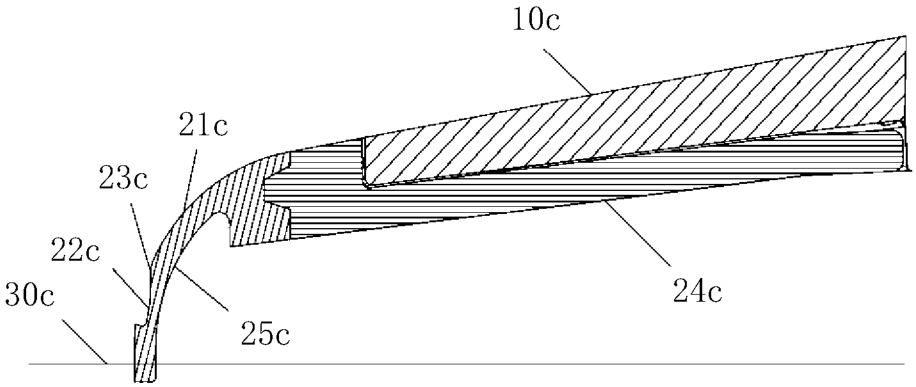
FIG. 13*c* is an enlarged view of B in FIG. 13*a;*
Figure 13D:
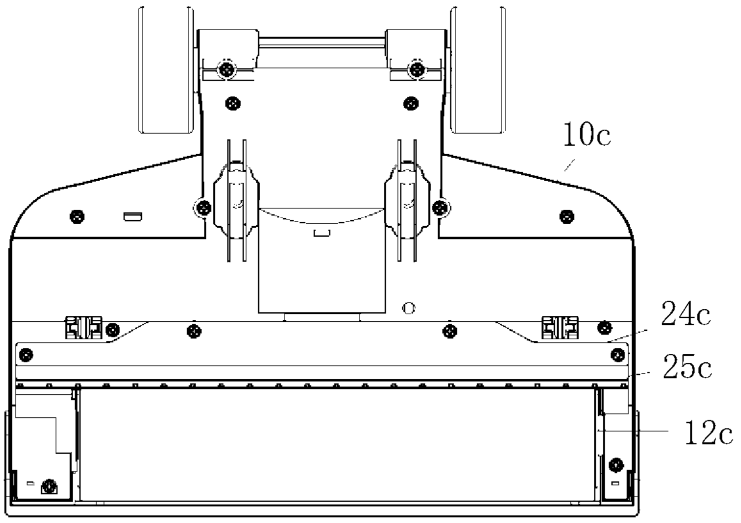
FIG. 13*d* is a schematic structural diagram of a bottom of the vacuum head in FIG. 13*a;*

The scraper assembly 20*c* contacts the surface to be cleaned 30*c*, when the cleaning apparatus moves, a sliding friction is formed between the scraper assembly 20*c* and the surface to be cleaned 30*c*, and the friction will cause a loud noise. In order to reduce noise caused by friction, in a possible implementation of the embodiment of the present disclosure, the wall thickness of the first storage groove of the scraper assembly 20*c* is less than the wall thicknesses of other parts of the scraper assembly 20*c*. The thinning of the wall thickness of the first storage groove 22*c* of the scraper assembly 20*c*, i.e. the local thinning of the scraper assembly 20*c*, increases the deformability of the scraper assembly 20*c*, and the scraper assembly 20*c* can deform more easily when in interference contact with the surface to be cleaned 30*c*, thereby reducing a contact force between the scraper assembly 20*c* and the surface to be cleaned 30*c*, and reducing friction and noise. Meanwhile, the scraper assembly 20*c* can float relative to the body 10*c* under the action of the deformability of the scraper assembly 20*c* when encountering an obstacle, and the scraper assembly 20*c* can pass over the obstacle smoothly, thereby automatically adjusting friction between the scraper assembly 20*c* and the obstacle, reducing wear, and prolonging the service life. In the embodiment of the present disclosure, the scraper assembly 20*c* can be implemented in a variety of ways, and in a possible implementation, with reference to FIG. 13*c* and FIG. 13*d*, the scraper assembly 20*c* includes a connecting assembly 24*c* and a scraper 25*c*. The connecting assembly 24*c* is connected with the body 10*c*. One end of the scraper 25*c* is connected with the connecting assembly 24*c*, and the other end of the scraper 25*c* faces the surface to be cleaned 30*c*. The connecting assembly 24*c* is connected to the body 10*c* through a fastener. Matter such as water can enter the first storage groove 22*c* along the guide surface 23*c* when moving on the surface of the scraper assembly 20*c*, thereby preventing the matter such as water from sliding out of the opening of the first storage groove 22*c*. In order to replace the scraper 25*c* conveniently, the scraper 25*c* may be detachably connected with the connecting assembly 24*c*. In a possible implementation, with reference to FIG. 13*c*, a first clamping part is arranged on the connecting assembly 24*c*, and a second clamping part matched with the first clamping part in use is arranged on the scraper 25*c*. The first clamping part is connected with the second clamping part in a fastening manner to allow the scraper 25*c* to be detachably connected to the connecting assembly 24*c*.

In the embodiment of the present disclosure, a possible method for connecting the first clamping part to the second clamping part is that the first clamping part is a snap, and the second clamping part is a clamping groove. A plurality of snaps may be arranged along a length direction of the connecting assembly 24*c*. Accordingly, a plurality of clamping grooves is arranged at positions, corresponding to the snaps, on the scraper 25*c*. Implementations and connections methods of the snap and the clamping groove are relatively simple, the connecting assembly 24*c* can be quickly connected to the scraper 25*c*, and meanwhile, after the snap is connected to the clamping groove, the connection is firm and reliable, and the detachment will not occur easily. Of course, in the embodiment of the present disclosure, the first clamping part may be a clamping groove, and the second clamping part may be a snap. Or, the first clamping part on the connecting assembly 24*c* is of a structure with a snap and a clamping groove that are arranged at intervals, and the second clamping part on the scraper 25*c* is of a corresponding structure with a clamping groove and a snap that are arranged at intervals. Arrangements of the first clamping part and the second clamping part are not specifically limited in the embodiment of the present disclosure. In the embodiment of the present disclosure, the entire scraper 25*c* may be made of an elastic material, or a part, connected with the connecting assembly 24*c*, of the scraper 25*c* may be made of a harder material, and a part, facing the surface to be cleaned 30*c*, of the scraper 25*c* may be made of a softer elastic material. It should be noted that in some possible embodiments of the present disclosure, the connecting assembly 24*c* may be omitted, and the scraper 25*c* is directly connected with the body 10*c*.

Further, in a possible implementation of the embodiment of the present disclosure, the connecting assembly 24*c* includes a connecting plate and a soft rubber member. The connecting plate is connected with the body 10*c*. One end of the soft rubber member is connected with the connecting plate, the other end of the soft rubber member is connected with the scraper 25*c*, and the soft rubber member seals a gap between the connecting plate and the scraper 25*c*. The scraper 25*c* can float relative to the body 10*c* under an elastic force of the soft rubber member. Friction between the scraper 25*c* and the surface to be cleaned 30*c* can be adjusted through the elastic force of the soft rubber member, thereby reducing wear and prolonging the service life. Meanwhile, the sound of the friction between the scraper 25*c* and the surface to be cleaned 30*c* is also reduced, thereby effectively reducing the vibration frequency of the cleaning apparatus. In addition, the soft rubber member seals the gap between the connecting plate and the scraper 25*c* to prevent matter such as water from overflowing out of the gap between the connecting plate and the scraper 25*c*, avoid secondary contamination to the surface to be cleaned 30*c* and improve the cleaning efficiency.

In order to mount and dismount the scraper 25*c* conveniently, the scraper 25*c* may be detachably connected with the soft rubber member. For example, a first bump-notch structure is arranged on the scraper 25*c*, and a second bump-notch structure matched with the first bump-notch structure in use is arranged on the soft rubber member. The first bump-notch structure is meshed with the second bump-notch structure, so that the scraper 25*c* is detachably connected to the soft rubber member. Implementations and connection methods of the first bump-notch structure and the second bump-notch structure are relatively simple, the scraper 25*c* can be quickly connected to the soft rubber member, and meanwhile, after the first bump-notch structure is connected to the second bump-notch structure, the connection is firm and reliable, and detachment will not occur easily.

Much further, in order to enhance the connection strength between the first bump-notch structure and the second bump-notch structure, a bonding layer may be arranged between the first bump-notch structure and the second bump-notch structure, or the first bump-notch structure and the second bump-notch structure may be fixed again by glue, or the first bump-notch structure and the second bump-notch structure may be fixed by means of plastic mould wrapping. The connection strength between the first bump-notch structure and the second bump-notch structure is enhanced through the above methods, thereby preventing the first bump-notch structure from being separated from the second bump-notch structure.

Figure 13E:
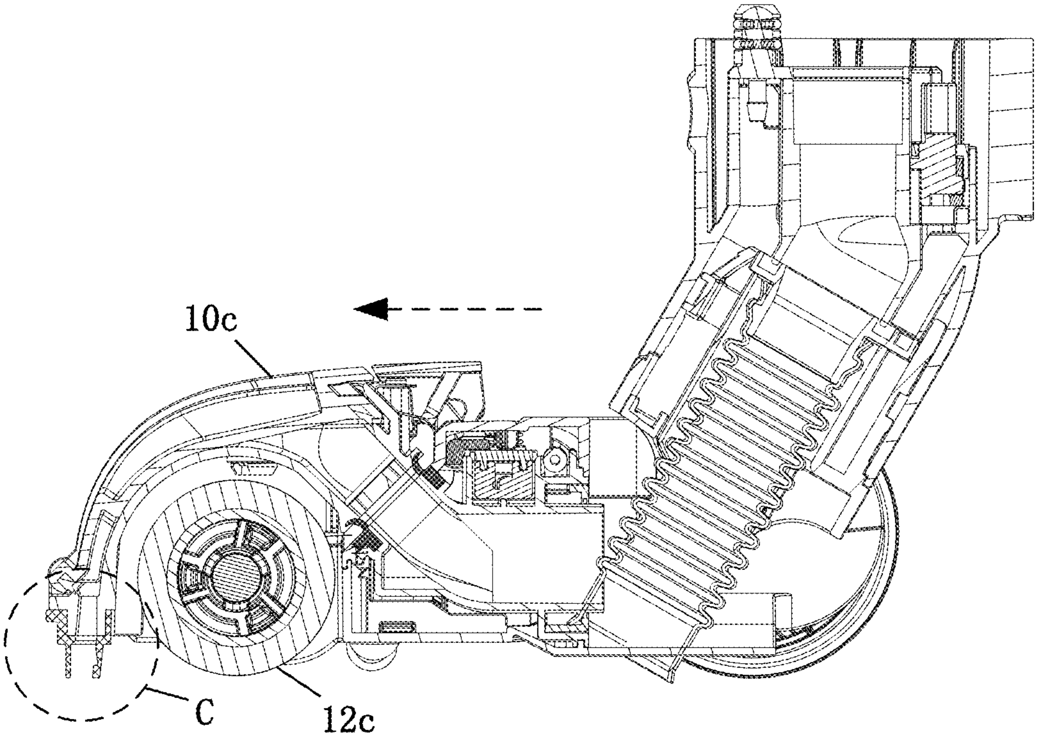
FIG. 13*e* is a schematic diagram of a cross-sectional structure of another vacuum head according to an embodiment of the present disclosure.

With reference to FIG. 13*a* and FIG. 13*e*, in the embodiment of the present disclosure, the vacuum head further includes a rolling brush assembly 12*c*. When the vacuum head moves forward for cleaning, the rolling brush assembly 12*c* can collect dirt on the surface to be cleaned 30*c*, and the collected waste is transferred into the collection apparatus by the suction mechanism. In order to clean the dirt on the surface to be cleaned 30*c* more thoroughly, the suction port 11*c* is usually arranged behind or in front of the rolling brush assembly 12*c*, and accordingly, the scraper assembly 20*c* may be also arranged behind or in front of the rolling brush assembly 12*c*. It should be noted that in the embodiment of the present disclosure, the front and the rear are described relative to the traveling direction of the vacuum head, which is indicated by the dotted arrow direction shown in FIG. 13*a* and FIG. 13*e*, the arrow direction represents the front, and a direction opposite to the arrow direction represents the rear.

In a possible implementation, with reference to FIG. 13*a*, the scraper assembly 20*c* is arranged behind the rolling brush assembly 12*c*. Specifically, the scraper assembly 20*c* and the suction port 11*c* are both located behind the rolling brush assembly 12*c*, and the suction port 11*c* is located between the rolling brush assembly 12*c* and the scraper assembly 20*c*. When the vacuum head moves, for example, along the dotted arrow direction shown in FIG. 13*a*, as the rolling brush assembly 12*c* rolls, dirt on the surface to be cleaned 30*c* is collected or gathered to the suction port 11, the vacuum head gathers the dirt through the scraper assembly 20*c*, the dirt on the surface to be cleaned 30*c* is gathered below the suction port 11*c* by cooperation of the rolling brush assembly 12*c* and the scraper assembly 20*c*, and the suction port 11*c* sucks up the dirt on the surface to be cleaned 30*c*, so that the surface to be cleaned 30*c* is cleaned.

In another possible implementation, with reference to FIG. 13*e*, the scraper assembly 20*c* is arranged in front of the rolling brush assembly 12*c*. Specifically, the scraper assembly 20*c* and the suction port 11*c* are both located in front of the rolling brush assembly 12*c*, and the scraper assembly 20*c* is located between the rolling brush assembly 12*c* and the suction port 11*c*. The vacuum head gathers dirt on the surface to be cleaned 30*c* to a position below the suction port 11*c* through the scraper assembly 20*c* when moving, for example, along the dotted arrow direction shown in FIG. 13*e*, the suction port 11*c* first sucks the dirt such as sewage on the surface to be cleaned to clean the surface to be cleaned 30*c* for the first time. Then, the surface to be cleaned 30*c* is cleaned for the second time through the rolling of the rolling brush assembly 12*c*, so that the cleanliness of the surface to be cleaned 30*c* is improved. The surface to be cleaned 30*c* is cleaned by cooperation of the rolling brush assembly 12*c* and the scraper assembly 20*c*.

In the above embodiments, no matter the scraper assembly 20*c* is arranged in front or behind the rolling brush assembly 12*c*, the scraper assembly 20*c* can be implemented by the connecting assembly 24*c* and the scraper 25*c*. A first storage groove 22*c* is formed in the scraper 25*c*. Matter such as sewage can enter the first storage groove 22*c* along a surface of the scraper 25*c* when moving on the surface of the scraper 25*c*, thereby preventing the matter such as sewage from falling onto the surface to be cleaned 30*c*.

Figure 13F:
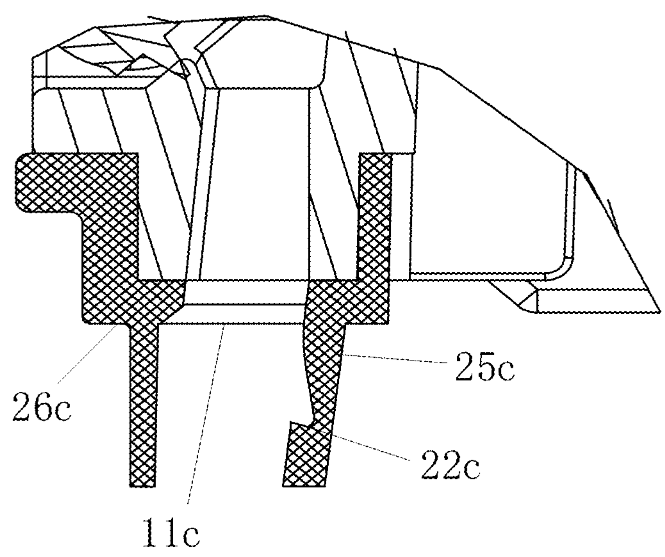
FIG. 13*f* is an enlarged view of C in FIG. 13*e;*

If the scraper assembly 20*c* is arranged in front of the rolling brush assembly 12*c*, in order to further improve the suction efficiency of the suction port 11*c*, with reference to FIG. 13*e* and FIG. 13*f*, in a possible embodiment of the present disclosure, the scraper assembly 20*c* further includes a sealing strip 26*c* in addition to the connecting assembly 24*c* and the scraper 25*c*. The sealing strip 26*c* is arranged at the suction port 11*c*, one end of the sealing strip 26*c* is connected with the body 10*c*, and the other end of the sealing strip 26*c* is attached to the surface to be cleaned 30*c* tightly or suspended above the surface to be cleaned 30*c*. The sealing strip 26*c* is located in front of the suction port 11*c*, the sealing strip 26*c* and the scraper 25*c* form a suction space, and the suction port 11*c* is located in the suction space. The sealing strip 26*c* and the scraper 25*c* form a suction space, so that the tightness of the space where the suction port 11*c* is located is improved, the suction efficiency of the suction port 11*c* is improved, and the suction port 11*c* can suck up matter such as sewage on the surface to be cleaned 30*c* more easily. In the embodiment of the present disclosure, the entire sealing strip 26*c* may be made of an elastic material, or a part, connected with the body 10*c*, of the sealing strip 26*c* may be made of a harder material, and a part, facing the surface to be cleaned 30*c*, of the sealing strip 26*c* may be made of a softer elastic material. With deformability, the sealing strip 26*c* can deform more easily when contacting the surface to be cleaned 30*c*, thereby reducing the contact force between the sealing strip 26*c* and the surface to be cleaned 30*c*, and reducing friction and noise.

Of course, if the scraper assembly 20*c* is arranged behind the rolling brush assembly 12*c*, the scraper assembly 20*c* may also include a sealing strip 26*c*. The sealing strip 26*c* is located in front of the suction port 11*c*, the sealing strip 26*c* and the scraper 25*c* form a suction space, and the suction port 11*c* is located in the suction space.

Further, in order to prevent matter such as sewage that remains in the suction pipeline from flowing along the suction port 11*c* to the surface to be cleaned 30*c*, in the embodiment of the present disclosure, a second storage groove is formed on a surface, facing the suction port 11*c*, of the sealing strip 26*c*, and dirt can enter the second storage groove when moving from the sealing strip 26*c* to the surface to be cleaned 30*c*. The dirt that moves from the sealing strip 26*c* to the surface to be cleaned 30*c* can be stored in the second storage groove, thereby preventing the dirt from remaining on the surface to be cleaned 30*c* near the sealing strip 26*c* and improving the cleaning efficiency. Arrangements of the sealing strip 26*c* and the second storage groove can refer to the arrangements of the scraper 25*c* and the first storage groove 22*c*, which will not be described again here.

Embodiment 9

On the basis of Embodiment 8, Embodiment 9 of the present disclosure further provides a cleaning apparatus, which includes a machine body and a vacuum head. Implementations of the vacuum head of Embodiment 9 can refer to the implementations of the vacuum head of Embodiment 8. A specific solution is as follows:

with reference to FIG. 13*a* to FIG. 13*f*, the embodiment of the present disclosure provides a cleaning apparatus, which includes a machine body and a vacuum head. The vacuum head includes: a body 10*c* and a scraper assembly 20*c*. A suction port 11*c* is formed at the bottom of the body 10*c*. The scraper assembly 20*c* is arranged at the suction port 11*c*, one end of the scraper assembly 20*c* is connected with the body 10*c*, and the other end of the scraper assembly 20*c* faces a surface to be cleaned 30*c*. A first storage groove 22*c* is formed in the scraper assembly 20*c*. It should be noted that the above "faces a surface to be cleaned 30*c*" means that the other end of the scraper assembly extends towards the surface to be cleaned 30*c*. In the embodiment of the present disclosure, the other end of the scraper assembly 20*c* extends to abut against the surface to be cleaned 30*c*, but the other end of the scraper assembly 20*c* is not limited thereto, and in other embodiments, the other end of the scraper assembly 20*c* may be suspended above the surface to be cleaned.

According to the technical solutions provided in the embodiment of the present disclosure, the scraper assembly 20*c* can quickly gather dirt, such as sewage, dust, and scraps of paper, on the surface to be cleaned 30*c* together, so that the vacuum head at work can clean the surface to be cleaned 30*c* more quickly to achieve higher cleanliness of the surface to be cleaned 30*c*. Meanwhile, the first storage groove 22*c* is formed in the scraper assembly 20*c*, and dirt that moves from the scraper assembly 20*c* to the surface to be cleaned 30*c* can be stored in the first storage groove 22*c*, thereby preventing the dirt from remaining on the surface to be cleaned 30*c* near the scraper assembly 20*c* and improving the cleaning efficiency.

It should be noted that in the embodiment of the present disclosure, the cleaning apparatus includes but is not limited to a hand-held dust collector, an upright cleaner, etc. In the embodiment of the present disclosure, the machine body of the cleaning apparatus includes but is not limited to machine bodies of a hand-held dust collector and an upright cleaner. In a possible implementation, the machine body includes a housing, a handle, a clear water bin, a collection bin, and components, such as a main electric motor, arranged in the housing.

For example, in a possible embodiment of the present disclosure, the scraper assembly 20*c* has a matter guiding surface 21*c* for gathering dirt together, the first storage groove 22*c* is formed on the matter guiding surface 21*c*, and the suction port 11*c* is located in front of the matter guiding surface 21*c*. The first storage groove 22*c* may be formed on the matter guiding surface 21*c* or other parts of the scraper assembly 20*c*, for example, the first storage groove 22*c* is formed at a lower end of the scraper assembly 20*c*, or the first storage groove 22*c* is formed at an upper end of the scraper assembly 20*c*. One or more first storage grooves 22*c* may be formed, and if a plurality of first storage grooves 22*c* are formed, the plurality of first storage grooves 22*c* are all formed on the matter guiding surface 21*c*, or respectively formed on the matter guiding surface 21*c*, the lower end of the scraper assembly 20*c*, and the upper end of the scraper assembly 20*c*. Of course, other arrangements are also included and will not be described here. It should be noted that in the embodiment of the present disclosure, the front and the rear are described relative to a traveling direction of the cleaning apparatus, which is indicated by the dotted arrow direction shown in FIG. 13*a*, the arrow direction represents the front, and a direction opposite to the arrow direction represents the rear.

The scraper assembly 20*c* is elastic and can contact the ground by its own gravity and a supporting force of the body 10*c* of the vacuum head at normal work, so that the scraper assembly 20*c* can be attached to the ground well to gather dirt on the ground together. For example, sewage, dust, scraps of paper, etc., on the ground can be gathered together by the matter guiding surface 21*c*.

The cleaning apparatus can gather dirt to the suction port 11*c* through the scraper assembly 20*c* when moving, for example, along the dotted arrow direction shown in FIG. 13*a* or FIG. 13*e*, and the suction port 11*c* sucks the dirt into the collection bin of the cleaning apparatus via a suction channel, so that the surface to be cleaned 30*c* is cleaned.

After cleaning is finished, the dirt (including matter such as sewage) in the suction pipeline is not completely sucked into the collection bin in time, and the sewage remaining in the suction pipeline will flow out along the suction port 11*c* and flow down along the scraper assembly 20*c*. Because the first storage groove 22*c* is formed in the scraper assembly 20*c*, matter such as sewage directly enters the first storage groove 22*c* when flowing through the first storage groove 22*c*, thereby preventing the matter from falling onto the surface to be cleaned 30*c*.

Technical features of the vacuum head of Embodiment 9 can refer to the implementations of the vacuum head of Embodiment 8, and relevant technical features of Embodiment 9 can refer to the technical features of Embodiment 8, which will not be described again here.

Embodiment 10

On the basis of Embodiment 8 and Embodiment 9, Embodiment 10 of the present disclosure further provides a self-moving cleaning robot, which includes a machine body and a scraper assembly. Implementations of the scraper assembly of Embodiment 10 can refer to the implementations of the scraper assembly of Embodiment 8. A specific solution is as follows:

with reference to FIG. 13*a* to FIG. 13*f*, the embodiment of the present disclosure provides a self-moving cleaning robot, which includes a machine body and a scraper assembly 20*c*, where a suction port 11*c* is formed at the bottom of the machine body, the scraper assembly is arranged at the suction port 11*c*, one end of the scraper assembly 20*c* is connected with the machine body, and the other end of the scraper assembly 20*c* faces a surface to be cleaned 30*c*. A first storage groove 22*c* is formed in the scraper assembly 20*c*. It should be noted that the above "faces a surface to be cleaned 30*c*" means that the other end of the scraper assembly extends towards the surface to be cleaned 30*c*. In the embodiment of the present disclosure, the other end of the scraper assembly 20*c* extends to abut against the surface to be cleaned 30*c*, but the other end of the scraper assembly 20*c* is not limited thereto, and in other embodiments, the other end of the scraper assembly 20*c* may be suspended above the surface to be cleaned.

According to the technical solutions provided in the embodiment of the present disclosure, the scraper assembly 20*c* can quickly gather dirt, such as sewage, dust, and scraps of paper, on the surface to be cleaned 30*c* together, so that the self-moving cleaning robot at work can clean the surface to be cleaned 30*c* more quickly to achieve higher cleanliness of the surface to be cleaned 30*c*. Meanwhile, the first storage groove 22*c* is formed in the scraper assembly 20*c*, and dirt that moves from the scraper assembly 20*c* to the surface to be cleaned 30*c* can be stored in the first storage groove 22*c*, thereby preventing the dirt from remaining on the surface to be cleaned 30*c* near the scraper assembly 20*c*, and improving the cleaning efficiency.

It should be noted that in the embodiment of the present disclosure, the machine body of the self-moving cleaning robot refers to the implementations of the body 10*c* of the vacuum head, and the self-moving cleaning robot of Embodiment 10 may be one of the cleaning apparatus of Embodiment 9.

In a possible embodiment of the present disclosure, the machine body includes a base plate and an upper cover, where the upper cover is detachably arranged on the base plate to protect various functional components in the self-moving robot from being damaged by violent impact or inadvertent dripping of liquid when in use. The base plate is configured to bear and support various functional components such as a scraper assembly 20*c*, a suction mechanism, and a rolling brush assembly 12*c*.

A suction port 11*c* is formed at the bottom of the base plate, and a suction mechanism (not shown) is configured to produce negative pressure at work to suck dirt, including but not limited to sewage, dust, scraps of paper, hairs, etc., near the suction port 11*c* into a waste receiving cavity in the machine body.

A rolling brush assembly 12*c* is further arranged on the base plate and detachably mounted on the base plate in a transverse direction, and the transverse direction refers to a direction substantially perpendicular to a traveling direction of the self-moving robot. The self-moving robot collects dirt on the ground when moving forward for cleaning, and the collected waste is transferred into a collection apparatus by the suction mechanism. In order to suck the waste on the surface to be cleaned 30*c* more thoroughly, the suction port 11*c* is usually arranged behind or in front of the rolling brush assembly 12*c*, and accordingly, the scraper assembly 20*c* may be also arranged behind or in front of the rolling brush assembly 12*c*.

Technical features of the scraper assembly of Embodiment 10 can refer to the implementations of the scraper assembly of Embodiment 8, and relevant technical features of Embodiment 10 can refer to the technical features of Embodiment 8 and Embodiment 9, which will not be described again here.

The technical solutions adopted by the present disclosure will be described below in conjunction with specific application scenarios to facilitate understanding. The following application scenarios are described by taking a cleaner as an example.

Application Scenario VI

The scraper assembly is elastic and can contact the ground by its own gravity and a supporting force of the body of the vacuum head at normal work, so that the scraper assembly can be attached to the ground well to gather dirt on the ground together. For example, sewage, dust, scraps of paper, etc. on the ground can be gathered together.

The vacuum head can gather the dirt to the suction port through the scraper assembly when moving, and the suction port sucks the dirt into the cleaning apparatus via the suction channel, so that the surface to be cleaned is cleaned.

After cleaning is finished, the dirt (including matter such as sewage) in the suction pipeline is not completely sucked into the cleaning apparatus in time, and the dirt remaining in the suction pipeline will flow out along the suction port and flow down along the scraper assembly. Because the first storage groove is formed in the scraper assembly, the matter such as sewage directly enters the first storage groove when flowing through the first storage groove, thereby preventing the matter from flowing onto the surface to be cleaned.

Application Scenario VII

The scraper assembly is elastic and can contact a floor by its own gravity and a supporting force of the body of the vacuum head at normal work, so that the scraper assembly can be attached to the floor well to gather dirt on the ground together. For example, sewage, dust, scraps of paper, etc. on the ground can be gathered together.

The vacuum head can gather the dirt to the suction port through the scraper assembly when moving, and suction port sucks the dirt into the cleaning apparatus via the suction channel, so that the surface to be cleaned is cleaned. Because the thinning of the wall thickness of the first storage groove of the scraper assembly, i.e. the local thinning of the scraper assembly, increases the deformability of the scraper assembly, and the scraper assembly can deform more easily when in interference contact with the surface to be cleaned, thereby reducing a contact force between the scraper assembly and the surface to be cleaned, and reducing friction and noise. Meanwhile, the scraper assembly can float relative to the body under the action of the deformability of the scraper assembly when encountering an obstacle, so that the scraper assembly 20*c* can pass over the obstacle smoothly.

Embodiment 11

Figure 14A:
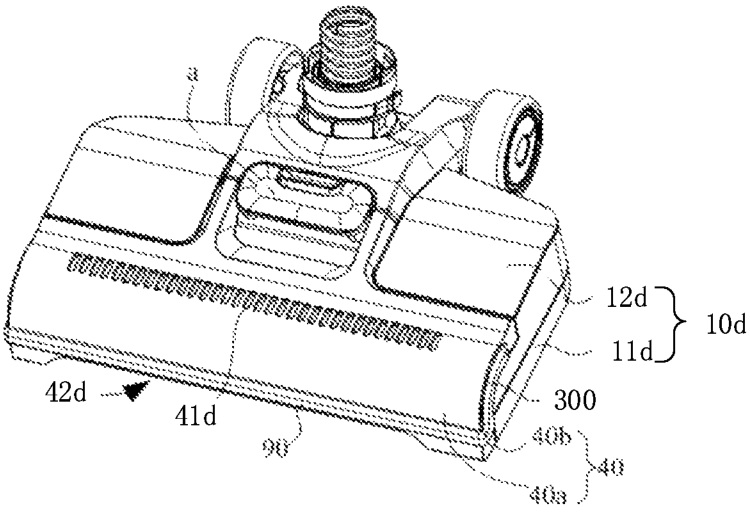
FIG. 14*a* is a schematic structural diagram of yet another vacuum head according to an embodiment of the present disclosure.
Figure 14B:
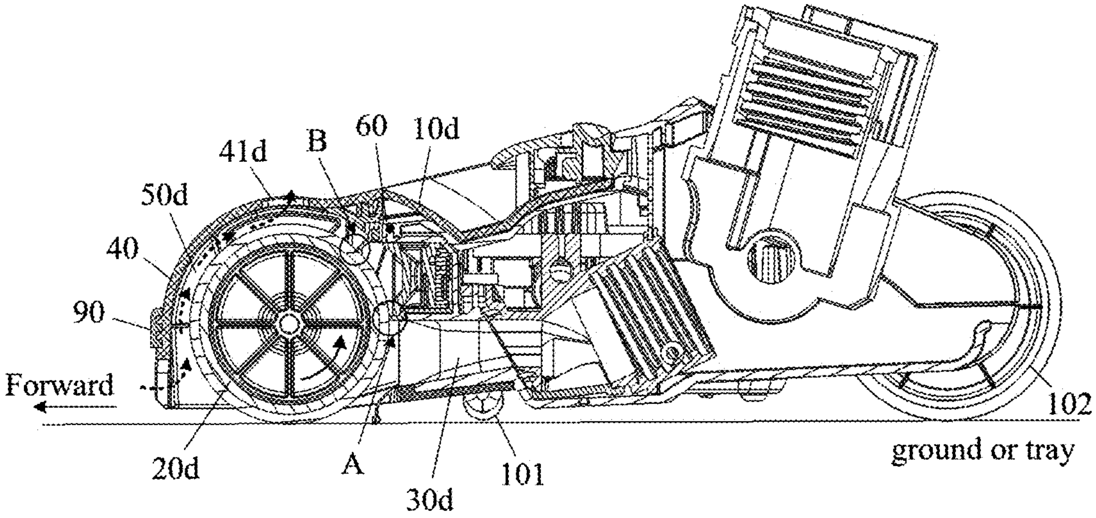
FIG. 14*b* is a cross-sectional view of still another vacuum head according to an embodiment of the present disclosure.

In addition to the vacuum head provided in the embodiments show in FIG. 13*a* to FIG. 13*f*, the following embodiment of the present disclosure further provides another vacuum head that may or may not include the scraper assembly and other relevant components of the embodiments shown in FIG. 13*a* to FIG. 13*f*. FIG. 14*a* is a schematic structural diagram of another vacuum head according to an embodiment of the present disclosure; and FIG. 14*b* is a cross-sectional view of yet another vacuum head according to an embodiment of the present disclosure. With reference to FIG. 14*a* and FIG. 14*b*, the vacuum head provided in the present embodiment includes: a housing 10*d*, a rolling brush 20*d*, and a rolling brush cover 40. The rolling brush cover 40 is arranged above the rolling brush 20*d*, and a ventilation hole 41*d* is formed in the rolling brush cover 40 and allows outside air to contact the rolling brush 20*d*.

In some embodiments, the vacuum head further includes running wheels (including a front wheel 10*d*1 and/or a rear wheel 10*d*2), which are supported on a surface to be cleaned together with the rolling brush 20*d* when the vacuum head contact the surface to be cleaned (e.g. the ground).

Specifically, the rolling brush 20*d* is connected in the housing 10*d*. The housing 10*d* and the rolling brush cover 40 can enclose a receiving cavity, and a plurality of vacuum head-related components may be arranged in the receiving cavity of the housing 10*d*. The rolling brush 20*d* is arranged in the receiving cavity and located at the front of the receiving cavity. The housing 10*d* may include a vacuum head base 11*d* and a vacuum head surface cover 12*d*, where the vacuum head surface cover 12*d* is configured to cover the vacuum head base 11*d* to form the above receiving cavity together with other components. The vacuum head base 11*d* may be detachably connected with the vacuum head surface cover 12*d* via a snap or a screw, so that the vacuum head base 11*d* can be detached from the vacuum head surface cover 12*d* conveniently, and the components in the receiving cavity can be maintained conveniently.

The rolling brush 20*d* may be connected to the housing 10*d* via a rotary shaft, and may be provided with rotational power by a power apparatus such as an electric motor, so that the rolling brush 20*d* is rotatably mounted in the receiving cavity. Of course, the power apparatus may be also arranged in the receiving cavity.

The rolling brush cover 40 is located above the rolling brush 20*d*. The rolling brush cover 40 may cover the rolling brush 20*d* in an arc shape, the rolling brush cover 40 may be detachably connected with the housing 10*d*, and the rolling brush 20*d* may be also detachably connected with the housing 10*d*. Preferably, the rolling brush cover 40 may be connected to the housing 10*d* via a snap, so that the rolling brush cover 40 can be quick detached from the housing 10*d*, and then the rolling brush 20*d* can be removed for cleaning.

In addition, the rolling brush cover 40 is preferably a transparent surface cover, so that users can observe the operation state of the rolling brush 20*d* when the cleaner works, and detect the malfunction of the rolling brush 20*d* in time.

According to the cleaner provided in the present embodiment, the ventilation hole is formed in the rolling brush cover of the vacuum head and allows outside air to contact the rolling brush, and therefore, the rolling brush can be dried quickly through a ventilation channel, peculiar smell of the rolling brush is dispelled conveniently, and the rolling brush is prevented from going moldy.

Further, the vacuum head further includes a separator and a dirt suction channel 30*d*, where the separator separates the ventilation hole 41*d* from the dirt suction channel 30*d*. The dirt suction channel 30*d* is configured to suck dirt on a surface to be cleaned. Specifically, the dirt suction channel 30*d* has a suction port, and dirt is rolled to the suction port by the rolling brush 20*d*, which facilitates suction of the dirt. The surface to be cleaned may refer to a surface, such as the ground, currently cleaned by the cleaner. The dirt suction channel 30*d* may be formed by a pipeline that may be an extensible soft pipeline. One end of the dirt suction channel 30*d* may face the surface to be cleaned, the other end of the dirt suction channel 30*d* may be connected with a collection bin, and a negative pressure source for supplying negative pressure, such as an airflow generator, may be further arranged on the dirt suction channel 30*d*. The airflow generator produces a relatively large suction force to suck dirt on the surface to be cleaned through one end of the dirt suction channel 30*d* into the collection bin at the other end. The dirt on the surface to be cleaned may refer to liquid dirt such as sewage, or solid dirt, which is not limited in the present embodiment. The separator separates the ventilation hole 41*d* from the dirt suction channel 30*d*, so that the ventilation hole 41*d* will not affect the negative pressure suction force of the dirt suction channel 30*d*, and the negative pressure suction force for sucking dirt is not affected when outside air contacts the rolling brush.

Further, the separator can extend to two ends of the rolling brush 20*d* along a direction parallel to an axial direction of the rolling brush 20*d*. Thus, the separator can completely separate the ventilation hole 41*d* from the dirt suction channel 30*d* to the greatest extent in a length direction of the rolling brush.

As shown in FIG. 14*a*, an opening 42*d* may be formed at the bottom of a front side of the rolling brush cover 40, and the ventilation hole 41*d* may be communicated with the opening 42*d* to form a ventilation channel 50*d* (a path indicated by a dotted arrow shown in FIG. 14*b*), the ventilation channel 50*d* is located in front of the rolling brush 20*d*, and the dirt suction channel 30*d* is located behind the rolling brush 20*d*, and the ventilation channel 50*d* is separated from the dirt suction channel 30*d* by the separator, so that the ventilation channel 50*d* is not communicated with the dirt suction channel 30*d*.

Preferably, arrangement positions of the ventilation hole 41*d* include at least a top of the rolling brush cover 40, and thus the ventilation hole 41*d* located at the top of the rolling brush cover 40 and the opening 42*d* at the bottom of the front side of the rolling brush cover 40 can form a ventilation path as long as possible, which is conductive to drying and ventilation of the rolling brush 20*d*.

A plurality of ventilation holes 41*d* may be formed at the top of the rolling brush cover 40 and arranged in a straight line along a direction parallel to the axial direction of the rolling brush 20*d*. Shapes and sizes of various ventilation holes 41*d* may be the same or different, which is not limited in the present embodiment. Distances from various ventilation holes 41*d* to the opening 42*d* at the bottom of the front side of the rolling brush cover 40 may be the same, and the shapes and sizes of various ventilation hole 41*d* may be the same, and therefore, the degree of ventilation and drying of the rolling brush 20*d* in the length direction is substantially the same as much as possible. It can be understood that the axial direction of the rolling brush 20*d* is parallel to the length direction.

Of course, in other embodiments, one or more ventilation holes may be formed at other positions on the rolling brush cover 40. It can be understood that the size of the ventilation hole 41*d* formed in the rolling brush cover 40 should not be excessively large, and if the size of the ventilation hole 41*d* formed in the rolling brush cover 40 is excessively large, splashed residual stains may be splashed out of the ventilation hole 41*d* formed in the rolling brush cover 40 when the rolling brush 20*d* rotates, thereby reducing the user experience.

Furthermore, on the other hand, the ventilation hole 41*d* is formed at the top of the rolling brush cover 40, and the residual stains splashed out when the rolling brush 20*d* rotates must overcome its own gravity to be splashed out of the ventilation hole 41*d* at the top of the rolling brush cover 40. Therefore, forming the ventilation hole 41*d* at the top of the rolling brush cover 40 can not only extend the ventilation path, ensure a ventilation effect, but also effectively prevent the stains on the rolling brushed 20*d* from being splashed out.

Therefore, the size and the position of the ventilation hole 41*d* may be designed in consideration of the above factors.

As shown in FIG. 14*b*, further, a liquid spraying apparatus 60 may be arranged in the housing 10*d* and behind the rolling brush 20*d* and can spray a liquid to the rolling brush 20*d*. Specifically, the liquid spraying apparatus 60 may be communicated with a liquid storage apparatus (not shown) via a pipeline, and the liquid storage apparatus may contain a cleaning liquid that includes clean water, a cleaning agent, or a mixture of the cleaning agent and the clean water. As the rolling brush 20*d* rotates, the liquid spraying apparatus 60 sprays a cleaning liquid to the rolling brush 20*d* to wet the rolling brush 20*d*, so that the rolling brush 20*d* wipes stubborn stains on a surface to be cleaned conveniently.

It should be noted that the ventilation hole 41*d* is formed in the rolling brush cover 40, and the liquid spraying apparatus 60 is arranged in the housing 10*d* of the vacuum head, and the liquid spraying apparatus 60 may be located behind the rolling brush cover 40.

Figure 14C:
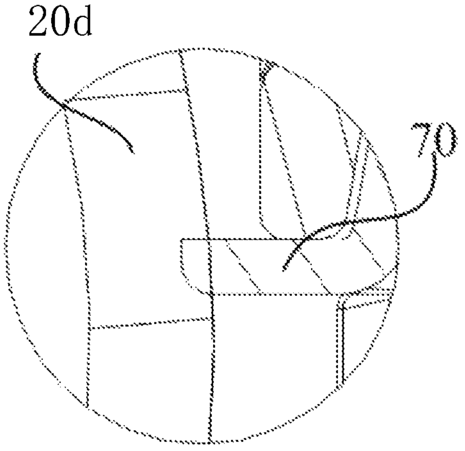
FIG. 14*c* is an enlarged view of A in FIG. 14*b;*

FIG. 14*c* is an enlarged view of A in FIG. 14*b*. As shown in FIG. 14*b* and FIG. 14*c*, the liquid spraying apparatus 60 is located above the dirt suction channel 30*d*, a first scraper 70 is arranged between the liquid spraying apparatus 60 and the dirt suction channel 30*d* and in abutting contact with a surface of the rolling brush 20*d*. In practice applications, an abutting force of the first scraper 70 against the rolling brush 20*d* can be rationally designed, so that the first scraper 70 can continuously scrape off sewage on the rolling brush 20*d* during rotation of the rolling brush 20*d* and does not affect the normal rotation of the rolling brush 20*d*. The sewage scraped by the first scraper 70 falls onto the surface to be cleaned and is sucked into the collection bin via the dirt suction channel 30*d*.

Figure 14D:
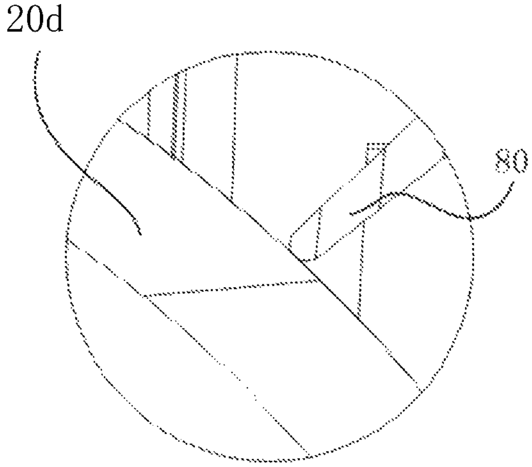
FIG. 14*d* is an enlarged view of B in FIG. 14*b;*

FIG. 14*d* is an enlarged view of B in FIG. 14*b*. As shown in FIG. 14*b* and FIG. 14*d*, a second scraper 80 may further be arranged above the liquid spraying apparatus 60 and is in abutting contact with the surface of the rolling brush 20*d*. A force applied on the surface of the rolling brush 20*d* by the second scraper 80 may be smaller than a force applied on the surface of the rolling brush 20*d* by the first scraper 70. The liquid sprayed onto the rolling brush 20*d* by the liquid spraying apparatus 60 is usually not uniform enough, and the cleaning liquid on the rolling brush 20*d* can be uniformly scraped by the second scraper 80 through a smaller abutting force applied on the rolling brush 20*d* by the second scraper 80, so that the rolling brush 20*d* can be wet as uniformly as possible.

It should be noted that in the present embodiment, an extending depth of the first scraper 70 into the rolling brush 20*d* may be greater than that of the second scraper 80 into the rolling brush 20*d*, so that an abutting force of the second scraper 80 against the rolling brush 20*d* is smaller than that of the first scraper 70 against the rolling brush 20*d*. Thus, the rolling brush 20*d* can scrape the sewage on the rolling brush 20*d* as much as possible through the first scraper 70, and scrape the cleaning liquid on the rolling brush 20*d* uniformly through the second scraper 80.

Preferably, in the operating state, the rolling brush rotates counterclockwise (as shown in FIG. 14*b*), and the rolling brush passes through the first scraper 70, a liquid spraying area, and the second scraper 80 in sequence, so that the dirt on the rolling brush is scraped off before the cleaning liquid is sprayed, thereby preventing the dirt from being mixed in the cleaning liquid.

As a more preferred implementation, the abutting force between the first scraper 70 and/or the second scraper 80 and the rolling brush 20*d* is adjustable. Specifically, the abutting force can be adjusted by adjusting a mounting position of the first scraper 70 and/or the second scraper 80. For example, taking the first scraper 70 as an example, the first scraper 70 can be connected to the housing 10*d* via a fastener, a plurality of through holes for allowing the fastener to pass through are formed in the first scraper 70, and the fastener passes through different through holes to make the first scraper 70 closer to or farther from the rolling brush 20*d*, so that the abutting force between the first scraper 70 and the rolling brush 20*d* is adjustable. Of course, there are many methods to realize adjustable abutting force between the first scraper 70 and/or the second scraper 80 and the rolling brush 20*d*, which may be specifically designed by those skilled in the art and will described one by one in the present embodiment. Further, the first scraper 70 and/or the second scraper 80 extends from one end of the rolling brush 20*d* to the other end of the rolling brush 20*d* along a direction parallel to the axial direction of the rolling brush 20*d*. The first scraper 70 extends from one end of the rolling brush 20*d* to the other end of the rolling brush 20*d* along a direction parallel to the axial direction of the rolling brush 20*d*. During the rotation of the rolling brush 20*d*, various positions on an outer side surface of the rolling brush 20*d* can be in abutting contact with the first scraper 70, so that the first scraper 70 can scrape off sewage at various positions on the rolling brush 20*d*. The second scraper 80 extends from one end of the rolling brush 20*d* to the other end of the rolling brush 20*d* along a direction parallel to the axial direction of the rolling brush 20*d*. During the rotation of the rolling brush 20*d*, various positions on the outer side surface of the rolling brush 20*d* can be in abutting contact with the second scraper 80, so that the degree of wetting of various positions on the rolling brush 20*d* is substantially the same.

On the other hand, at least one of the first scraper 70 and the second scraper 80 can extend along the length direction of the rolling brush 20*d*, so that the ventilation channel 50*d* can be separated from the dirt suction channel 30*d* by the first scraper 70 and/or the second scraper 80, and the ventilation channel 50*d* is not communicated with the dirt suction channel 30*d*. That is, the first scraper 70 and/or the second scraper 80 forms a separator to separate the ventilation hole 41*d* from the dirt suction channel 30*d*. Through the structural design for further separating the ventilation channel 50*d* from the dirt suction channel 30*d*, the formation of the ventilation hole 41 does not affect the size of negative pressure of the suction port. In addition, it should be noted that the structural design for separating the ventilation channel 50*d* from the dirt suction channel 30*d* may be something else. For example, a baffle for separating the ventilation channel 50*d* from the dirt suction channel 30*d* is arranged in the housing 10*d*, the baffle may be infinitely close to but not in contact with the outer side surface of the rolling brush 20*d*, and thus the ventilation channel 50*d* is not communicated with the dirt suction channel 30*d*. Of course, the present disclosure is not limited thereto.

On the basis of the above embodiments, further, in a height direction of the vacuum head, the first scraper 70 and the second scraper 80 are both located between the ventilation hole 41*d* and the dirt suction channel 30*d*. Thus, the ventilation channel 50*d* cannot be communicated with the dirt suction channel 30*d* due to the double assurance of the first scraper 70 and the second scraper 80. The first scraper 70 and/or the second scraper 80 extend along a radial direction of the rolling brush 20*d* to abut against the surface of the rolling brush 20*d*. Thus, the scraper is in positive contact with the rolling brush 20*d*, and a force of the scraper can better act on the rolling brush 20*d*.

Preferably, as shown in FIG. 14*c*, the first scraper 70 may be in a plate shape; and a side edge, away from the liquid spraying apparatus 60, of an end, contacting the surface of the rolling brush 20*d*, of the first scraper 70 is in rounded transition; or, two side edges of the end, contacting the surface of the rolling brush 20*d*, of the first scraper 70 are both in rounded transition. Thus, during the rotation (counterclockwise rotation when moving forward) of the rolling brush 20*d*, a corner of the first scraper 70 does not cause sharp scratches on the rolling brush 20*d*, and the first scraper 70 does not scratch the rolling brush 20*d* while scraping off the sewage on the rolling brush 20*d*. Similarly, the second scraper 80 may be in a plate shape; a side edge, close to the liquid spraying apparatus 60, of an end, contacting the surface of the rolling brush 20*d*, of the second scraper 80 is in rounded transition; or, two side edges of the end, contacting the surface of the rolling brush 20*d*, of the second scraper 80 are both in rounded transition. The effect is the same as the above effect of the first scraper 70, which will not be described again here.

As shown in FIG. 14*a*, in some embodiments, the vacuum head may further include: a front buffer 90. The front buffer 90 is arranged on an outer surface of the front side of the rolling brush cover 40. The front buffer 90 may be a rubber member, and may entirely extend as a strip in the length direction of the rolling brush cover 40, or may be dispersedly arranged as a block in the length direction of the rolling brush cover 40. By arranging the front buffer 90, the impact force of the rolling brush against an obstacle ahead during the forward movement can be effectively buffered.

Further, the vacuum head may further include: side buffers 300 arranged on outer surfaces of sides of the vacuum head. Similar to the front buffer 90, the side buffers 300 may be rubber members, and may entirely extend as a strip in a width direction of the vacuum head, or, may be dispersedly arranged as a block in the width direction of the vacuum head. By arranging the side buffers 300, the impact force from an obstacle at sides can be effectively buffered.

As shown in FIG. 14*a*, the rolling brush cover 40 may include a front cover 40*a* and side covers 40*b* connected with two ends of the front cover 40*a*. The side buffers 300 may be arranged on outer surfaces of the side covers 40*b*. Or, in other embodiments, the side buffers 300 are arranged on outer side surfaces of the housing 10*d*.

When the side buffers 300 are arranged on the outer surfaces of the side covers 40*b*, the front buffer 90 and the side buffers 300 are of an integrated structure. The front buffer 90 and the side buffers 300 may be of an integrated structure, as shown in FIG. 14*a*, a strip-shaped rubber member entirely extends from a left side cover to a right side cover by passing through the front cover 40*a*, so as to protect the vacuum head from the front and the sides and provide a better anti-collision effect. The strip-shaped rubber member has a simple structure and low cost.

Embodiment 12

The present embodiment provides a cleaner, which includes a main machine and a vacuum head, where the vacuum head includes:

a housing 10*d*, a rolling brush 20*d*, and a rolling brush cover 40. The rolling brush cover 40 is arranged above the rolling brush 20*d*, a ventilation hole 41*d* is formed in the rolling brush cover 40 and allows outside air to contact the rolling brush 20*d*.

In some embodiments, the vacuum head further includes running wheels (including a front wheel 10*d*1 and/or a rear wheel 10*d*2), which are supported on a surface to be cleaned together with the rolling brush 20*d* when the vacuum head contact the surface to be cleaned (e.g. the ground).

Specifically, the rolling brush 20*d* is connected to the housing 10*d*. The housing 10*d* and the rolling brush cover 40 may enclose a receiving cavity, and a plurality of vacuum head-related components may be arranged in the receiving cavity of the housing 10*d*. The rolling brush 20*d* is arranged in the receiving cavity and located at the front of the receiving cavity. The housing 10*d* may include a vacuum head base 11*d* and a vacuum head surface cover 12*d*, where the vacuum head surface cover 12*d* is configured to cover the vacuum head base 11*d* to form the above receiving cavity together with other elements. The vacuum head base 11*d* may be detachably connected with the vacuum head surface cover 12*d* via a snap or a screw, so that the vacuum head base 11*d* can be detached from the vacuum head surface cover 12*d* conveniently, and the components in the receiving cavity can be maintained conveniently.

The rolling brush 20*d* may be connected to the housing 10*d* via a rotary shaft, and may be provided with rotational power by a power apparatus such as an electric motor, so that the rolling brush 20*d* is rotatably mounted in the receiving cavity. Of course, the power apparatus may be also arranged in the receiving cavity.

The rolling brush cover 40 is located above the rolling brush 20*d*. The rolling brush cover 40 may cover the rolling brush 20*d* in an arc shape, the rolling brush cover 40 may be detachably connected with the housing 10*d*, and the rolling brush 20*d* may be also detachably connected with the housing 10*d*. Preferably, the rolling brush cover 40 may be connected to the housing 10*d* via a snap, so that the rolling brush cover 40 can be detached from the housing 10*d* quickly, and then the rolling brush 20*d* can be removed for cleaning.

In addition, the rolling brush cover 40 is preferably a transparent surface cover, so that users can observe the operating state of the rolling brush 20*d* when the cleaner works, and detect the malfunction of the rolling brush 20*d* in time.

According to the vacuum head provided in the present embodiment, the ventilation hole is formed in the rolling brush cover and allows outside air to contact the rolling brush, and therefore, the rolling brush can be dried quickly through a ventilation channel, peculiar smell of the rolling brush is dispelled conveniently, and the rolling brush is prevented from going moldy.

Further, the vacuum head further includes a separator and a dirt suction channel 30*d*, where the separator separates the ventilation hole 41*d* from the dirt suction channel 30*d*. The dirt suction channel 30*d* is configured to suck dirt on a surface to be cleaned. Specifically, the dirt suction channel 30*d* has a suction port, the dirt is rolled to the suction port by the rolling brush, which facilitates suction of the dirt. The surface to be cleaned may refer to a surface, such as the ground, currently cleaned by the cleaner. The dirt suction channel 30*d* may be formed by a pipeline. One end of the dirt suction channel 30*d* may face the surface to be cleaned, the other end of the dirt suction channel 30*d* may be connected with the collection bin, and a negative pressure source for supplying negative pressure, such as an air pump, may be further arranged on the dirt suction channel 30*d*. The air pump produces a relatively large suction force to suck dirt on the surface to be cleaned through one end of the dirt suction channel 30*d* to the collection bin at the other end. The dirt on the surface to be cleaned may refer to liquid dirt such as sewage, or solid dirt, which is not limited in the present embodiment. The separator separates the ventilation hole 41*d* from the dirt suction channel 30*d*, so that the ventilation hole 41*d* does not affect the negative pressure suction force of the dirt suction channel 30*d*, and the negative pressure suction force for sucking dirt is not affected when outside air contacts the rolling brush.

Much further, the separator can extend to two ends of the rolling brush 20*d* along a direction parallel to an axial direction of the rolling brush 20*d*. Thus, the separator can completely separate the ventilation hole 41*d* from the dirt suction channel 30*d* to the greatest extent in a length direction of the rolling brush.

As shown in FIG. 14*a*, an opening 42*d* is formed at the bottom of a front side of the rolling brush cover 40, and the ventilation hole 41*d* may be communicated with the opening 42*d* to form a ventilation channel 50*d* (a path indicated by a dotted arrow in FIG. 14*b*), the ventilation channel 50*d* is located in front of the rolling brush 20*d*, and the dirt suction channel 30*d* is located behind the rolling brush 20*d*, and the ventilation channel 50*d* is separated from the dirt suction channel 30*d* by the separator, so that the ventilation channel 50*d* is not communicated with the dirt suction channel 30*d*.

Preferably, arrangement positions of the ventilation hole 41*d* include at least a top of the rolling brush cover 40, and thus the ventilation hole 41*d* located at the top of the rolling brush cover 40 and the opening 42*d* at the bottom of the front side of the rolling brush cover 40 can form a ventilation path as long as possible, which is more conducive to the ventilation and drying of the rolling brush 20*d*.

A plurality of ventilation holes 41*d* may be formed at the top of the rolling brush cover 40 and arranged in a straight line along a direction parallel to the axial direction of the rolling brush 20*d*. Shapes and sizes of various ventilation holes 41*d* may be the same or different, which is not limited in the present embodiment. Distances from various ventilation holes 41*d* to the opening 42*d* at the bottom of the front side of the rolling brush cover 40 may be the same, and the shapes and sizes of various ventilation hole 41*d* may be the same, so that the degree of ventilation and drying of the rolling brush 20*d* in the length direction is substantially the same to the greatest extent. It can be understood that the axial direction of the rolling brush 20*d* is parallel to the length direction.

Of course, in other embodiments, one or more ventilation holes may be formed at other positions on the rolling brush cover 40. It can be understood that the size of the ventilation hole 41*d* formed in the rolling brush cover 40 should not be excessively large, and if the size of the ventilation hole 41*d* formed in the rolling brush cover 40 is excessively large, splashed residual stains may be splashed out of the ventilation hole 41*d* of the rolling brush cover 40 when the brush 20*d* rotates, thereby reducing the user experience.

Furthermore, on the other hand, the ventilation hole 41*d* is formed at the top of the rolling brush cover 40, and the residual stains splashed out when the rolling brush 20*d* rotates must overcome its own gravity to be splashed out of the ventilation hole 41*d* at the top of the rolling brush cover 40. Therefore, forming the ventilation hole 41*d* at the top of the rolling brush cover 40 can not only extend the ventilation path, ensure a ventilation effect, but also effectively prevent the stains on the rolling brush 20*d* from being splashed out.

Therefore, the size and the position of the ventilation hole 41*d* may be designed in consideration of the above factors.

As shown in FIG. 14*b*, further, a liquid spraying apparatus 60 may be further arranged in the housing 10*d* and behind the rolling brush 20*d* and can spray a liquid to the rolling brush 20*d*. Specifically, the liquid spraying apparatus 60 may be communicated with a liquid storage apparatus (not shown) via a pipeline, and the liquid storage apparatus may contain a cleaning liquid that includes clean water, a cleaning agent, or a mixture of the cleaning agent and the clean water. As the rolling brush 20*d* rotates, the liquid spraying apparatus 60 sprays the cleaning liquid to the rolling brush 20*d* to wet the rolling brush 20*d*, so that the rolling brush 20*d* wipes stubborn stains on a surface to be cleaned conveniently.

FIG. 14*c* is an enlarged view of A in FIG. 14*b*. As shown in FIG. 14*b* and FIG. 14*c*, the liquid spraying apparatus 60 is located above the dirt suction channel 30*d*, and a first scraper 70 is arranged between the liquid spraying apparatus 60 and the dirt suction channel 30*d* and in abutting contact with a surface of the rolling brush 20*d*. In practical applications, an abutting force of the first scraper 70 against the rolling brush 20*d* can be rationally designed, so that as the rolling brush 20*d* rotates, the first scraper 70 can continuously scrape off sewage on the rolling brush 20*d* and does not affect the normal rotation of the rolling brush 20*d*. The sewage scraped by the first scraper 70 falls onto the surface to be cleaned and is sucked into the collection bin via the dirt suction channel 30*d*.

FIG. 14*d* is an enlarged view of B in FIG. 14*b*. As shown in FIG. 14*b* and FIG. 14*d*, a second scraper 80 may further be arranged above the liquid spraying apparatus 60 and is in abutting contact with the surface of the rolling brush 20*d*. A force applied on the surface of the rolling brush 20*d* by the second scraper 80 may be smaller than a force applied on the surface of the rolling brush 20*d* by the first scraper 70. The liquid sprayed onto the rolling brush 20*d* by the liquid spraying apparatus 60 is usually not uniform enough, and the cleaning liquid on the rolling brush 20*d* can be uniformly scraped by the second scraper 80 through a smaller abutting force applied on the rolling brush 20*d* by the second scraper 80, so that the rolling brush 20*d* can be wet uniformly to the greatest extent.

It should be noted that other structures and functions of the vacuum head in the cleaner in the present embodiment are the same as those in Embodiment 11d, and the description of Embodiment 11d may be referred to in detail, which will not be described again here.

The vacuum head and the cleaner provided in the embodiment of the present disclosure will be described in conjunction with specific application scenarios.

Application Scenario VIII

A user uses the cleaner to clean the ground, and after finishing the work, the user can place the vacuum head of the cleaner on the ground or a tray. The ventilation hole in the rolling brush cover of the vacuum head and the opening at the bottom of the vacuum head form a natural ventilation channel, so that outside air can contact the rolling brush to naturally dry the rolling brush, peculiar smell of the rolling brush is dispelled conveniently, and the rolling brush is prevented from going moldy.

Application Scenario IX

When a user uses the cleaner to clean the ground, the vacuum head of the cleaner moves forward, the rolling brush rolls to clean the ground, and the dirt suction channel continuously sucks dirt on the ground. Because the ventilation hole is separated from the dirt suction channel, the formation of the ventilation hole does not affect the size of the negative pressure of the suction port, and the normal performance of the vacuum head is not affected.

In practical applications, after the cleaner finishes the cleaning work, the rolling brush usually becomes dirty and needs to be cleaned for the next cleaning work, and after the rolling brush is cleaned, liquid remains on the rolling brush. In order to prevent the liquid from flowing onto a clean surface such as the ground, the cleaner is usually equipped with a tray. The cleaner can be stored on the tray, and the liquid on the rolling brush may flows into the tray. When the tray is matched with the cleaner in use, the sewage on the rolling brush flows into the tray and scatters on a surface of the tray irregularly, so the user needs to clean the tray later, which increases the workload of the user.

In view of the above problems, the present disclosure provides a cleaning tray and a cleaner assembly. The cleaning tray allows sewage to flow only in a water collection groove through a water blocking rib, thereby preventing the sewage from contaminating other areas of the cleaning tray. In addition, no water remains in the cleaning tray due to the suction function of the cleaner.

Embodiment 13

Figure 15A:
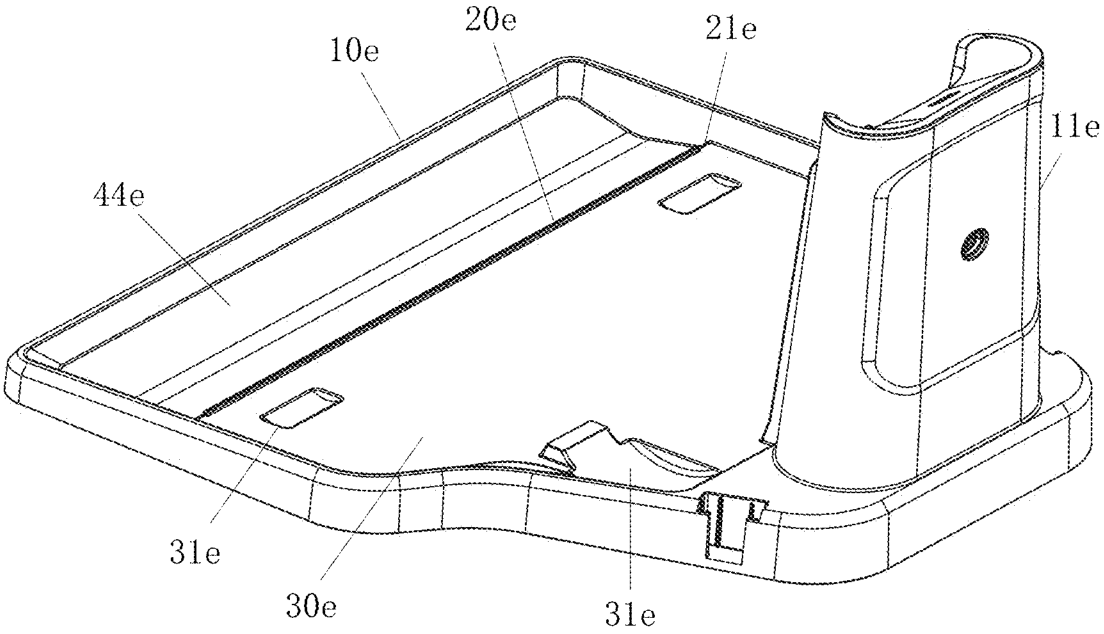
FIG. 15*a* is a schematic structural diagram of a cleaning tray according to an embodiment of the present disclosure.
Figure 15B:
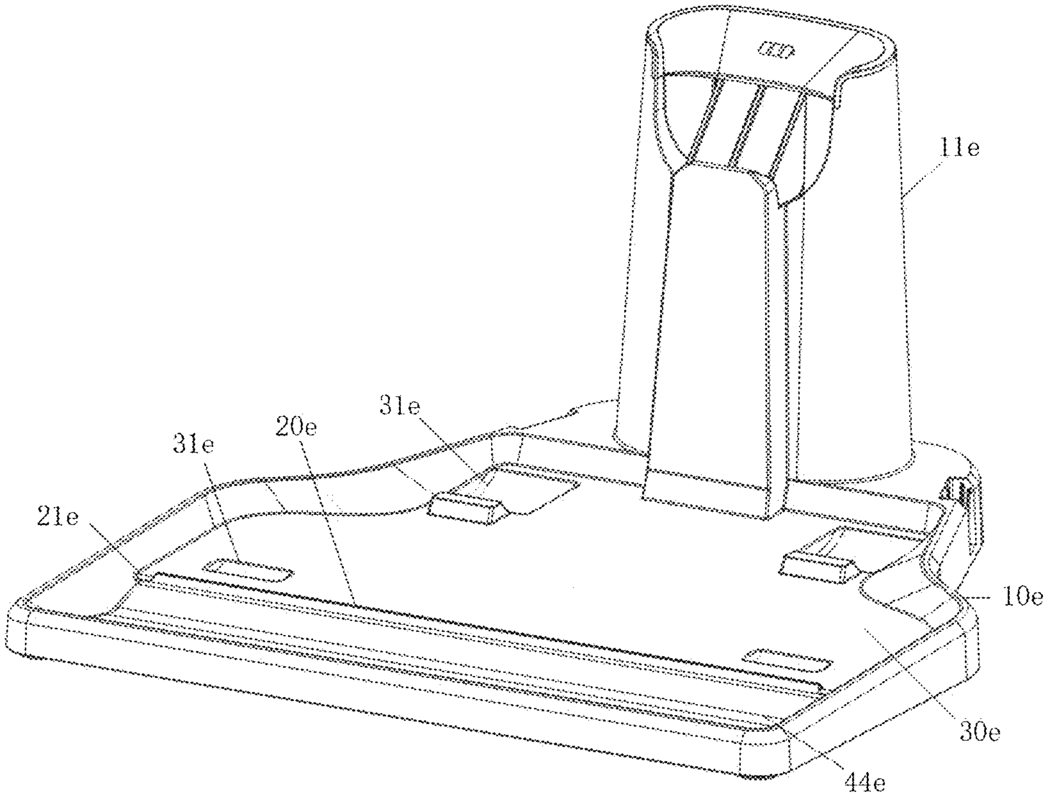
FIG. 15*b* is a schematic structural diagram of the cleaning tray in another angle of view according to an embodiment of the present disclosure.
Figure 15C:
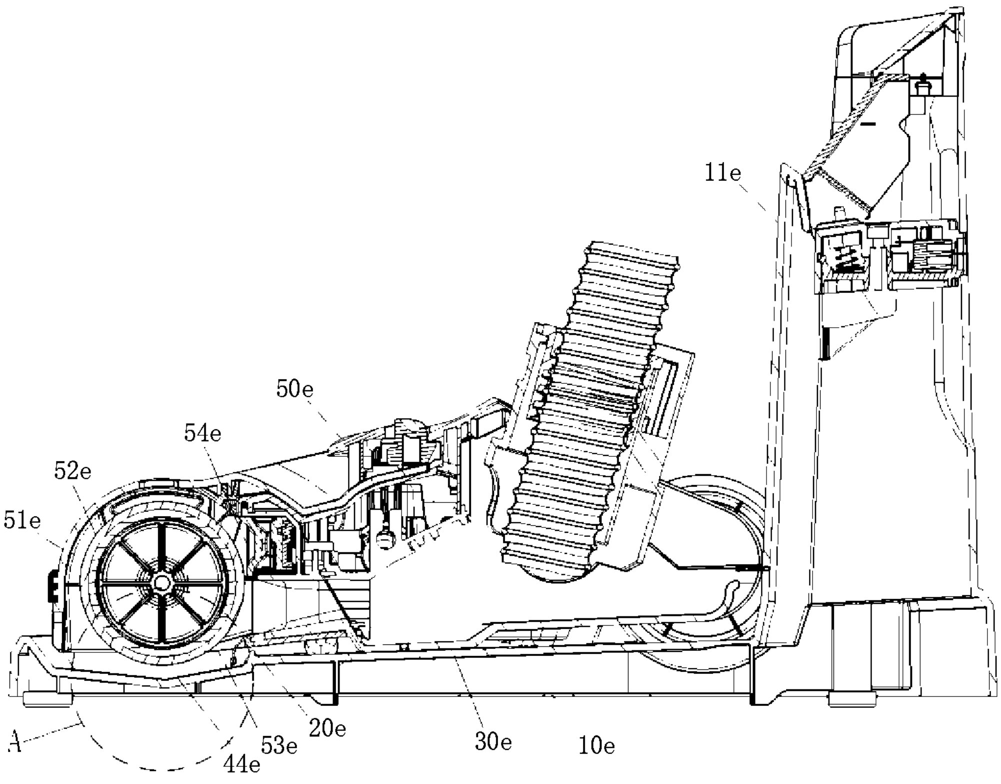
FIG. 15*c* is a schematic cross-sectional diagram of a cleaner assembly according to an embodiment of the present disclosure.

FIG. 15*a* is a schematic structural diagram of a cleaning tray according to an embodiment of the present disclosure, FIG. 15*b* is a schematic structural diagram of the cleaning tray in another angle of view according to an embodiment of the present disclosure, and FIG. 15*c* is a schematic cross-sectional diagram of a cleaner assembly according to an embodiment of the present disclosure, as shown in FIG. 15*a* to FIG. 15*c*.

An embodiment of the present disclosure provides a cleaning tray, which includes a tray body 10*e* and a water blocking rib 20*e*. The tray body 10*e* has an accommodation groove which has a bearing platform 30*e* and a water collection groove 44*e*. The water blocking rib 20*e* is arranged at the bottom of the accommodation groove to separate the bearing platform 30*e* from the water collection groove 44*e*.

According to the technical solutions provided in the embodiment of the present disclosure, the cleaning tray can be matched with the cleaner 50*e* in use, the bearing platform 30*e* is configured to bear the cleaner 50*e*, and the water collection groove 44*e* is configured to collect sewage on the cleaner 50*e*. Meanwhile, the cleaning tray can effectively prevent water in the water collection groove 44*e* from flowing into the bearing platform 30*e* through the water blocking rib 20*e*, and the sewage flows only in the water collection groove 44*e*, thereby preventing the sewage from contaminating other areas of the cleaning tray. In addition, no water remains in the cleaning tray due to the cooperation of the cleaning tray and the suction function of the cleaner 50*e*.

Further, with continuous reference to FIG. 15*a* to FIG. 15*c*, in the embodiment of the present disclosure, the position of the water collection groove 44*e* is adapted to the position of the rolling brush 52*e* of the cleaner 50*e*. When the cleaner 50*e* is placed on the bearing platform 30*e*, the rolling brush 52*e* of the cleaner 50*e* is suspended in the water collection groove 44*e*, and the water collection groove 44*e* and the housing 51*e* of the cleaner 50*e* form a rinsing channel through which water flows along an outer side surface of the rolling brush 52*e*. It should be noted that the rinsing channel in the embodiment of the present disclosure does not refer to a completely closed channel, and still has a non-closed part in contact with outside air, so as to facilitate the suction of a suction port 53*e* of the cleaner 50*e*. For example, when the cleaning tray is matched with the cleaner 50*e* in use, the cleaner 50*e* is placed on the bearing platform, and the rolling brush 52*e* of the cleaner 50*e* is suspended in the water collection groove 44*e*. When a self-cleaning mode of the cleaner 50*e* is enabled, a water spraying assembly in the cleaner 50*e* starts to spray water, water in the water collection groove 44*e* is increased, and at this time, the water in the water collection groove 44*e* contacts the rolling brush 52*e* and cleans the rolling brush 52*e* with the rotation of the rolling brush 52*e*.

Further, with reference to FIG. 15*c*, in order to enable the cleaner 50*e* to suck sewage in the water collection groove 44*e* completely through the suction port 53*e* when performing the self-cleaning on the rolling brush 52*e*, and achieve an aim of no water residue in the cleaning tray, in the embodiment of the present disclosure, the water blocking rib 20*e* is arranged below or behind the suction port 53*e* of the cleaner 50*e*. The water blocking rib 20*e* is arranged below or behind the suction port 53*e* of the cleaner 50*e*, so that the suction port 53*e* is located in the water collection groove 44*e* to suck the sewage in the water collection groove 44*e* completely. For example, when performing self-cleaning on the rolling brush 52*e*, the cleaner 50*e* cleans the rolling brush 52*e* by right of the rinsing channel. The water blocking rib 20*e* allows the water for self-cleaning to flow only in the water collection groove 44*e*, and the cleaner 50*e* sucks the water through the suction port 53*e* to suck the sewage from cleaning the rolling brush 52*e* in the water collection groove 44*e*, so that no water remains in the cleaning tray.

According to the technical solutions provided in the embodiment of the present disclosure, when matched with the cleaner 50*e* in use, the cleaning tray not only charge and store the cleaner 50*e*, bus also assists in cleaning the rolling brush 52*e* of the cleaner 50*e* at the same time. For example, the cleaning tray can charge the cleaner 50*e* through a charging pile 11*e* on the tray body 10*e*, and store the cleaner 50*e* through the accommodation groove on the tray body 10*e*. The bearing platform 30*e* supports the cleaner 50*e*, and the water collection groove 44*e* and a housing of the cleaner 50*e* form a rinsing channel through which water flows along the outer side surface of the rolling brush 52*e*, thereby assisting in cleaning the rolling brush 52*e*. The cleaner 50*e* is placed in the cleaning tray, and the rolling brush 52*e* can be cleaned through the rinsing channel. Meanwhile, the water blocking rib 20*e* can effectively prevent water in the water collection groove 44*e* from flowing into the bearing platform 30*e*, and the water for self-cleaning flows only in the water collection groove 44*e*, thereby preventing sewage from contaminating other areas of the cleaning tray. In addition, no water remains in the cleaning tray by the cooperation of the cleaning tray and the suction function of the cleaner 50*e*.

It should be noted that in the embodiment of the present disclosure, the cleaning tray may be used as a separate component or, as shown in FIG. 15*c*, the cleaning tray may be matched with the cleaner 50*e* in use, and the cleaner 50*e* and the cleaning tray are combined to form a cleaning apparatus assembly. Not all components but only the vacuum head apparatus and part of the housing of the cleaner 50*e* are shown in FIG. 15*c*, and other components that are not shown include but are not limited to a handle, a clean water bin, a collection bin, a main motor apparatus, etc.

In the embodiment of the present disclosure, the cleaner 50*e* includes but is not limited to the cleaner 50*e* shown in FIG. 15*c*, a self-moving cleaning robot, a hand-held dust collector, an upright cleaning machine, etc. The cleaner 50*e* described in the above and the below embodiments is described by taking the cleaner 50*e* shown in FIG. 15*c* as an example. It should be noted that the description of the cleaner shown in FIG. 15*c* is by way of example only and should not be construed as unduly limiting the embodiment of the present disclosure.

Taking the cleaner 50*e* shown in FIG. 15*c* as an example, with reference to FIG. 15*c*, the cleaner 50*e* is usually wrapped by the housing 51*e*. Generally, the housing 51*e* includes an upper housing and a bottom housing. A rotary shaft of the rolling brush 52*e* is fixed to the housing 51*e* and capable of rotating. In the housing 51*e*, the cleaner 50*e* is provided with water conveying-related apparatus, so that the rolling brush 52*e* cleans the ground under the rinsing of water and is cleaned by itself. Specifically, a water spraying assembly and a suction assembly are generally included, water spray orifices 54*e* of the water spraying assembly and a suction port 53*e* of the suction assembly face the rolling brush 52*e*, and the water spray orifices 54*e* of the water spraying assembly are located above the suction port 53*e* of the suction assembly. The suction port 53*e* of the suction assembly is arranged at the bottom of the housing 51*e* for sucking sewage on the ground. The water spraying assembly and the suction assembly are arranged on the bottom housing, and after the upper housing is connected to the bottom housing, the water spraying assembly and the suction assembly are covered by and buckled in the upper housing. The upper housing is further configured to cover and buckle the rolling brush 52*e*, and guide water sprayed out of the water spray orifices 54*e* of the water spraying assembly to the front of the rolling brush 52*e*.

Specifically, the water spraying assembly sprays water through the water spray orifices 54*e* to wet the rolling brush 52*e*, and a surface to be cleaned below the rolling brush 52*e* is cleaned with the rolling of the rolling brush 52*e*. As the cleaner 50*e* moves forward, sewage produced after the rolling brush 52*e* brushes the surface to be cleaned reaches the rear of the rolling brush 52*e*, is sucked by the suction port 53*e* of the suction assembly, and is stored in a sewage tank or discharged to a sewer.

As the cycle is repeated, the cleaner 50*e* cleans the surface to be cleaned when moving forward. After the surface to be cleaned is cleaned, the cleaner 50*e* can be placed in the cleaning tray provided in the embodiment of the present disclosure, and stored in and charged by the cleaning tray. Furthermore, the cleaning tray provided in the embodiment of the present disclosure can assist in cleaning the rolling brush 52*e* of the cleaner 50*e*. The cleaner 50*e* is placed in the cleaning tray, and the water collection groove 44*e* and the housing 51*e* of the cleaner 50*e* form a rinsing channel through which water flows along the outer side surface of the rolling brush, thereby assisting in cleaning the rolling brush 52*e* of the cleaner 50*e*. The cleaner 50*e* is placed on the bearing platform, and the rolling brush 52*e* of the cleaner 50*e* is suspended in the water collection groove 44*e*. When the self-cleaning mode of the cleaned 50*e* is enabled, the water spraying assembly in the cleaner 50*e* starts to spray water through the water spray orifices 54*e* to wet the rolling brush 52*e*. As the rolling brush 52*e* rolls, water in the water collection groove 44*e* is increased, and at this time, the water in the water collection groove 44*e* contacts the rolling brush 52*e* and cleans the rolling brush 52*e* with the rotation of the rolling brush 52*e*. Meanwhile, the water blocking rib 20*e* can effectively prevent the water in the water collection groove 44*e* from flowing into the bearing platform 30*e*, and the water for self-cleaning flows only in the water collection groove 44*e*, thereby preventing sewage from contaminating other areas of the cleaning tray. In addition, no water remains in the cleaning tray by the cooperation of the cleaning tray and the suction function of the cleaner 50*e*.

When performing self-cleaning on the rolling brush 52*e*, the cleaner 50*e* may spray clean water or water containing a cleaning solution to the rolling brush 52*e* through the water spraying assembly to clean the rolling brush 52*e*. One self-cleaning mode is that the water spraying assembly sprays water, and the rolling brush 52*e* rolls at the same time, thereby assisting in cleaning the rolling brush 52*e* by right of the rinsing channel. Meanwhile, the suction assembly sucks water through the suction port 53*e* to suck sewage from cleaning the rolling brush 52*e*, that is, the water spraying assembly, the rolling brush 52*e*, and the suction assembly operates at the same time. Another self-cleaning mode is that the water spraying assembly sprays water, and the rolling brush 52*e* rolls at the same time, thereby assisting in cleaning the rolling brush 52*e* by right of the rinsing channel. At this time, the suction assembly does not suck water, and sucks sewage through the suction port 53*e* of the suction assembly after the rolling brush 52*e* is cleaned, that is, the water spraying assembly and the rolling brush 52*e* operate first, and then the suction assembly operates after the rolling brush 52*e* is cleaned. Or, the above two self-cleaning modes are operated alternately to clean the rolling brush 52*e*. Of course, other self-cleaning modes may also be included, which are not limited herein.

Figure 15D:
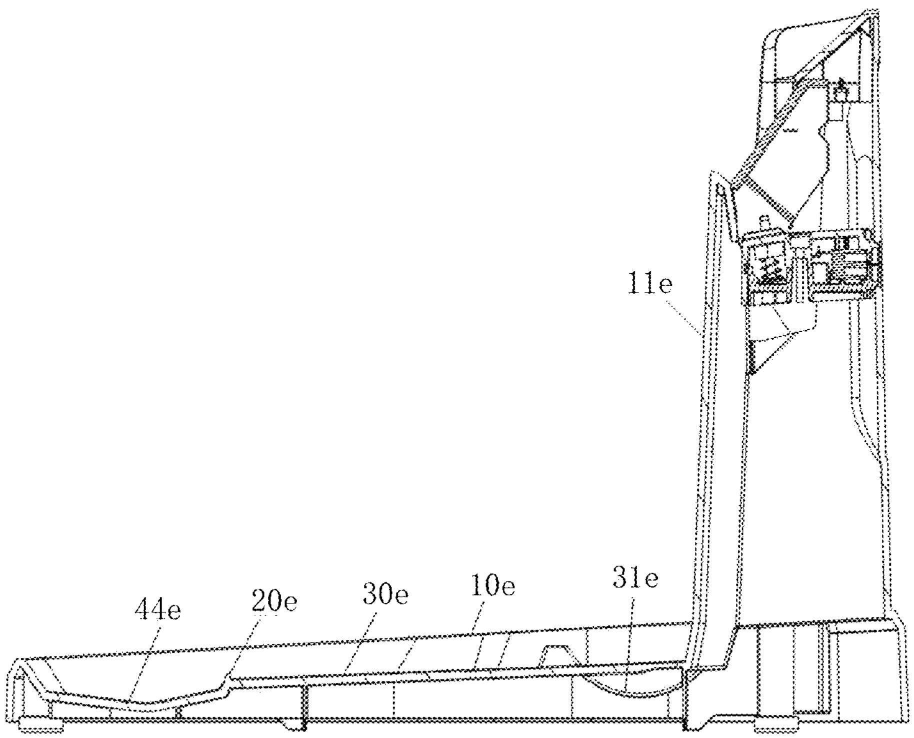
FIG. 15*d* is a schematic cross-sectional diagram of the cleaning tray according to an embodiment of the present disclosure.

In actual use of the cleaner 50*e*, the bottom of the cleaner 50*e* is inevitably contaminated with sewage. If the bottom housing of the cleaner 50*e* is contaminated with sewage, when the cleaner 50*e is placed in the cleaning tray, the bearing platform 30***e* supports the bottom housing, and the sewage on the bottom housing flows onto the bearing platform 30*e*. In order to enable the sewage on the bearing platform 30*e* to flow into the water collection groove 44*e* conveniently, with reference to FIG. 15*c* and FIG. 15*d*, in the embodiment of the present disclosure, the height of the water collection groove 44*e* is less than that of the bearing platform 30*e*. The height of the bearing platform 30*e* gradually decreases along a direction from the bearing platform 30*e* to the water collection groove 44*e*. It should be noted that the height here refers to a height relative to a plane on which the tray body 10*e* is placed, including but not limited to the ground. A supporting member, including but not limited to a landing leg, is arranged on a surface, contacting the ground, of the tray body 10*e*, and a plurality of protrusions are arranged on the supporting member to form a rough surface. The rough surface may be textured, serrated, corrugated, etc.

In the embodiment of the present disclosure, a side, facing the water collection groove 44*e*, of the tray body 10*e* may be defined as the front of the tray body 10*e*, and a side, facing the bearing platform 30*e*, of the tray body 10*e* may be defined as the rear of the tray body 10*e*. Relative to the plane on which the tray body 10*e* is placed, an entire surface of the side, facing away from the plane, of the tray body 10*e* is substantially lower in the front and higher in the rear, a height difference is formed, and with this structure, water remaining on the tray body 10*e* is guided into the water collection groove 44*e* that accommodates the rolling brush 52*e* and is located at the front, that is, all of the water remaining on the tray body 10*e* is guided to a lower surface. Even if water in the water collection groove 44*e* or other areas flows into the bearing platform 30*e*, because a falling slope is formed between the bearing platform 30*e* and the water collection groove 44*e*, water in the bearing platform 30*e* flows to the water collection groove 44*e*.

In order to prevent sewage from remaining on the bearing platform 30*e*, with continuous reference to FIG. 15*a* and FIG. 15*b*, in the embodiment of the present disclosure, a gap 21*e* is reserved between at least one of two ends of the water blocking rib 20*e* and a wall of the accommodation groove, and the gap 21*e* penetrates through the bearing platform 30*e* and the water collection groove 44*e*. If the bottom of the cleaner 50*e* is contaminated with sewage, the sewage on the bottom housing flows onto the bearing platform 30*e*, and then the sewage on the bearing platform 30*e* flows into the water collection groove 44*e* via the gap 21*e*. When performing self-cleaning on the rolling brush 52*e* later, the cleaner 50*e* can suck the sewage in the water collection groove 44*e* through the suction port 53*e* of the suction assembly, so that no water remains on the bearing platform 30*e* and the water collection groove 44*e* of the cleaning tray. For example, the sewage on the bearing platform 30*e* may flow into the water collection sump 44*e* located at the front at a low level via the gaps 21*e* at two sides of the water blocking rib 20*e*. Even if water in the water collection groove 44*e* or other areas flows into the bearing platform 30*e*, because a falling slope is formed between the bearing platform 30*e* and the water collection groove 44*e*, water on the bearing platform 30*e* flows into the water collection groove 44*e* via the gaps 21*e*.

Further, in order to enable the sewage on the bearing platform 30*e* to flow into the water collection groove 44*e* more smoothly, in the embodiment of the present disclosure, a flow guiding surface is arranged at a side, facing to the bearing platform 30*e*, of the water blocking rib 20*e* and configured to guide a liquid from the water blocking rib 20*e* to the gap 21*e*. Implementations of the flow guiding surface include but are not limited to the following way that if two gaps 21*e* are formed, the side, facing the bearing platform 30*e*, of the water blocking rib 20*e* is an arc-shaped surface, and a side, facing the bearing platform 30*e*, of the arc-shaped surface is convex. Or, the flow guiding surface and the water blocking rib 20*e* form a triangular structure, and the water blocking rib 20*e* is the bottom edge of the triangular structure. If one gap 21*e* is formed, the water blocking rib 20*e* is of an inclined structure, and from an end without the gap 21*e* to an end with the gap 21*e*, the water blocking rib 20*e* gradually inclines towards a side of the water collection groove 44*e*, so that the liquid on the water blocking rib 20*e* is guided to the gap 21*e* from the water blocking rib 20*e*.

In actual use of the cleaner 50*e*, the bottom of the cleaner 50*e* is usually provided with rollers for facilitating the movement of the cleaner 50*e*. In order to prevent the cleaner 50*e* from moving in the cleaning tray, with reference to FIG. 15*a*, FIG. 15*b*, and FIG. 15*d*, in the embodiment of the present disclosure, limiting grooves 31*e* for accommodating the rollers of the cleaner 50*e* are formed in the bearing platform 30*e*. The number, shapes, and positions of the limiting grooves 31*e* correspond to the number, shapes and positions of the rollers of the cleaner 50*e*, and when the cleaner 50*e* is placed on the cleaning tray, the rollers of the cleaner 50*e* are placed in the corresponding limiting grooves 31*e*. The limiting grooves 31*e* can prevent the cleaner 50*e* from moving in the cleaning tray so as to fix the position of the cleaner 50*e*.

In the embodiment of the present disclosure, in order to prevent the sewage produced from cleaning the rolling brush 52*e* from being splashed out of the water collection groove 44*e*, with reference to FIG. 15*c*, the wall of the accommodation groove is in close proximity to the housing 51*e* of the cleaner 50*e*.

The cleaner 50*e* is placed in the cleaning tray, and the water collection groove 44*e* and the housing 51*e* of the cleaner 50*e* form a rinsing channel through which water flows along the outer side surface of the rolling brush 52*e*. When the water spraying assembly sprays water through the water spray orifices 54*e*, as the rolling brush 52*e* rolls, the water flows around the rolling brush 52*e* along the rinsing channel to rinse the rolling brush 52*e*, and the high-speed rinsing of the water can effectively remove dirt on the rolling brush 52*e*, so as to efficiently clean the rolling brush 52*e* at a high speed. When rinsing the rolling brush 52*e*, sewage gradually flows into the water collection groove 44*e*, because the wall of the accommodation groove is close proximity to the housing 51*e* of the cleaner 50*e*, the sewage is not splashed out of the water collection groove 44, and the water blocking rib 20*e* prevents the water in the water collection groove 44*e* from flowing into the bearing platform 30*e*. Then, the sewage in the water collection groove 44*e* is sucked by the suction assembly, thereby forming a complete cleaning process.

Figure 15E:
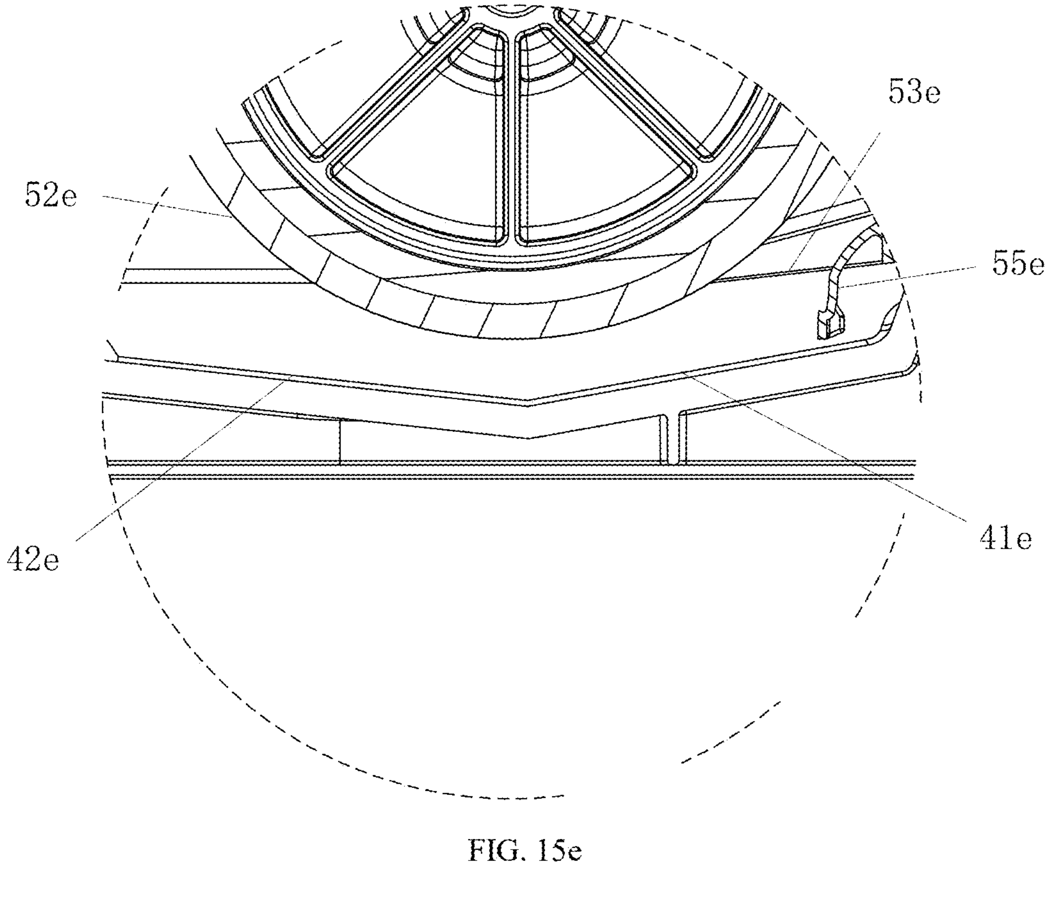
FIG. 15*e* is an enlarged view of A in FIG. 15*c*.

In the embodiment of the present disclosure, the water collection groove 44*e* may be implemented in a variety of ways, and with reference to FIG. 15*e*, in a possible implementation, the water collection groove 44*e* includes at least a first water collection plate 41*e* and a second water collection plate 42*e*. The first water collection plate 41*e* is of a straight plate structure, with one end connected with the water blocking rib 20*e* and the other end connected with one end of the second water collection plate 42*e*. The height of the first water collection plate 41*e* gradually decreases along a direction from the water blocking rib 20*e* to the second water collection plate 42*e*. The second water collection plate 42*e* can be implemented in a variety of ways, for example, the second water collection plate 42*e* may be of a straight plate structure or an arc-shaped plate structure, and an end, away from the first water collection plate 41*e*, of the second water collection plate 42*e* is connected with the wall of the accommodation groove. The second water collection plate 42*e* is of an arc-shaped plate structure or a straight plate structure, so that water can be guided to the lowest point of the water collection groove 44*e* conveniently.

A falling surface can be formed in the water collection groove 44*e* by the first water collection plate 41*e* and the second water collection plate 42*e*, water can be guided to the lowest point of the water collection groove 44*e* through the falling surface, and the lowest point of the water collection groove 44*e* corresponds to the bottom of the rolling brush 52*e*. After the water is guided to the lowest point by the water collection groove 44*e*, and the rolling brush 52 is cleaned by the self-cleaning function of the rolling brush 52*e*, all of the sewage can be collected in the water collection groove 44*e*, so that all of the sewage can be sucked away, and no water remains in the water collection groove 44*e*.

For example, as shown in FIG. 15*e*, the first water collection plate 41*e* and the second water collection plate 42*e* are both of a straight plate structure, and the two straight plate structures are connected to form a structure with two higher sides and a lower middle as a V-shape, which can guide water to the bottom of the rolling brush 52*e*. When the self-cleaning mode of the rolling brush 52*e* is enabled, the suction assembly sucks the water in the water collection groove 44*e* through the suction port 53*e* to suck the water in the water collection groove 44*e* completely. The first water collection plate 41*e* of the water collection groove 44*e* is of a straight plate structure, and the slope of the first water collection plate 41*e* is fixed and relatively smooth, which helps the suction port 53*e* to suck the water in the water collection groove 44*e* and avoids water residue. If the water collection groove 44*e* has a full arc-shaped bottom, and the slope of the bottom increases and becomes steeper from the middle of the bottom to the water blocking rib 20*e*, which is unfavorable for the suction port 53*e* to suck the water in the water collection groove 44*e*, resulting in water residue.

Figure 15F:
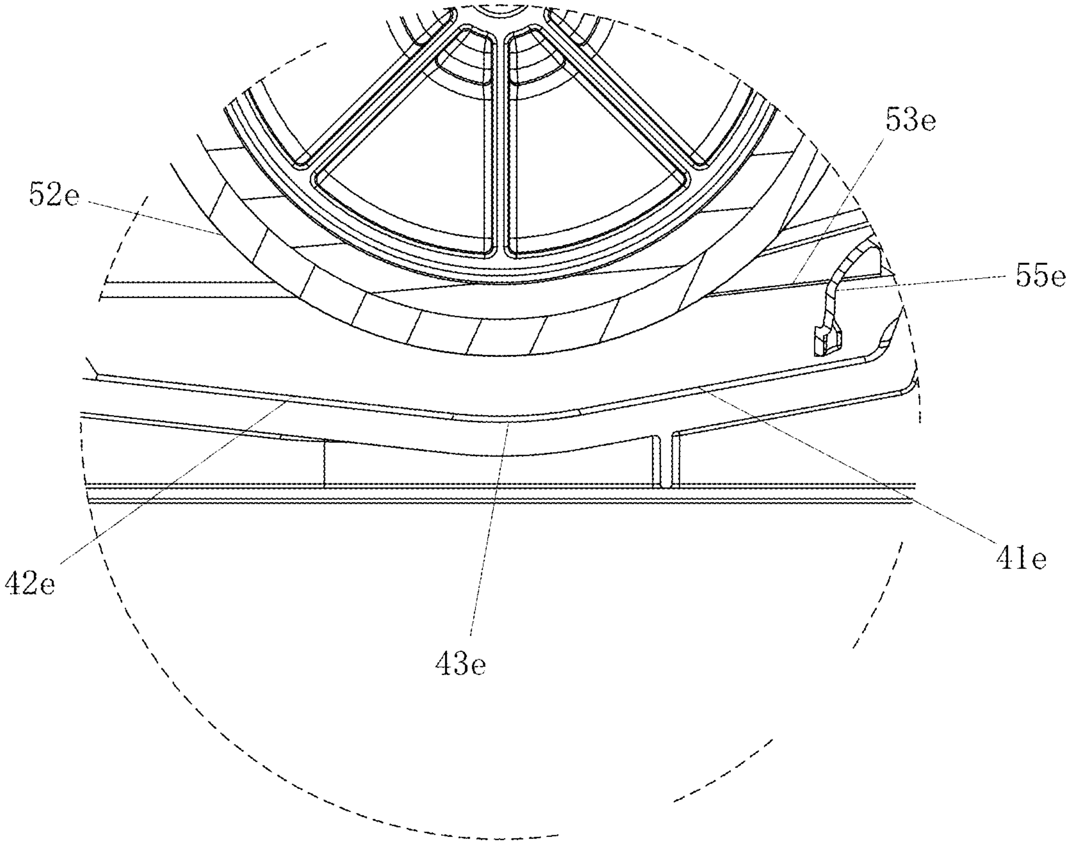
FIG. 15*f* is an enlarged view of another implementation of A in FIG. 15*c.*

Further, if the first water collection plate 41*e* and the second water collection plate 42*e* are both of a straight plate structure, a water storage angle may be formed between the two straight plate structures, and water flow impacts the water storage angle and forms a tiny vortex in the water storage angle, resulting in sewage residue in the water storage angle. In order to prevent water from remaining between the two straight plate structures, with reference to FIG. 15*f*, in the embodiment of the present disclosure, the second water collection plate 42*e* is of a straight plate structure, and a third water collection plate 43*e* is further arranged between the first water collection plate 41*e* and the second water collection plate 42*e*. The third water collection plate 43*e* is of an arc-shaped structure and is sunken away from an opening of the water collection groove 44*e*. The third water collection plate 43*e* is in smooth transition connection with the first water collection plate 41*e* and the second water collection plate 42*e*, respectively.

Water on the second water collection plate 42*e* can be smoothly transited to the first water collection plate 41*e* through the third water collection plate 43*e*, and sucked by the suction port 53*e* of the suction assembly at the same time. No water storage angle is formed between the first water collection plate 41*e* and the second water collection plate 42*e*, so that no sewage remains in the water collection groove 44*e*. The bottom of the water collection groove 44*e* is formed by the first water collection plate 41*e* of a straight plate structure, the third water collection plate 43*e* of an arc-shaped structure, and the second water collection plate 42*e* of a straight plate structure, the first water collection plate 41*e* and the second water collection plate 42*e* at two sides facilitate collecting sewage in the water collection groove 44*e*, the third water collection plate 43*e* is smoothly transited to the first water collection plate 41*e* from the middle of the bottom to the water blocking rib 20*e*, and the slope of the first water collection plate 42*e* is fixed and relatively smooth, which facilitates sucking the water in the water collection groove 44*e*, and avoids water residue.

In summary, compared with the prior art, according to the technical solutions provided in the embodiment of the present disclosure, on the one hand, the cleaning tray can be matched with the cleaner 50*e* in use, the bearing platform 30*e* is configured to bear the cleaner 50*e*, and the water collection groove 44*e* is configured to collect sewage on the cleaner 50*e*. Meanwhile, the cleaning tray can effectively prevent water in the water collection groove 44*e* from flowing into the bearing platform 30*e* through the water blocking rib 20*e*, and the sewage flows only in the water collection groove 44*e*, thereby preventing the sewage from contaminating other areas of the cleaning tray. In addition, no water remains in the cleaning tray by cooperation of the cleaning tray and the suction function of the cleaner 50*e*.

On the other hand, the cleaning tray can not only charge and store the cleaner 50*e*, but also assists in cleaning the rolling brush 52*e* of the cleaner 50*e* at the same time. For example, the cleaning tray can charge the cleaner 50*e* through a charging pile 11*e* on the tray body 10*e*, and store the cleaner 50*e* through the accommodation groove on the tray body 10*e*. The bearing platform 30*e* supports the cleaner 50*e*, and the water collection groove 44*e* and the housing 51*e* of the cleaner 50*e* form a rinsing channel through which water flows along the outer side surface of the rolling brush 52*e*, thereby assisting in cleaning the rolling brush 52*e*. The cleaner 50*e* is placed in the cleaning tray, and the rolling brush 52*e* is cleaned through the rinsing channel.

Embodiment 14

On the basis of Embodiment 13, Embodiment 14 of the present disclosure provides a cleaner assembly, which includes a cleaner 50*e* and a cleaning tray, where the cleaning tray may be the cleaning tray of Embodiment 13. A specific solution is as follows:

with reference to FIG. 15*a* to FIG. 15*f*, the embodiment of the present disclosure further provides a cleaner assembly, which includes a cleaner 50*e* and a cleaning tray. The cleaner 50*e* includes a housing 51*e* and a rolling brush 52*e* mounted on the housing 51*e*. The cleaning tray includes a tray body 10*e* and a water blocking rib 20*e*. The tray body 10*e* has an accommodation groove that has a bearing platform 30*e* and a water collection groove 44*e*. The water blocking rib 20*e* is arranged at the bottom of the accommodation groove and separates the bearing platform 30*e* from the water collection groove 44*e*.

According to the technical solutions provided in the embodiment of the present disclosure, the cleaning tray can be matched with the cleaner 50*e* in use, the bearing platform 30*e* is configured to bear the cleaner 50*e*, and the water collection groove 44*e* is configured to collect sewage on the cleaner 50*e*. Meanwhile, the cleaning tray can effectively prevent water in the water collection groove 44*e* from flowing into the bearing platform 30*e* through the water blocking rib 20*e*, and the sewage flows only in the water collection groove 44*e*, thereby preventing the sewage from contaminating other areas of the cleaning tray. In addition, no water remains in the cleaning tray by cooperation of the cleaning tray and the suction function of the cleaner 50*e*.

Further, in the embodiments of the present disclosure, the position of the water collection groove 44*e* is adopted to the position of the rolling brush 52*e*. When the cleaner 50*e* is placed on the bearing platform 30*e*, the rolling brush 52*e* is suspended in the water collection groove 44*e*, and the water collection groove 44*e* and the housing 51*e* form a rinsing channel through which water flows along an outer side surface of the rolling brush 52*e*. When the cleaning tray is matched with the cleaner 50*e* in use, the cleaner 50*e* is placed on the bearing platform, and the rolling brush 52*e* of the cleaner 50*e* is suspended in the water collection groove 44*e*. When a self-cleaning mode of the cleaner 50*e* is enabled, a water spraying assembly in the cleaner 50*e* starts to spray water, water in the water collection groove 44*e* of the cleaning tray is increased, and at this time, the water in the water collection groove 44*e* contacts the rolling brush 52*e* and cleans the rolling brush 52*e* with the rotation of the rolling brush 52*e*.

According to the technical solutions provided in the embodiment of the present disclosure, when the cleaner 50*e* is matched with the cleaning tray in use, the cleaning tray can not only charge and store the cleaner 50*e*, but also assist in cleaning the rolling brush 52*e* of the cleaner 50*e* at the same time. For example, the cleaning tray can charge the cleaner 50*e* through a charging pile 11*e* on the tray body 10*e*, and store the cleaner 50*e* through the accommodation groove on the tray body 10*e*. The bearing platform 30*e* supports the cleaner 50*e*, and the water collection groove 44*e* and the housing 51*e* form a rinsing channel through which water flows along the outer side surface of the rolling brush 52*e*, thereby assisting in cleaning the rolling brush 52*e* of the cleaner 50*e*. The cleaner 50*e* is placed in the cleaning tray, and the rolling brush 52*e* can be cleaned through the rising channel. Meanwhile, the water blocking rib 20*e* can effectively prevent water in the water collection groove 44*e* from flowing into the bearing platform 30*e*, and the water for self-cleaning flows only in the water collection groove 44*e*, thereby preventing sewage from contaminating other areas of the cleaning tray. In addition, no water remains in the cleaning tray by cooperation of the cleaning tray and the suction function of the cleaner 50*e*.

It should be noted that in the embodiment of the present disclosure, not all components but only the vacuum head apparatus and part of the housing of the cleaner 50*e* are shown in FIG. 15*c*, and other components that are not shown include but are not limited to a handle, a clean water bin, a collection bin, a main motor apparatus, etc. In the embodiment of the present disclosure, the cleaner 50*e* includes but is not limited to the cleaner 50*e* shown in FIG. 15*c*, a self-moving cleaning robot, a hand-held dust collector, an upright cleaner, etc. The cleaner 50*e* described in the above and below embodiments is described by taking the cleaner 50*e* shown in FIG. 15*c* as an example. It should be noted that the description of the cleaner 50*e* shown in FIG. 15*c* is by way of example only and should not be construed as unduly limiting the embodiment of the present disclosure.

Further, with reference to FIG. 15*c*, in the embodiment of the present disclosure, a water spraying assembly and a suction assembly are arranged in the housing 51*e*. A suction port 53*e* of the suction assembly is arranged at the bottom of the housing 51*e*, and when the rolling brush 52 is suspended in the water collection groove 44*e*, the suction port 53*e* is located in the water collection groove 44*e*. Taking the cleaner 50*e* shown in FIG. 15*c* as an example, with reference to FIG. 15*c*, the cleaner 50*e* is usually wrapped by the housing 51*e*. Generally, the housing 51*e* includes an upper housing and a bottom housing. A rotary shaft of the rolling brush 52*e* is fixed to the housing 51*e* and capable of rotating. In the housing 51*e*, the cleaner 50*e* is provided with water conveying-related apparatus, so that the rolling brush 52*e* cleans the ground under the rinsing of water and is cleaned by itself. Specifically, a water spraying assembly and a suction assembly are generally included, water spray orifices 54*e* of the water spraying assembly and a suction port 53*e* of the suction assembly face the rolling brush 52*e*, and the water spray orifices 54*e* of the water spraying assembly are located above the suction port 53*e* of the suction assembly. The suction port 53*e* of the suction assembly is arranged at the bottom of the housing 51*e* for sucking sewage on the ground. The water spraying assembly and the suction assembly are arranged on the bottom housing, and after the upper housing is connected to the bottom housing, the water spraying assembly and the suction assembly are covered by and buckled in the upper housing. The upper housing is further configured to cover and buckle the rolling brush 52*e* and guide water sprayed out of the water spray orifices 54*e* of the water spraying assembly to the front of the rolling brush 52*e*.

Specifically, the water spraying assembly sprays water through the water spray orifices 54*e* to wet the rolling brush 52*e*, and a surface to be cleaned below the rolling brush 52*e* is cleaned with the rolling of the rolling brush 52*e*. As the cleaner 50*e* move forward, sewage produced after the rolling brush 52*e* brushes the surface to be cleaned reaches the rear of the rolling brush 52*e*, is sucked by the suction port 53*e* of the suction assembly, and is stored in a sewage tank or discharged to a sewer.

As the cycle is repeated, the cleaner 50*e* cleans the ground when moving forward.

After the surface to be cleaned is cleaned, the cleaner 50*e* can be placed in the cleaning tray provided in the embodiment of the present disclosure, and is stored in and charged by the cleaning tray. Furthermore, the cleaning tray provided in the embodiment of the present disclosure can assist in cleaning the rolling brush 52*e* of the cleaner 50*e*. The cleaner 50*e* is placed in the cleaning tray, the rolling brush 52*e* is suspended in the water collection groove 44*e*, and the water collection groove 44*e* and the housing 51*e* form a rinsing channel through which water flows along the outer side surface of the rolling brush 52*e*, thereby assisting in cleaning the rolling brush 52*e* of the cleaner 50*e*. The cleaner 50*e* is placed on the bearing platform, and the rolling brush 52*e* of the cleaner 50*e* is suspended in the water collection groove 44*e*. When the self-cleaning mode of the cleaner 50*e* is enabled, the water spraying assembly in the cleaner 50*e* starts to spray water through the water spray orifices 54*e* to wet the rolling brush 52*e*. As the rolling brush 52*e* rolls, water in the water collection groove 44*e* is increased, and at this time, the water in the water collection groove 44*e* contacts the rolling brush 52*e* and cleans the rolling brush 52*e* with the rotation of the rolling brush 52*e*. Meanwhile, the water blocking rib 20*e* can effectively prevent the water in the water collection groove 44*e* from flowing into the bearing platform 30*e*, and the water for self-cleaning flows only in the water collection groove 44*e*, thereby preventing sewage from contaminating other areas of the cleaning tray. In addition, when the rolling brush 52*e* is accommodated in a water collection area, the suction port 53*e* is located in the water collection groove 44, so that no water remains in the cleaning tray by cooperation of the cleaning tray and the suction function of the cleaner 50*e*.

With reference to FIG. 15_e_ or FIG. 15_f_, in the embodiment of the present disclosure, a scraper 55_e_ is further arranged at the bottom of the housing 51_e_. The suction port 53_e_ is located between the scraper 55_e_ and the rolling brush 52_e_, and when the rolling brush 52_e_ is suspended in the water collection groove 44_e_, the scraper 55_e_ is suspended in the water collection groove 44_e_. The cleaner 50_e_ can gather waste or sewage on a surface to be cleaned together more easily through the scraper 55_e_, and clean the ground more thoroughly and quickly to achieve higher cleanliness of the ground. When the scraper 55_e_ is suspended in the water collection groove 44_e_, the rinsing channel is in seamless connection with the suction port 53_e_ of the suction assembly, thereby avoiding water leakage. Meanwhile, the scraper 55_e_ can further prevent the water in the water collection groove 44_e_ from flowing into the bearing platform 30_e_. Of course, in order to further avoid water leakage, the scraper 55_e_ may abut against the bottom of the water collection groove 44_e_.

It should be noted that technical features of the cleaning tray of Embodiment 14 can refer to the implementations of the cleaning tray of Embodiment 13, and relevant technical features of Embodiment 14 can refer to the technical features of Embodiment 13, which will not be described again here.

The technical solutions adopted by the present disclosure will be described below in conjunction with specific application scenarios to facilitate understanding. The following application scenarios are described by taking a cleaner as an example.

Application Scenario X

After the ground is cleaned, the cleaner can be placed in the cleaning tray, and is stored in and charged by the cleaning tray.

Meanwhile, the water collection groove and the housing of the cleaner form a rinsing channel through which water flows along the outer side surface of the rolling brush, thereby assisting in cleaning the rolling brush of the cleaner. The cleaner 50_e_ is placed on the bearing platform, and the rolling brush 52_e_ of the cleaner 50_e_ is suspended in the water collection groove 44_e_. When the self-cleaning mode of the cleaner 50_e_ is enabled, the water spraying assembly in the cleaner 50_e_ starts to spray water through the water spray orifices 54_e_ to wet the rolling brush 52_e_. As the rolling brush 52_e_ rolls, water in the water collection groove 44_e_ is increased, and at this time, the water in the water collection groove 44_e_ contacts the rolling brush 52_e_ and cleans the rolling brush 52_e_ with the rotation of the rolling brush 52_e_. Meanwhile, the water blocking rib can effectively prevent the water in the water collection groove from flowing into the bearing platform, and the water for self-cleaning flows only in the water collection groove, thereby preventing sewage from contaminating other areas of the cleaning tray. In addition, no water remains in the cleaning tray by cooperation of the cleaning tray and the suction function of the cleaner.

Application Scenario XI

After finishing the cleaning work, the cleaner is placed in the cleaning tray, and water on the cleaner flows to the bearing platform and the water collection groove of the cleaning tray.

Relative to the ground on which the tray body is placed, an entire surface of a side, facing away from the ground, of the tray body is substantially lower in the front and higher in the rear, a height difference is formed, and with this structure, water remaining on the tray body is guided into the water collection groove located at the front. Even if water in the water collection groove or other areas flows into the bearing platform, because a falling slope is formed between the bearing platform and the water collection groove, water in the bearing platform flows into the water collection groove via a gap.

Application Scenario XII

The water collection groove and the housing of the cleaner form a rinsing channel through which water flows along the outer side surface of the rolling brush, thereby assisting in cleaning the rolling brush of the cleaner. The water is guided to the bottom of the rolling brush through a falling surface between a first water collection plate and a second water collection plate. The suction assembly can suck the water in the water collection groove through the suction port to suck the water in the water collection groove completely.

The first water collection plate, close to the suction port, of the water collection groove is of a straight plate structure, and the slope of the first water collection plate is fixed and relatively smooth, which facilitates sucking the water in the water collection groove, and avoids water residue.

Finally, it should be noted that the above embodiments are merely used to describe the technical solutions of the present disclosure but not intended to limit the present disclosure. Although the present disclosure has been described in detail with reference to the foregoing embodiments, those of ordinary in the art will appreciate that: the technical solutions described in the foregoing embodiments can still be modified or some of the technical features can be replaced by equivalents. However, these modifications or substitutions do not depart from the spirit and scope of the technical solutions of the embodiments of the present disclosure in nature.

The invention claimed is:

1. A cleaning apparatus, comprising: a housing, a rolling brush, and a cleaning assembly; wherein, the cleaning assembly comprises a cleaning medium inlet and a plurality of cleaning medium spray orifices; and the plurality of cleaning medium spray orifices faces the rolling brush, and lengths of flow channels from the cleaning medium spray orifices to the cleaning medium inlet are equal;

the cleaning apparatus further comprising: a dirt remover; wherein the dirt remover is arranged on the housing and below the cleaning medium spray orifices, and contacts the rolling brush surface along an axial direction of the rolling brush; and an air suction pipeline; wherein an air suction port of the air suction pipeline faces the rolling brush and is located below the dirt remover;

the cleaning apparatus further comprising: a liquid extruder; wherein the liquid extruder is arranged on the housing and above the cleaning medium spray orifices, and contacts a rolling brush surface along an axial direction of the rolling brush.

2. The cleaning apparatus according to claim 1, wherein the cleaning medium spray orifices comprise at least first-layer cleaning medium spray orifices and second-layer cleaning medium spray orifices in sequence along extending directions of the flow channels;

the first-layer cleaning medium spray orifices are connected with the cleaning medium inlet, the second-layer cleaning medium spray orifices are overlaid with the first-layer cleaning medium spray orifices through flow channel branches correspondingly connected with the second-layer cleaning medium spray orifices, and lengths of the flow channel branches therebetween are equal, wherein a number of the cleaning medium spray orifices of a corresponding layer is increased with an increase of the layer.

3. The cleaning apparatus according to claim 2, wherein the flow channel branches respectively correspondingly connected between the first-layer cleaning medium spray orifices and the second-layer cleaning medium spray orifices are located in one plane, and the first-layer cleaning spray orifices are overlaid with the second-layer cleaning medium spray orifices in the plane.

4. The cleaning apparatus according to claim 2, wherein the flow channel branches respectively correspondingly connected between the first-layer cleaning medium spray orifices and the second-layer cleaning medium spray orifices are located in different planes, and the first-layer cleaning spray orifices are overlaid with the second-layer cleaning medium spray orifices in different planar spaces.

5. The cleaning apparatus according to claim 2, wherein the number of the cleaning medium spray orifices of the corresponding layer is 2 to the N, and the N is the layer where the cleaning medium spray orifices are located.

6. The cleaning apparatus according to claim 1, wherein at least part of the cleaning medium spray orifices are arranged along an axial direction of the rolling brush at equal intervals.

7. The cleaning apparatus according to claim 1, further comprising: a groove; wherein the groove is arranged between the liquid extruder and the cleaning medium spray orifices, and extends along the axial direction of the rolling brush; and wherein a contact surface of the groove contacts the rolling brush surface.

8. A cleaning apparatus, comprising: a housing, a rolling brush, and a cleaning assembly; wherein, the housing comprises a supporting housing and a base housing, an air suction pipeline is arranged between the supporting housing and the base housing;

the cleaning assembly is arranged on the supporting housing, is located above the air suction pipeline, and faces the rolling brush;

the cleaning assembly comprises a cleaning medium inlet and a plurality of cleaning medium spray orifices; and the plurality of cleaning medium spray orifices faces the rolling brush, and lengths of flow channels from the cleaning medium spray orifices to the cleaning medium inlet are equal; and wherein along extending directions of the flow channels, the flow channels comprises flow channel branches of multiple layers, the multiple layers are separated and overlaid in a space.

9. The cleaning apparatus according to claim 8, wherein along the extending directions of the flow channels, the cleaning medium spray orifices comprise first-layer cleaning medium spray orifices, second-layer cleaning medium spray orifices and third-layer cleaning medium spray orifices; the flow channel branches of multiple layers comprise first-layer flow channel branches, second-layer flow channel branches and third-layer flow channel branches;

the first-layer cleaning medium spray orifices are connected with the cleaning medium inlet via the first-layer flow channel branches, the second-layer cleaning medium spray orifices are connected with the first-layer cleaning medium spray orifices via the second-layer flow channel branches, and the third-layer cleaning medium spray orifices are connected with the second-layer cleaning medium spray orifices via the third-layer flow channel branches; and crossing-branch-flowing directions from the first-layer flow channel branches to the second-layer flow channel branches are opposite to crossing-branch-flowing directions from the second-layer flow channel branches to the third-layer flow channel branches.

10. The cleaning apparatus according to claim 9, wherein the flow channel branches respectively correspondingly connected between the first-layer cleaning medium spray orifices and the second-layer cleaning medium spray orifices are located in one plane, and the first-layer cleaning spray orifices are overlaid with the second-layer cleaning medium spray orifices in the plane.

11. The cleaning apparatus according to claim 9, wherein the flow channel branches respectively correspondingly connected between the first-layer cleaning medium spray orifices and the second-layer cleaning medium spray orifices are located in different planes, and the first-layer cleaning spray orifices are overlaid with the second-layer cleaning medium spray orifices in different planar spaces.

12. The cleaning apparatus according to claim 9, wherein the number of the cleaning medium spray orifices of the corresponding layer is 2 to the N, and the N is the layer where the cleaning medium spray orifices are located.

13. The cleaning apparatus according to claim 8, wherein along the extending directions of the flow channels, the cleaning medium spray orifices comprise first-layer cleaning medium spray orifices, second-layer cleaning medium spray orifices, third-layer cleaning medium spray orifices and fourth-layer cleaning medium spray orifices; the flow channel branches of multiple layers comprise first-layer flow channel branches, second-layer flow channel branches, third-layer flow channel branches, and fourth-layer flow channel branches;

the first-layer cleaning medium spray orifices are connected with the cleaning medium inlet via the first-layer flow channel branches, the second-layer cleaning medium spray orifices are connected with the first-layer cleaning medium spray orifices via the second-layer flow channel branches, the third-layer cleaning medium spray orifices are connected with the second-layer cleaning medium spray orifices via the third-layer flow channel branches, and the fourth-layer cleaning medium spray orifices are connected with the third-layer cleaning medium spray orifices via the fourth-layer flow channel branches; and the second-layer flow channel branches separate the third-layer flow channel branches and the fourth-layer flow channel branches;

at least part of the cleaning medium spray orifices of the fourth-layer cleaning medium spray orifices are arranged along an axial direction of the rolling brush at equal intervals.

14. The cleaning apparatus according to claim 8, further comprising: a liquid extruder; wherein the liquid extruder is arranged on the housing and above the cleaning medium spray orifices, and contacts a rolling brush surface along an axial direction of the rolling brush.

15. The cleaning apparatus according to claim 14, further comprising: a groove; wherein the groove is arranged between the liquid extruder and the cleaning medium spray orifices, and extends along the axial direction of the rolling brush; and wherein a contact surface of the groove contacts the rolling brush surface.

16. The cleaning apparatus according to claim 8, further comprising: a dirt remover; wherein the dirt remover is arranged on the housing and below the cleaning medium spray orifices, and contacts the rolling brush surface along an axial direction of the rolling brush.

17. The cleaning apparatus according to claim 16, further comprising: an air suction pipeline; wherein an air suction port of the air suction pipeline faces the rolling brush and is located below the dirt remover.

18. A ground cleaner, comprising: a handle main body and a cleaning apparatus connected with the handle main body, wherein the cleaning apparatus comprises: a housing, a rolling brush, an air suction pipeline, and a cleaning assembly;

the air suction pipeline has an air suction port, the air suction port is close to and faces a rolling brush surface;

the cleaning assembly comprises a cleaning medium inlet and a plurality of cleaning medium spray orifices, the cleaning medium inlet is configured to fill a cleaning medium for cleaning the rolling brush, the cleaning medium inlet communicates the plurality of cleaning medium spray orifices through a flow channel;

the cleaning assembly is located above the air suction port and used to spray the cleaning medium onto the rolling brush surface;

the flow channel comprises a first-layer flow channel branch, a second-level flow channel branch, and a third-level flow channel branch; the first-level flow channel branch comprises a first-level cleaning medium spray orifice, the second-level flow channel branch comprises a second-level cleaning medium spray orifice, and the third-level flow channel branch comprises a third-level cleaning medium spray orifice;

the first-level cleaning medium spray orifice is connected to the cleaning medium inlet through the first-level flow channel branch, the second-level cleaning medium spray orifice is connected to the first-level cleaning medium spray orifice through the second-level flow channel branch, and the third-level cleaning medium spray orifice is connected to the second-level cleaning medium spray orifice through the third-level flow channel branch;

the first-level flow channel branch, the second-level flow channel branch, and the third-level flow channel branch comprises a first-level flow channel branch main body, a second-level flow channel branch main body, and a third-level flow channel branch main body, respectively;

the first-level flow channel branch main body is a continuous lateral flow channel in the first-level flow channel branch that is connected to the cleaning medium inlet, and a flow direction of the cleaning medium is opposite within the continuous lateral flow channel;

the second-level flow channel branch main body is a continuous lateral flow channel in the second-level flow channel branch that is connected to the first-level cleaning medium spray orifice, and the flow direction of the cleaning medium is opposite within the continuous lateral flow channel;

the third-level flow channel branch main body is a continuous lateral flow channel in the third-level flow channel branch that is connected to the second-level cleaning medium spray orifice, and the flow direction of the cleaning medium is opposite within the continuous lateral flow channel;

the first-level flow channel branch main body and the third-level flow channel branch main body are located on a same side as the second-level flow channel branch main body.

19. The ground cleaner according to claim 18, wherein lengths of flow channels from the cleaning medium spray orifices to the cleaning medium inlet are equal.

20. The ground cleaner according to claim 18, wherein the air suction port is lower than a center axis of the rolling brush; and the cleaning assembly is higher than the center axis of the rolling brush.

21. The ground cleaner according to claim 18, wherein at least part of the plurality of cleaning medium spray orifices are arranged along an axial direction of the rolling brush; and the cleaning medium spray orifices arranged along the axial direction of the rolling brush are arranged at equal intervals.

22. The ground cleaner according to claim 18, wherein the lengths of flow channel branch of each layer are equal; or, the lengths of flow channel branch of each layer are unequal, and the lengths of the flow branch in the same layer are equal.

23. The ground cleaner according to claim 18, wherein the first-level flow channel branch, the second-level flow channel branch, and the third-level flow channel branch are located in the same plane; or, the first-level same plane, the second-level same plane, and the third-level same plane are located in different planes.

24. The ground cleaner according to claim 18, wherein the number of the cleaning medium spray orifices of the corresponding layer is 2 to the N, and the N is the layer where the cleaning medium spray orifices are located.

25. The ground cleaner according to claim 18, further comprising: a liquid extruder; wherein the liquid extruder is arranged on the housing and above the cleaning medium spray orifices, and contacts a rolling brush surface along an axial direction of the rolling brush.

26. The ground cleaner according to claim 25, further comprising: a groove; wherein the groove is arranged between the liquid extruder and the cleaning medium spray orifices, and extends along the axial direction of the rolling brush; and wherein a contact surface of the groove contacts the rolling brush surface.

27. The ground cleaner according to claim 18, further comprising: a dirt remover; wherein the dirt remover is arranged on the housing and below the cleaning medium spray orifices, and contacts the rolling brush surface along an axial direction of the rolling brush.

* * * * *